(12) United States Patent
Tsunekawa et al.

(10) Patent No.: US 7,253,795 B2
(45) Date of Patent: Aug. 7, 2007

(54) ELECTRO-OPTICAL DEVICE AND ELECTRONIC APPARATUS

(75) Inventors: Yoshifumi Tsunekawa, Chino (JP); Hisaki Kurashina, Matsumoto (JP); Yuichi Shimizu, Sutana-cho (JP)

(73) Assignee: Seiko Epson Corporation, Tokyo (JP)

( * ) Notice: Subject to any disclaimer, the term of this patent is extended or adjusted under 35 U.S.C. 154(b) by 751 days.

(21) Appl. No.: 10/690,241

(22) Filed: Oct. 22, 2003

(65) Prior Publication Data

US 2004/0135940 A1 Jul. 15, 2004

(30) Foreign Application Priority Data

Oct. 31, 2002 (JP) ............... 2002-318625
Sep. 12, 2003 (JP) ............... 2003-321781

(51) Int. Cl.
G09G 3/36 (2006.01)
G02F 1/1333 (2006.01)
G02F 1/1343 (2006.01)

(52) U.S. Cl. ............... 345/87; 345/92; 349/110; 349/139

(58) Field of Classification Search ......... 345/55–100; 349/110–111, 139, 140
See application file for complete search history.

(56) References Cited

U.S. PATENT DOCUMENTS

| 6,219,118 B1 * | 4/2001 | Zhang ............ 349/110 |
| 6,610,997 B2 | 8/2003 | Murade |
| 6,809,338 B2 | 10/2004 | Murade |
| 6,831,297 B2 * | 12/2004 | Arao ............ 349/110 |
| 2001/0002144 A1 * | 5/2001 | Yamazaki ......... 349/110 |
| 2002/0071072 A1 * | 6/2002 | Ohtani et al. ....... 349/110 |
| 2005/0099557 A1 * | 5/2005 | Zhang ............ 349/110 |
| 2006/0098132 A1 * | 5/2006 | Shiota et al. ........ 349/43 |

FOREIGN PATENT DOCUMENTS

| JP | A 6-138484 | 5/1994 |
| JP | A 9-292626 | 11/1997 |
| JP | A 9-306990 | 11/1997 |
| JP | A 10-206893 | 8/1998 |
| JP | 2000-267596 A | 9/2000 |
| JP | 2001-053287 A | 2/2001 |
| JP | 2001-330856 A | 11/2001 |
| JP | A 2002-149089 | 5/2002 |
| JP | A 2002-156652 | 5/2002 |
| WO | WO00/39634 | 7/2000 |

* cited by examiner

*Primary Examiner*—David L. Lewis
(74) *Attorney, Agent, or Firm*—Oliff & Berridge, PLC

(57) ABSTRACT

An electro-optical device includes: data lines extending in a first direction above a substrate; scanning lines extending in a second direction and intersecting the data lines; pixel electrodes and thin-film transistors arrayed so as to correspond to intersection regions of the data lines and the scanning lines; capacitors formed at a layer higher than the semiconductor layer of the thin-film transistors and at a layer lower than the pixel electrodes, and electrically connected to pixel potential; and upper light shielding film positioned between the data lines and the pixel electrodes; the upper light shielding film defining at least the corners of pixel opening regions; and the scanning lines, the data lines, and the capacitors, being formed in the light shielded region.

21 Claims, 19 Drawing Sheets

ELECTRO-OPTICAL DEVICE AND ELECTRONIC APPARATUS

BACKGROUND OF THE INVENTION

1. Field of Invention

The present invention relates to the field of an electro-optical device, such as a liquid crystal device or the like, and an electronic apparatus. The present invention also relates to the field of electrophoresis devices, such as electronic paper or the like or EL (electro-luminescence) devices or devices using electron emission devices (Field Emission Displays and Surface Conduction Electron-Emitter Displays) and the like.

2. Description of Related Art

In the related art, there have been known electro-optical devices, such as liquid crystal devices including an electro-optical substance, such as liquid crystal or the like held between a pair of substrates, whereby display of images is enabled by transmitting light so as to pass therethrough. Now, "display of images" is, for example, realized by changing the transmissivity of light by changing the state of the electro-optical substance for each pixel, thereby visualizing light with a different gradient for each pixel.

Such electro-optical devices being provided include active-matrix drivable arrangements including, on one of the pair of substrate, pixel electrodes arrayed in matrix fashion, scanning lines and data lines provided weaving between the pixel electrodes, and further, TFTs (Thin Film Transistor) and the like, serving as pixel switching devices. With the active-matrix drivable electro-optical devices, the TFTs are provided between the pixel electrodes and data lines, and control conduction therebetween. Also, the TFTs are also electrically connected to the scanning lines and data lines. Thus, it is possible to control turning the TFT on and off through the scanning lines, and also in the event that the TFT is on, an image signal supplied through the data line can be applied to the pixel electrode, i.e., the light transmissivity can be changed for each pixel.

With such electro-optical devices, the above-described configuration is fabricated on one of the substrates, but this requires a great area if laid out two-dimensionally, which could reduce the pixel opening ratio, i.e., the ratio of the area which light is to be transmitted through as to the area of the entire substrate. Accordingly, techniques for configuring the above-described components three-dimensionally, i.e., techniques for layering the components by introducing an inter-layer insulating film therebetween have been used with related art arrangements as well. More specifically, first, the TFTs and scanning lines functioning as gate electrode film for the TFTs are formed on the substrate, upon which are formed the data lines, and further thereupon the pixel electrodes and so forth. This way, in addition to reduction in the size of the device, enhanced pixel opening ratio and so forth can be achieved by suitably setting the array of the components.

Now, with such electro-optical devices, there is a basic demand for displaying high-quality images, and with regard to achieving this, higher opening ratio and higher contrast of images and the like are demanded in particular of the electro-optical devices. Here, "opening ratio" can be expressed by the ratio or the like of the ratio of light transmitting areas as to the entire area of the substrate making up the electro-optical device or the entire area of the image display region on the substrate, and the higher this value is, the brighter the image is. Also, increasing the contrast of the image is achieved by electrically connecting capacitors to the TFTs and pixel electrodes for example, thereby increasing the potential holding properties of the pixel electrodes.

On the other hand, further reduction in size and increased precision, and driving at higher frequency are being demanded of the electro-optical devices. However, attempting to achieve the above-described increase in opening ratio and reduction in size is met with difficulties. The reason is that an opening ratio of a certain level or more is necessary to display images with a certain level of brightness or more, so the area of the light transmission region needs to be kept around the same, which contradicts the reduction in the substrate area which occurs if the size is reduced. That is to say, in this case, an essential increase in the area of the light transmission region is being demanded.

Also, simply essentially increasing the area of the light transmission region is not sufficient to achieve a high opening ratio. This is because that would affect the surrounding configuration. For example, as described above, capacitor is provided in some cases with electro-optical devices to increase the contrast, but in order to achieve a high opening ratio based upon the assumption that such capacitor exists, the capacitor needs to be narrowed down. However, simply narrowing down the capacitor leads to high resistance at the pair of electrodes configuring it at a proportionate amount, which leads to new problems such as cross-talking and burn-in caused thereby. Now, there have been related art examples wherein the pair of electrodes were formed of polysilicon or WSi (tungsten silicide) or the like, but the resistance of these materials is by no means low, making the above problem even more serious.

Moreover, in addition to the above-described capacitors, TFTs serving as pixel switching devices are provided on the substrate, there is the need to arrange such that there is no light cast into the TFTs or the semiconductor layer thereof when achieving a high opening ratio. This is because such light cast therein can cause flickering or the like on the image due to a photo-leak current occurring at the semiconductor layer. In realizing a high opening ratio, the area of the light shielded regions is generally expected to be reduced relative to the area of the light transmitting region, so the above-described problem has even more serious aspects. That is to say, the danger of light being cast into the semiconductor layer is even greater.

As described above, measures for simply increasing the area of the light transmitting region cannot achieve higher opening ratio, and total measures for all aspects need to be taken to achieve this object.

SUMMARY OF THE INVENTION

The present invention has been made to address the above problems. The present invention provides an electro-optical device capable of displaying high-quality images, being brighter and so forth, by achieving a high opening ratio and high contrast. Also, the present invention provides an electronic apparatus including such an electro-optical device.

In order to address the above problems, the electro-optical device according to an aspect of the present invention includes: data lines extending in a first direction above a substrate; scanning lines extending in a second direction intersecting the data lines; pixel electrodes and thin-film transistors arrayed so as to correspond to intersection regions of the data lines and the scanning lines; capacitors formed at a layer higher than the semiconductor layer of the thin-film transistors and at a layer lower than the pixel electrodes, and electrically connected to pixel potential; and upper light shielding film positioned between the data lines and the pixel electrodes; the upper light shielding film defining at least the corners of pixel opening regions; and the scanning lines, the data lines, and the capacitors, being formed in the light shielded region.

The electro-optical device according to an aspect of the present invention is firstly active matrix drivable, due to scanning lines, data lines, pixel electrodes, and thin-film transistors being provided. Also, with this electro-optical device, each of the components is a part of the layered structure, so the reduction in size of the overall device can be achieved, and the pixel opening ratio can be enhanced by realizing suitable placement for each of the components.

Also, with the present invention, capacitors coupling between the data lines and the pixel electrodes can be reduced or prevented beforehand due to the light shielding layer being provided therebetween. That is to say, the probability of potential fluctuation at the pixel electrodes can be reduced by conduction of the data lines, thereby enabling images with higher quality to be displayed.

Particularly, a capacitor is provided with the present invention, whereby the potential holding properties of the pixel electrodes can be enhanced, thus, images with high contrast can be displayed.

In an aspect of the present invention, a dielectric film making up the capacitor is preferably configured of a single layer or multiple layers including a film having higher permittivity than silicon oxide.

Accordingly, with the capacitor according to an aspect of the present invention, the charge accumulation properties are superb compared to related art arrangements, whereby the potential holding properties at the pixel electrodes can be enhanced, enabling images with higher image quality to be displayed. Also, in this way, the capacitor value of the capacitor can be increased, so the area of a pair of electrodes making up the capacitor can be narrowed down as compared to related art arrangements. Accordingly, with the present invention, increased opening ratio can be achieved at the same time.

Further, with the present invention, the scanning lines, the data lines, the thin-film transistors, and the capacitors, are formed in the light shielded region. Thus, a configuration is realized wherein the components of the layered structure are not situated in regions approximately matching the light transmitting regions, so an extremely high opening ratio can be realized and maintained with the electro-optical device according to an aspect of the present invention. Note that with such a configuration, there is no particular problem with the capacitors being formed in the light shielded region. That is, firstly, with regard to forming the capacitors so as to be closed into the light shielded region, the capacitor capabilities, approximately the same as those desired, can be obtained as long as the capacitor has a dielectric film including a high-permittivity material and has charge accumulation properties as described above, even if the planar expansion of the pair of electrodes making up the capacitor is suppressed somewhat. Secondly, as can be clearly understood from the above-described operation's effect, the predetermined capabilities can be obtained as long as the light shielding layer is formed so as to cover at least the data lines. To summarize, according to an aspect of the present invention, the capabilities required for the components in the layered structure are exhibited without problem (e.g., higher contrast of the image due to providing the accumulation capacitor), while at the same time, an extremely high opening ratio can be realized and maintained due to these structures being provided within the light-shielded region.

Thus, with the electro-optical device according to the present invention, an image can be displayed with high quality such a being brighter, by achieving increased opening ratio and increased contrast.

Note that examples of the "high-permittivity material" in the present invention include the later-described silicon nitride, and also TaOx (tantalum oxide), BST (barium strontium titanate), PZT (lead zirconate titanate), $TiO_2$ (titanium oxide), $ZiO_2$ (zirconium oxide), $HfO_2$ (hafnium oxide), and an insulating material including at least one of SiON (silicon oxynitride) and SiN (silicon nitride). Particularly, using a high-permittivity material such as TaOx, BST, PZT, $TiO_2$, $ZiO_2$, or $HfO_2$ enables the capacitor value to be increased within a limited region on the substrate. Or, using a material including silicon, such as $SiO_2$ (silicon oxide), SiON (silicon oxynitride), and SiN, allows stress at inter-layer insulating film and so forth to be reduced.

One form of the electro-optical device according to an aspect of the present invention may include a light-shielding relay film formed of the same film as with the upper light shielding film, to electrically connect the thin-film transistors and the pixel electrodes, the shielding film and the relay film defining the pixel opening regions.

According to this form, the opening region can be suitably defined. Also, due to the light-shielding relay layer to electrically connect the thin-film transistors and the pixel electrodes being formed of the same film as the light shielding film, the electrical connecting between both can be carried out more suitably. For example, an arrangement can be conceived wherein the relay layer and light shielding film are formed of a material having good compatibility with the ITO making up the pixel electrodes or the like.

With one form of the electro-optical device according to an aspect of the present invention, the upper shielding film is preferably electrically connected to one of the electrodes forming the capacitor. According to this form, a more flexible layered structure can be configured. For example, in the event at setting "one of the electrodes forming the capacitor", as called so in this form, to a fixed potential, the electrode can be maintained at a fixed potential by taking measures, such as connecting the light shielding film to a fixed-potential electrical power source.

Also, with an aspect of the present invention, the pixel electrodes are preferably electrically connected to other layers in the layered structure through titanium or a compound thereof.

According to this configuration, electrical connection between the pixel electrodes and other layers in the layered structure to be connected therewith (e.g., at least one electrode of the pair of electrodes making up the capacitor, or the later-described relay layer or the like, can be conceived) can be carried out suitably. The reason is that pixel electrodes are normally formed of transparent electroconductive material such as ITO (Indium Tin Oxide) or IZO (Indium Zinc Oxide), so bringing aluminum or the like in contact therewith results in so-called electrolytic corrosion, and suitable electrical connection is not realized due to aluminum lines breaking or insulation due to formation of alumina, or the like. However, with the present form, the pixel electrodes are connected with the other layers through titanium or a compound thereof, and accordingly trouble, such as that described above, does not occur.

This form is preferably configured such that an inter-layer insulating film disposed as a base for the pixel electrodes may include a part of the layered structure, wherein contact holds for electric contact with the pixel electrodes are formed on the inter-layer insulating film, and a film including the titanium or a compound thereof being formed on at least the inner face of the contact holes.

According to such a configuration, first, electrical connection between the pixel electrodes and other layers can be achieved without concern of electrolytic corrosion such as described above. At the same time, the present configuration has contact holes between the pixel electrodes and other layers, so more appropriate positioning of both in the layered structure, or increased freedom in the layout, can be achieved. This also means that at the same time, performing appropriate positioning of the components in the layered structure, more specifically performing positioning so as to close the components up in the light shielded region, to widen the light-transmitting region, can be realized, thereby greatly contributing to a high opening ratio being realized and maintained.

Further, with this configuration, a film containing the titanium or a compound thereof, i.e., a film having relatively excellent light-shielding capabilities is formed on at least the inner face of the contact hole, so light passage and the like due to the contact hole can be reduced or prevented beforehand. That is to say, progression of the light passing through the hollow portion of the contact hole can be shielded by absorbing, etc., of light by the film. Thus, there is hardly any concern of light leakage and the like into the image. Also, due to the same reason, the light-proofing of the thin-film transistors and the semiconductor layer thereof can be enhanced. Thus, occurrence of light leakage current in the event that light is cast into the semiconductor layer can be suppressed, thereby reducing or preventing occurrence of flickering or the like of the image due to this beforehand. Thus, according to the present configuration, images with high quality can be displayed.

With another form of the electro-optical device according to an aspect of the present invention, the data lines are formed of the same film with one electrode of the pair of electrodes making up the capacitor.

According to this form, the data lines and one electrode of the pair of electrodes making up the capacitor are formed of the same film, or in other words, in the same layer or at the same time in the manufacturing process. Thus, for example, there is no need to form each of separate layers and separate the two with an inter-layer insulating film, thereby reducing the number of layers of the layered structure. With the present invention, a shielding layer is formed in the layered structure between the data lines and the pixel electrodes, which means an increased number of layers is to be expected, so from this perspective, this is extremely advantageous. The reason is that an excessively great number of layers in the structure harms the manufacturability and yield. Note that in the event that the data lines and one electrode of the pair of electrodes are formed at the same time, these can be insulated so long as suitable patterning processing is performed for this film, so there is no particular problem with regard to this point.

As will become apparent from the description of this form, with this aspect of the present invention, forming the data lines and at least one electrode of the pair of electrodes making up the capacitor of the same film is not necessarily indispensable. That is, these may be formed as different layers.

Another form of the electro-optical device according to an aspect of the present invention may include a relay layer to electrically connecting at least one electrode of the pair of electrodes making up the capacitor with the pixel electrode, as a part of the layered structure.

According to this form, the pixel electrode and the one electrode of the pair of electrodes making up the capacitor, each making up a part of the layered structure, are electrically connected by the relay layer also making up a part of the layered structure. Specifically, this can be carried out by formation of contact holes or the like. Thus, this allows a flexible structure to be realized such as, for example, the relay layer according to the present form being a two-layered structure wherein the upper layer thereof is formed of a material having compatibility with ITO (Indium Tin Oxide) which is an example of a transparent electroconductive material commonly used as a pixel electrode material, and wherein the lower layer is formed of a material having compatibility with the one electrode of the pair of electrodes making up the capacitor, whereby application of voltage to the pixel electrodes, or maintaining of potential at the pixel electrodes, can be suitably realized.

Also, providing such a "relay layer" is preferable in suitably positioning the pixel electrodes and a capacitor. That is to say, with this form as well, the positioning of the relay layer and a capacitor can be devised such that the light transmission region is as wide as possible, thereby enabling a higher opening ratio to be achieved.

With another form of the electro-optical device according to an aspect of the present invention, the relay layer is formed of an aluminum film and nitrized film.

According to this form, in the event that the pixel electrodes are formed of ITO for example, bringing aluminum in contact therewith results in so-called electrolytic corrosion, leading to aluminum lines breaking or insulation due to formation of alumina, or the like, which is undesirable, so in light of this, with the present exemplary embodiment, the ITO and aluminum are not brought directly into contact, but rather the ITO is brought into contact with a nitrized film, such as a titanium nitride film for example, thereby realizing the electrical connection between the pixel electrodes and the relay layer, and accordingly the capacitor. In this way, the present form provides an example of the aforementioned "compatible material".

Also, the silicone nitride film has excellent capabilities in reducing or preventing intrusion and spreading of moisture, so intrusion of moisture into the semiconductor layer of the thin-film transistors can be reduced or prevented beforehand. With the present form, the above advantages can be obtained due to the relay layer including a nitrized film, thereby maximally preventing the problem of increasing threshold voltage of the thin-film transistors.

With a form having such a relay layer, the light shielding layer is preferably formed of the same film as the relay layer.

Due to such a configuration, both the relay layer and the shielding layer are formed as the same film, whereby both configurations can be formed at the same time, allowing simplification of the manufacturing process or reducing of the manufacturing costs accordingly.

Also, with a form having both the configuration according to the present form and a form wherein the data lines and the one electrode of the pair of electrodes making up the capacitors are formed as the same film, the displacement form, particularly the layering order and the like, of the data lines, capacitors, relay layers, and pixel electrodes, is particularly suitable, thereby furthering the above-described advantages.

Moreover, particularly, with a form having both the configuration according to the present form and the above-described configuration, wherein the relay layer containing the nitrized film, the light shielding layer also containing the nitrized film. Accordingly, the water intrusion prevention described above into the semiconductor layer of the thin-film transistors can be obtained on a wide range of the face of the substrate. Accordingly, the advantages of longevity of the thin-film transistors can be had more effectively.

As will become apparent from the description of this form, with the present invention, forming the light shielding layer and the relay layer as the same film is not necessarily indispensable. That is, these may be formed as different layers.

With another form of the electro-optical device according to an aspect of the present invention, the scanning lines, the data lines, and at least one electrode of the pair of electrodes making up the capacitors, are formed of a light shielding material, and at least one of these make up a built-in light shielding film within the layered structure.

According to this form, the components configuring the layered structure on the substrate are formed of light shielding material, and form a light shielding film defining the light transmission region. This means that a so-called "built-in light shielding material" is provided on the substrate, thereby allowing situations to be avoided beforehand, light leakage current occuring due to incident light to the semiconductor layer of the thin-film transistors, which leads to flickering and the like on the image. That is to say, the light-proofing of the thin-film transistors and the semiconductor layer thereof can be enhanced. Now, in the event that the thin-film transistors are to be formed on the lowest layer of the substrate, or at a layer near thereto, the scanning lines, data lines, and capacitors are each formed above the thin-film transistors, and accordingly the light shielding film formed of these can be called an "upper light shielding film".

Note that the "light shielding materials" as referred to in the present form include single metals, alloys, metal suicides, polysilicides, layered structures, or the like, including at least one of, for example, Ti (titanium), Cr (chromium), W (tungsten), Ta (tantalum), Mo (molybdenum), and other like high-melting-point metals. Further, aluminum (Al) may also be included in these "light shielding materials".

While with the present form in particular, all components may make up the "built-in light-shielding film", preferably, at least one set of two components extending in mutually intersecting directions should make up the "built-in light-shielding film". For example, in the event that capacitor lines are formed so as to follow the second direction in which the scanning lines extend, and a part of the capacitor lines is one electrode of the pair of the electrodes making up the capacitor, a preferable arrangement is that the capacitor lines and the data lines are formed of the light shielding material, so that these make up the "built-in light-shielding film". According to this configuration, the shape of the "built-in light-shielding film" is a grid shape, and can be made to suitably corresponding to the matrix array normally employed as an array form of the pixel electrodes.

With another form of the electro-optical device according to an aspect of the present invention, one electrode of the pair of electrodes making up the capacitor makes up a part of capacitor lines formed so as to follow the second direction, and the capacitor lines are formed of a multi-layer film including a low-resistance film.

With this form, first, one electrode of the pair of electrodes making up the capacitor (hereafter sometimes referred to as "one electrode") make up a part of the capacitor lines formed so as to follow the second direction, i.e., the direction in which the scanning lines are formed. Accordingly, in order to set the one electrode at a fixed potential, for example, there is no need to provide individual electroconductive materials or the like to set each of the one electrodes of the capacitor provided for each pixel to a fixed potential, rather, a form wherein each capacitor line is connected to a fixed potential source is sufficient. Thus, according to the present form, simplification of the manufacturing process or reducing of the manufacturing costs accordingly, can be realized.

Particularly, with the present form, the capacitor lines are formed of a multi-layer film including a low-resistance film. Due to such a configuration, high-capability capacitor lines (for example, to cause the capacitor lines to also have functions in addition to the functions which the capacitor lines have as fixed-potential side capacitor electrodes) can be realized. Particularly, the multi-layer film according to an aspect of the present invention includes material with low electric resistance as compared to related art polysilicon or WSi, which is a low-resistance film, that is, for example, single metals of aluminum, copper, chromium, and so forth, or materials including these, so high electric conductivity can be achieved. Due to achieving this high electric conductivity, narrowing down of the capacitor lines, i.e., narrowing down of the capacitor, can be realized with the present form without any particular restrictions. Accordingly, the present form greatly contributes to enhancing the opening ratio. In other words, in related art arrangements, prevention of cross-talk and burn-in and the like due to high resistance which had been occurring as the result of narrowing down the capacitor lines, can be reduced or prevented.

Also, the capacitor lines in the present form are formed of a multi-layer film including the above-described low-resistance film, so in addition to the low-resistance film, a film formed of another material capable of realizing light-shielding functions capable of reducing or preventing incident light to the thin-film transistors, can be used along with this as a component of the capacitor lines.

Further, configuring the capacitor lines of a multi-layer film as with an aspect of the present invention, enables the functions as accumulation capacitor to be stabilized. That is to say, for example, if only the above-described object of low-resistance is to be achieved, the capacitor lines could be configured of only one layer of such material, but there are cases wherein this does not allow the capacitor functions which the accumulation capacitor should have to be fully carried out. Accordingly, with the present invention, due to configuring the capacitor lines of film of two or more layers as described here, even in the event that one of the layer uses a material to provide some special functions, a material to serve as the capacitor in another layer can be used in a compensatory manner, so the above-described problems do not occur.

Note that with the present invention, multiple functions can be achieved for the capacitor lines as described here, thereby enhancing the degree of freedom in the design of the electro-optical device, as well.

With another form of the electro-optical device according to an aspect of the present invention, the capacitor lines have the low-resistance film as an upper layer thereof and a film formed of a light-absorbing material as a lower layer thereof.

With this form, the later-described multi-functionality is achieved at the capacitor lines. First, the upper layer of the capacitor lines has the low-resistance film, so assuming a case wherein light is cast in from the upper layer side for example, the light is reflected off of the surface of the low-resistance film, thereby enabling reduction or prevention of the light directly reaching the thin-film transistors. This is because the material generally has a high reflectivity.

On the other hand, the lower layer of the capacitor lines is formed of a light-absorbing material such as polysilicon or the like for example, so so-called stray light, which occurs as the result of light entering the electro-optical device and the reflecting at the surface of the low-resistance film or on the lower face of the data lines or the like, can be reduced or prevented beforehand from reaching the thin-film transistors. That is, all or part of such stray light is absorbed at the lower layer of the capacitor lines, so the probability of the stray light reaching the thin-film transistors can be reduced.

Note that the capacitor lines "being formed of multi-layer film" is a prerequisite of the present invention, so with regard to an arrangement wherein aluminum is at the upper layer of the capacitor lines and polysilicon is on the lower layer thereof for example, it is needless to say that forms may be assumed wherein there is a film of yet another material further above the aluminum, or wherein there is a film of yet another material further below the polysilicon, or wherein there is a film of yet another material between the aluminum and polysilicon. Also, depending on the situation, a structure wherein the layers are aluminum, polysilicon, aluminum, and the like, in that order from the top, may be used, of course.

With another form of the electro-optical device according to an aspect of the present invention, the low-resistance film is formed of aluminum or an aluminum alloy.

With this form, the above-described advantages can be exhibited in a more sure manner, since aluminum is an extremely low-resistance material. Note that the resistance value of aluminum is around $1/100$ of that of the above-described polysilicon or WSi.

Also, forming the capacitor lines, with the present structure including aluminum or an aluminum alloy, has the following advantages. In related art arrangements, the capacitor lines have been formed of single polysilicon or WSi or the like as described above, so shrinking force and compression force due to these materials placed a great stress on the inter-layer insulating film or the like formed on the capacitor lines, but with the present form, such a problem does not occur. That is to say, with the related art arrangements, the existence of the stress placed certain restrictions on the thickness of the inter-layer film, and making the film too thin could result in destruction thereof due to the stress. With the present form, such stress does not have to be taken into consideration, and consequently, the thickness of the inter-layer insulation film can be made smaller as compared with the related art arrangement, thereby reducing the size of the overall electro-optical device.

With another form of the electro-optical device according to the present invention, the capacitor includes the dielectric film, an upper electrode and lower electrode holding the dielectric film therebetween, and includes a first portion layered following a plane parallel to the surface of the substrate, and a second portion layered following a plane rising from the surface of the substrate, thereby having a stepped cross-sectional shape which is higher at the middle than the portions closer to the edges.

According to this form, for example, depending on whether the lower electrode itself is formed so as to have a stepped portion as to the substrate, or whether a stepped member is formed at a predetermined portion below the lower electrode, or the like, the dielectric film and upper electrode situated at the upper layer thereof have a bent form as viewed cross-sectionally. In this case, advantages of increased capacitor can be expected as compared to related art planar capacitor, by an amount corresponding to the area portion at the second portion wherein the upper electrode, dielectric film, and lower electrode are layered following the plane rising following the surface of the substrate, in other words, corresponding to the area portion of the side walls of the stepped shape.

Accordingly, with the present invention, the capacitor of the upper electrode and the lower electrode making up the accumulation capacitor can be increased without increasing the planar area thereof, so increased capacitor can be realized while maintaining a great opening ratio, thereby enabling high-quality images with no display irregularities, flickering, etc., to be displayed.

Also, with the present invention, the steeped shape is preferably a tapered shape.

According to this form, the dielectric film and the upper electrode formed on the lower electrode can be suitably formed. That is to say, with the arrangement wherein the stepped shape includes a tapered shape, the corner portions of the stepped shape are smooth, as can be clearly understood from comparing with a stepped shape including vertical side walls for example. So there is hardly any need to be concerned about deterioration of coverage at the time of forming the dielectric film and the upper electrode on the stepped shape including the tapered shape. Accordingly, with the present form, the dielectric film and upper electrode can be suitably formed.

Also, in the event of comparing a stepped shape including vertical side walls, and a stepped shape including a tapered shape according to the present form, assuming the height is the same for both, and also the area of the upper face of the stepped shape is the same for both, the area of the side walls will be generally greater for the latter than the former, which can be understood to be advantageous from the perspective of increased capacitor.

With another form of the electro-optical device according to an aspect of the present invention, the stepped cross-sectional shape of the capacitor is formed following at least one of the scanning lines and the data lines.

With this form, layering the inter-layer insulating film and the like on the stepped shape results in a protrusion being formed on the stepped shape, so a form wherein the protrusion extends following at least one direction of the scanning lines and the data lines emerges. Accordingly, in this case, a form emerges wherein the protrusion exists between adjacent pixel electrodes. Accordingly, adverse effects on the image due to in-plane fields occurring between adjacent pixel electrodes can be reduced in cases of driving the electro-optical device according to the present invention by 1H inversion driving, 1S inversion driving, or dot inversion driving, thereby enabling a image with higher quality to be displayed. This issue will be discussed in detail below.

First, assuming pixel electrodes arrayed in a square shape, for example, 1H inversion driving is a driving method repeatedly performed wherein, in a certain frame or field, the pixel electrodes arrayed in the odd-numbered rows are driven with a positive polarity with the potential of a common electrode as a reference, and at the same time, the pixel electrodes arrayed on even-numbered rows are driven with a negative polarity, and in the subsequent frame or field, the odd-numbered rows are driven with a negative polarity and the even-numbered rows are driven with a positive polarity, which is opposite to the first. On the other hand, 1S inversion driving is a driving method which can be understood by substituting "odd-numbered columns" for odd-numbered rows, and "even-numbered columns" for even-numbered rows, in the description of the 1H driving method. Further, dot inversion driving is a driving method wherein the voltage polarity applied to the pixel electrodes is inverted between the adjacent pixel electrodes in both the column direction and the row direction. Employing these driving methods allows deterioration of the electro-optical substance, such as the liquid crystal or the like due to application of the DC voltage component, or cross-talking or flickering on the image, to be suppressed.

However, with such inversion methods, pixel electrodes to which voltages of different polarity have been applied are adjacent one to another, so a so-called "in-plane field" occurs. For example, in the 1H inversion driving method, the in-plane field occurs between a pixel electrode situated on a certain row and a pixel electrode situated in an adjacent row. In the event that such an in-plane field occurs, this causes disturbances in the potential difference between the pixel electrodes on the substrate and the common electrode on the facing substrate (hereafter referred to as "perpendicular field"), leading to incorrect orientation of the liquid crystal, which causes light passage or the like at this portion, resulting in deterioration of the image quality such as lower contrast ratio or the like.

However, with the present form, the stepped shape of the capacitor is formed following at least one of the scanning lines and the data lines as described above, so occurrence of in-plane fields can be reduced or prevented.

This is firstly due to the fact that the arrangement wherein the edge of the pixel electrode rests on the edge of the protrusion enables the distance between the pixel electrode and the common electrode to be narrowed, so the perpendicular field can be intensified as compared with related art arrangements. Secondly, the in-plane field itself is weakened corresponding to the permittivity of the protrusion, regardless of whether the edge of the pixel electrode is above the protrusion or not. Further, thirdly, the volume of the gap between the protrusion and the common electrode, i.e., the volume of the liquid crystal positioned in the gap, can be reduced, so the effects of the in-plane field on the liquid crystal can be relatively reduced.

Now, it is needless to say that the stepped shapes and protrusions are preferably formed following the scanning lines in the case of 1H inversion driving, and formed following the data lines in the case of 1S inversion driving. Also, in the case of dot inversion driving, the stepped shapes and protrusions are preferably formed following both the scanning lines and the data lines.

Thus, according to the present form, application of the perpendicular field to the liquid crystal can be suitably realized, so desired images can be displayed.

With another form of the electro-optical device according to an aspect of the present invention, the capacitor includes the dielectric film, an upper electrode and lower electrode holding the dielectric film therebetween, and the dielectric film is formed of a silicon nitride film and a silicon oxide film.

According to this form, the dielectric film contains a silicon nitride film with relatively high permittivity, so high charge accumulating properties can be had even in the event that there is some sacrifice of the area of the capacitor, i.e., the area of the pair of electrodes making up the capacitor.

Accordingly, the potential holding properties of the pixel electrodes are markedly enhanced, and a high-quality image can be displayed. Also, the area of the capacitor can be reduced, so further enhancement in the pixel opening ratio can be achieved.

Also, the silicone nitride film has excellent capabilities in reducing or preventing intrusion and spreading of moisture, so intrusion of moisture into the semiconductor layer of the thin-film transistors can be reduced or prevented beforehand. With regard to this point, in the event that moisture intrudes into the semiconductor layer or the gate insulating film or the like, a positive charge occurs at the interface between the semiconductor layer and the gate insulating film, leading to adverse effects wherein the threshold voltage is gradually raised. With the present form, intrusion of moisture to the semiconductor layer can be effectively reduced or prevented as described above, thereby maximally preventing the problem of increasing threshold voltage of the thin-film transistors.

Further, due to the dielectric film including a silicon oxide film in addition to the silicon nitride film, there is no deterioration in the voltage withstanding capabilities of the capacitor.

Thus, with the dielectric film according to the present invention, compounded advantages can be simultaneously had.

Further, with a form wherein the configuration of the dielectric film according to the present form is applied to the above-described stepped capacitor, a great increase in capacitor can be expected. Accordingly, such a configuration can be said to be a form most suitable to the present invention which is to realize and maintains a high opening ratio.

Note that this form includes not only cases wherein the dielectric film is a two-layered structure of an silicon oxide film and a silicon nitride film, but also cases wherein the dielectric film is a three-layered structure of a silicon oxide film, a silicon nitride film, and a silicon oxide film, or layered structures of more layers.

With another form of the electro-optical device according to the present invention, an inter-layer insulating film disposed as a base for the pixel electrodes may include a part of the layered structure, with the surface of the inter-layer insulating film having been subjected to smoothing processing.

According to this form, the surface of the inter-layer insulating film disposed as a base for the pixel electrodes has been subjected to smoothing processing, so an orientation film which is normally formed on the inter-layer insulating film can also have a smooth surface. That is to say, the uneven shapes on the surface of the inter-layer insulating film are not transferred onto the surface of the orientation film. Accordingly, there is no unnecessary disturbance in the orientation state of the liquid crystal which is an example of the electro-optical substance and comes in contact with the orientation film, so the probability of light leakage and the like caused by this can be reduced, and an image with higher quality can be displayed.

Note that specific examples of the "smoothing processing" in the present form include CMP (Chemical Mechanical Polishing) processing or etch-back processing or the like, but other various types of smoothing techniques may be used, as a matter of course.

Now, CMP processing is a technique wherein generally, the substrate to be processed and a polishing cloth (pad) are both rotated and the surfaces of each are brought into contact, while a polishing fluid (slurry) containing silica particles or the like is supplied to the portion in contact, thereby polishing the surface of the substrate to be processed with the combination of mechanical actions and chemical actions, thus smoothing the surface.

Also, etch-back processing is a technique wherein generally, a sacrificial film having smoothness such as photoresist or SOG (Spin On Glass) is formed on an uneven surface, following which etching processing is performed on the sacrificial film down to the surface where the unevenness exists (whereby the unevenness is "evened out", as if it were), thus smoothing the surface. However, with the present invention, the above-described sacrificial film is not always necessary. For example, processing may be performed such that a film is formed excessively of a filler beyond filling the space within contact holes (i.e., so as to flow out from the contact holes) and up to the surface of the inter-layer insulating film, following which the excessive portion is completely etched away at areas other than the contact holes, thereby leaving the filler only within the contact holes and exhibiting a smooth face.

Now, with a configuration wherein the surface of the inter-layer film is smoothed as with the present invention described above, in the event of performing driving with different polarity for the scanning lines or each row of pixel electrode connected to the scanning lines (i.e., "1H inversion driving". See later description), there is the possibility that in-plane fields will occur between adjacent pixel electrodes, which may create a disturbance in the orientation state of the liquid crystal. With regard to this point, the occurrence of in-plane fields are suppressed by proving protrusions or the like on the surface of the inter-layer insulating film, or so forth, as described layer, but the following devices are also suitably employed.

That is, instead of performing polarity inversion for each scanning line, "1V inversion driving" is performed wherein this is performed each field period (one vertical scan period). According to this, the adjacent pixel electrodes are not driven with a different polarity within a given field period, so in-plane fields cannot occur as a principle.

However, employing this 1V inversion driving causes the following problems. That is, there is a serious problem that flickering occurs on the screen each time the polarity is inverted, i.e., each vertical scan period.

Accordingly, in such cases, the double-speed field inversion driving described later in detail in the exemplary embodiments is preferably employed. Now, double-speed field inversion driving is a driving method wherein, one field period is made half that of related art driving (e.g., in the event that the related art was driven at 120 [Hz], half should preferably be 1/60 [s] or less.). Accordingly, assuming employing the 1V inversion driving, the polarity inversion cycle is half of the conventional arrangements. Thus, one vertical scan period is shortened, i.e., the screen of the positive polarity and the screen of the negative polarity switch over faster, and the aforementioned flickering becomes inconspicuous.

Thus, according to the double-speed field inversion driving method, images can be displayed without flickering and with higher quality.

With another form of the electro-optical device according to an aspect of the present invention, the pixel electrodes include a first pixel electrode group for inversion driving at a first cycle and a second pixel electrode group for inversion driving at a second cycle complementary to the first cycle, with a plurality thereof being arrayed on a plane; at least one of the data lines and the shielding layer have a main line portion which extends intersecting over the scanning lines and an overhanging portion overhanging from the main line portion following the scanning line; the electro-optical device may include a facing electrode on a facing substrate disposed facing the substrate, facing the plurality of pixel electrodes; and protrusions are provided on the surface of the base of the pixel electrodes on the substrate, at regions which are gaps between adjacent pixel electrodes across the scanning lines when viewed in planar fashion, according to the presence of the overhanging portions.

According to this form, multiple pixel electrodes including a first pixel electrode group for inversion driving at a first cycle and a second pixel electrode group for inversion driving at a second cycle complementary to the first cycle are arrayed in planar fashion on a first substrate, and both (i) adjacent pixel electrodes which are driven by driving voltages of mutually inverted polarity at each time during inversion driving, and (ii) adjacent pixel electrodes which are driven by driving voltages mutually of the same polarity at each time during inversion driving, exist. These are present in an electro-optical device, such as a matrix-driven liquid crystal device or the like, employing an inversion driving method such as the aforementioned 1H inversion driving method, for example. Accordingly, in-plane fields occur between the adjacent pixel electrodes belonging to the different pixel electrode groups (i.e., the mutually adjacent pixel electrodes where inverse polarity potential is applied).

Now, with an aspect of the present invention, particularly, at least one of the data lines and shielding layer includes an overhanging portion overhanging following the scanning line from the main line portion extending intersecting over the scanning lines. Protrusions are formed on the base surface of the pixel electrodes at the regions which are gaps between adjacent pixel electrodes across the scanning lines when viewed in planar fashion, according to the existence of the overhanging portions. That is to say, the base surfaces of the pixel electrodes are surfaces where protrusions of a predetermined height and shape are aggressively formed.

As a result, firstly, forming the edges of the pixel electrodes so as to be positioned above the protrusions means that the perpendicular field occurring between the pixel electrodes and the facing electrode is relatively intensified as to the in-plane field occurring between the adjacent pixel electrodes (particularly, the pixel electrodes belonging to different pixel electrode groups). That is to say, generally, the shorter the distance between electrodes is, the stronger electric fields are, so the edge portions of the pixel electrodes are closer to the facing electrode by an amount corresponding to the height of the protrusion, so the perpendicular field generated between these is intensified. Secondly, regardless of whether the edges of the pixel electrodes are positioned above the protrusions, the effects of in-plane fields on the electro-optical substance can be reduced by reducing the volume of the electro-optical substance through which the in-plane field passes (by partially replacing with the protrusions), while weakening the in-plane field occurring between the adjacent pixel electrodes (particularly, the pixel electrodes belonging to different pixel electrode groups) according to the permittivity of the protrusions, due to the existence of the protrusions. Accordingly, improper actions of the electro-optical substance due to improper orientation of the liquid crystal owing to in-plane fields accompanying the inversion method can be reduced. At this time, the edge portions of the pixel electrodes may or may not be positioned on the protrusions as described above, and further, may be positioned partway along the inclined or generally vertical sides of the protrusions.

Also, the height and shape of the protrusions can be formed far more precise than with the technique wherein the height of the edges of the pixel electrodes is adjusted, using the existence of other lines and devices positioned below the data lines. With the related art, certain amounts of pattern offsets of each of the multiple films are combined, so forming the height and shape of irregularities on the topmost layer in the final product as designed is basically difficult. Accordingly, improper actions of the electro-optical substance due to improper orientation of the liquid crystal owing to in-plane fields can be ultimately reduced in a sure manner, thereby enhancing device reliability.

In addition, the light shielding film to hide the portions of the electro-optical substance operating incorrectly can be made smaller, so the opening ratio of the pixels can be increased without causing problems in the image such as light passing through and so forth.

As a result, incorrect operations of in-plane fields in the electro-optical substance, such as liquid crystal, can be reduced in a sure manner by forming the protrusions corresponding to the overhanging portions of the data lines, and an electro-optical device, such as a liquid crystal device or the like, which makes high-contrast, bright, and high-quality image display, can be manufactured relatively easily.

Note that the present invention is applicable to transmissive, reflective, and also other various types of electro-optical devices.

With another form of the electro-optical device according to an aspect of the present invention, the pixel electrodes include a first pixel electrode group for inversion driving at a first cycle and a second pixel electrode group for inversion driving at a second cycle complementary to the first cycle, with a plurality thereof being arrayed on a plane; wherein the electro-optical device may include: a facing electrode on a facing substrate disposed facing the substrate, facing the plurality of pixel electrodes; and protrusions formed at regions which are gaps between adjacent pixel electrodes when viewed in planar fashion; and wherein the protrusions are formed of protrusions with gradual surface steps, formed by etching back the surface of the protrusions exposed by removing a smoothed film temporarily formed on the protrusions.

According to this form, in-plane fields occur between adjacent pixel electrodes belonging to different pixel groups, i.e., between adjacent pixel electrodes to which potential of inverse polarity is applied, but protrusions are aggressively formed by etching at the non-opening regions of each pixel or on the edges of the adjacent pixel electrodes. So first, forming the edges of the pixel electrodes so as to be positioned above the protrusions means that the perpendicular field occurring between the pixel electrodes and the facing electrode is relatively intensified as to the in-plane field occurring between the adjacent pixel electrodes. Second, regardless of whether the edges of the pixel electrodes are positioned above the protrusions, the effects of in-plane fields on the electro-optical substance can be reduced by reducing the volume of the electro-optical substance, through which the in-plane field passes, while weakening the in-plane field occurring between the adjacent pixel electrodes according to the permittivity of the protrusions, due to the existence of the protrusions. Accordingly, improper actions of the electro-optical substance due to improper orientation of the liquid crystal owing to in-plane fields accompanying the inversion method, can be reduced. At this time, the edge portions of the pixel electrodes may or may not be position on the protrusions, and further, may be positioned partway along the inclined or generally vertical sides of the protrusions.

In addition, the light shielding film to hide the portions of the electro-optical substance operating incorrectly can be made smaller, so the opening ratio of the pixels can be increased without causing problems in the image, such as light passing through and so forth.

Particularly with the an aspect of present invention, protrusions with gradual steps are formed, so improper actions of the electro-optical substance, such as improper orientation of the liquid crystal or the like due to the steps near the protrusion can be effectively prevented beforehand. In particular, in the event of subjecting an orientation film formed on pixel electrodes to rubbing processing, the rubbing can be suitably performed with relative ease and without irregularities if the steps of the protrusions are smooth, so improper operation of the electro-optical substance, such as gradual orientation of the liquid crystal, can be prevented beforehand in an extremely effective manner.

As a result, incorrect operations of in-plane fields in the electro-optical substance, such as liquid crystal, can be reduced in a sure manner by forming the protrusions, and moreover incorrect operations due to the steps on the electro-optical substance, such as liquid crystal due to forming the protrusions, can be suppressed by the gradual steps. So an electro-optical device, such as a liquid crystal device or the like, which makes high-contrast, bright, and high-quality image display, can be realized.

With another form of the electro-optical device according to the present invention, the pixel electrodes include a first pixel electrode group for inversion driving at a first cycle and a second pixel electrode group for inversion driving at a second cycle complementary to the first cycle, with a plurality thereof being arrayed on a plane; wherein the electro-optical device may include: a facing electrode on a facing substrate disposed facing the substrate, facing the plurality of pixel electrodes; and a protrusion pattern formed below the pixel electrodes and of the same layer as at least one of the data lines and the shielding layer, in order to form protrusions at regions which are gaps between adjacent pixel electrodes when viewed in planar fashion.

With this form, a protrusion pattern is formed below the pixel electrodes and of the same layer as at least one of the data lines and the shielding layer, thereby forming protrusions such as described above. Now, the "protrusion pattern" can be formed so as to have a shape which is not continuous in a planar manner with at least one of the data lines and the shielding layer, and in this case, this arrangement is characteristic in this point as compared with the above-described "overhanging portions". With this form in a case wherein the protrusion pattern is not formed of the same layer as the data lines in particular, the protrusion pattern is not electrically connected to the data lines, and the potential of these two is generally different, so parasitic capacitor between the protrusion pattern and the scanning lines can be reduced.

This form, wherein these protrusions are formed in particular, includes: protrusions formed at regions which are gaps between adjacent pixel electrodes when viewed in planar fashion due to the height of at least one of the data lines, the shielding layer, the overhanging portion, and the protrusion pattern; and a light shielding film wider than at least one of the line widths, so as to follow the first direction or the second direction.

According to such a configuration, light shielding film wider than at least one of the line widths of the data lines, the shielding layer, the overhanging portion, and the protrusion pattern, is provided, so even in the event that light leakage occurs due to improper orientation owing to protrusions formed according to at least one of these, the progress of the light is shielded by the light shielding film, so the probability of adverse effects on the image can be reduced.

Now, while various forms may be made with the present invention as described above, with the forms of the present invention described above, basically, one form may be freely combined with another form regardless of the reference to the claims described in the Claims. However, there are cases wherein such combinations are incompatible, due to the nature of the arrangements. An example is combining the form of performing the aforementioned smoothing processing on the surface of the inter-layer insulating film where contact holes are formed, with the form wherein a film formed of titanium or the like is formed on the inner surface of contact holes to achieve electrical connection with pixel electrodes. Of course, an electro-optical device having three or more forms together may be configured, as well.

Also, the electro-optical device according to an aspect the present invention includes: data lines extending in a first direction above a substrate; scanning lines extending in a second direction intersecting the data lines; pixel electrodes and thin-film transistors arrayed so as to correspond to intersection regions of the data lines and the scanning lines; capacitors formed at a layer higher than the semiconductor layer of the thin-film transistors and at a layer lower than the pixel electrodes, and electrically connected to pixel potential; a shielding layer positioned between the data lines and the pixel electrodes; and a lower light shielding film formed at a layer lower than the semiconductor layer of the thin-film transistors. The lower light shielding film preferably defines at least the corners of pixel opening regions, with the scanning lines, the data lines, the capacitors, and the shielding layer, being formed in the light shielded region.

Also, as a form of the present invention, the shielding layer preferably has light shielding capabilities.

In order to solve the above objects, an electronic apparatus according to an aspect of the present invention has the electro-optical device according to an aspect of the present invention described above. This also includes various forms thereof.

The electronic apparatus according to the present invention has the electro-optical device according to the present invention described above, and accordingly, due to a high opening ratio and high contrast being achieved, various types of electronic apparatuses, such as projection type display apparatuses, liquid crystal televisions, cellular telephones, palmtops, word processors, viewfinder-type or monitor-viewed type video tape recorders, workstations, television telephones, POS terminals, touch panels, and so forth, capable of displaying images with higher quality, can be realized.

Further operations and advantages of the present invention will become more fully apparent from the following description of the exemplary embodiments.

DETAILED DESCRIPTION OF PREFERRED EMBODIMENTS

The following is a description of the exemplary embodiments of the present invention with reference to the drawings. The following exemplary embodiments are applications of the electro-optical device according to an aspect of the present invention to a liquid crystal device.

First Exemplary Embodiment

Figure 1:
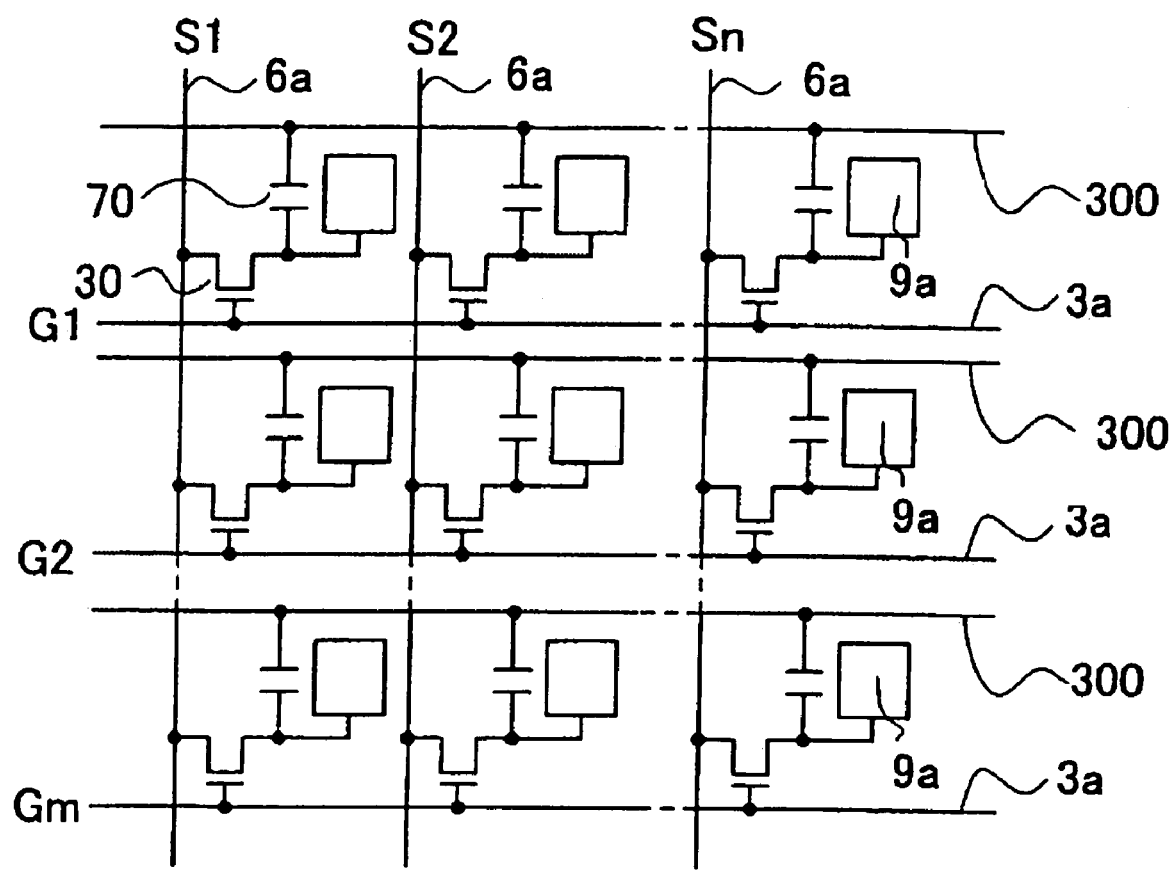
FIG. 1 is a circuit schematic illustrating an equivalency circuit of various devices, lines, etc., provided on multiple pixels in matrix fashion making up an image display region in an electro-optical device according to a first exemplary embodiment of the present invention.
Figure 2:
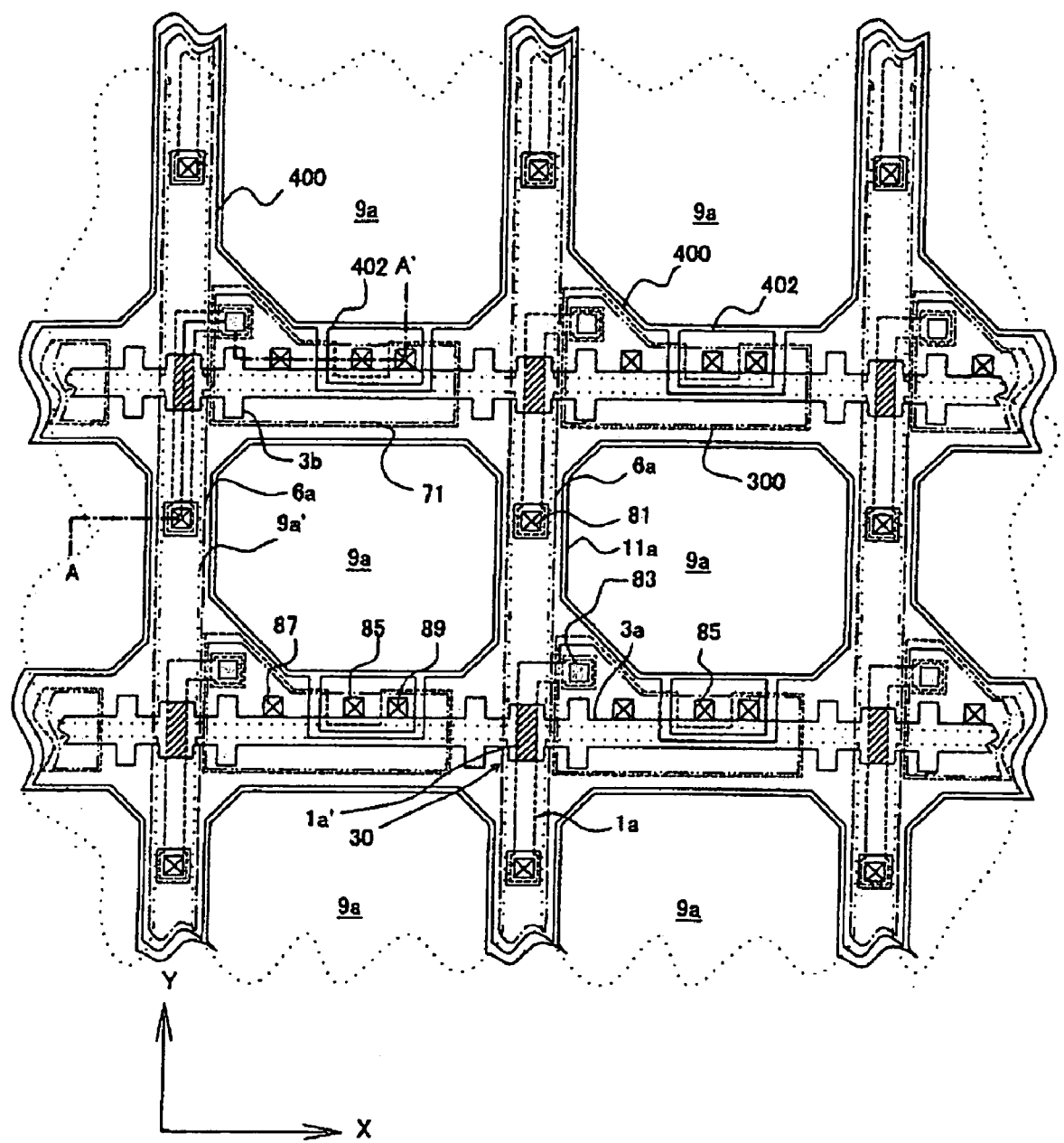
FIG. 2 is a plan view of a pixel group of multiple adjacent pixels on a TFT array substrate where data lines, scanning lines, pixel electrodes, etc., are formed in the an electro-optical device according to the first exemplary embodiment of the present invention.
Figure 3:
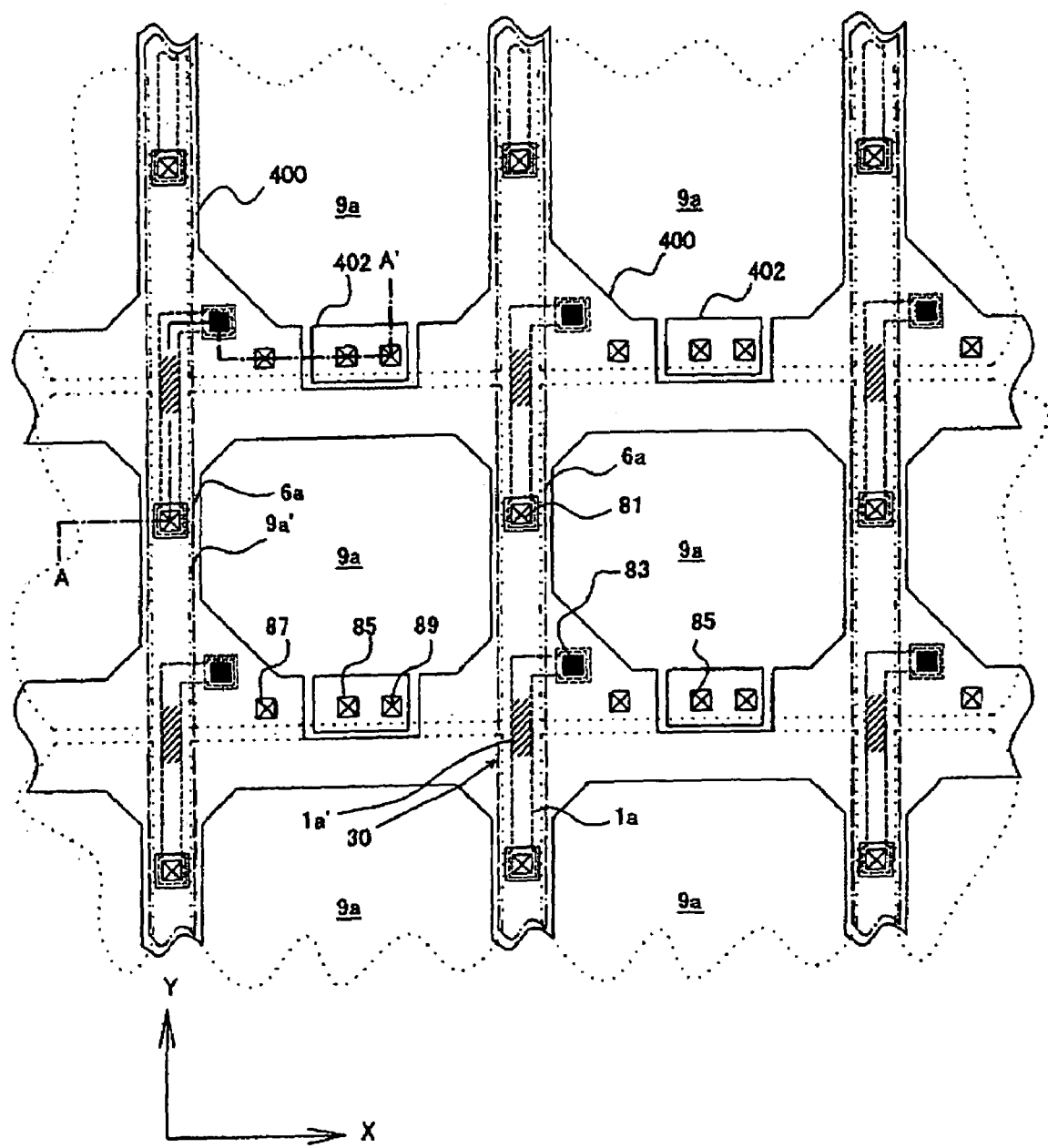
FIG. 3 is a plan view showing only the principal portions in FIG. 2.
Figure 4:
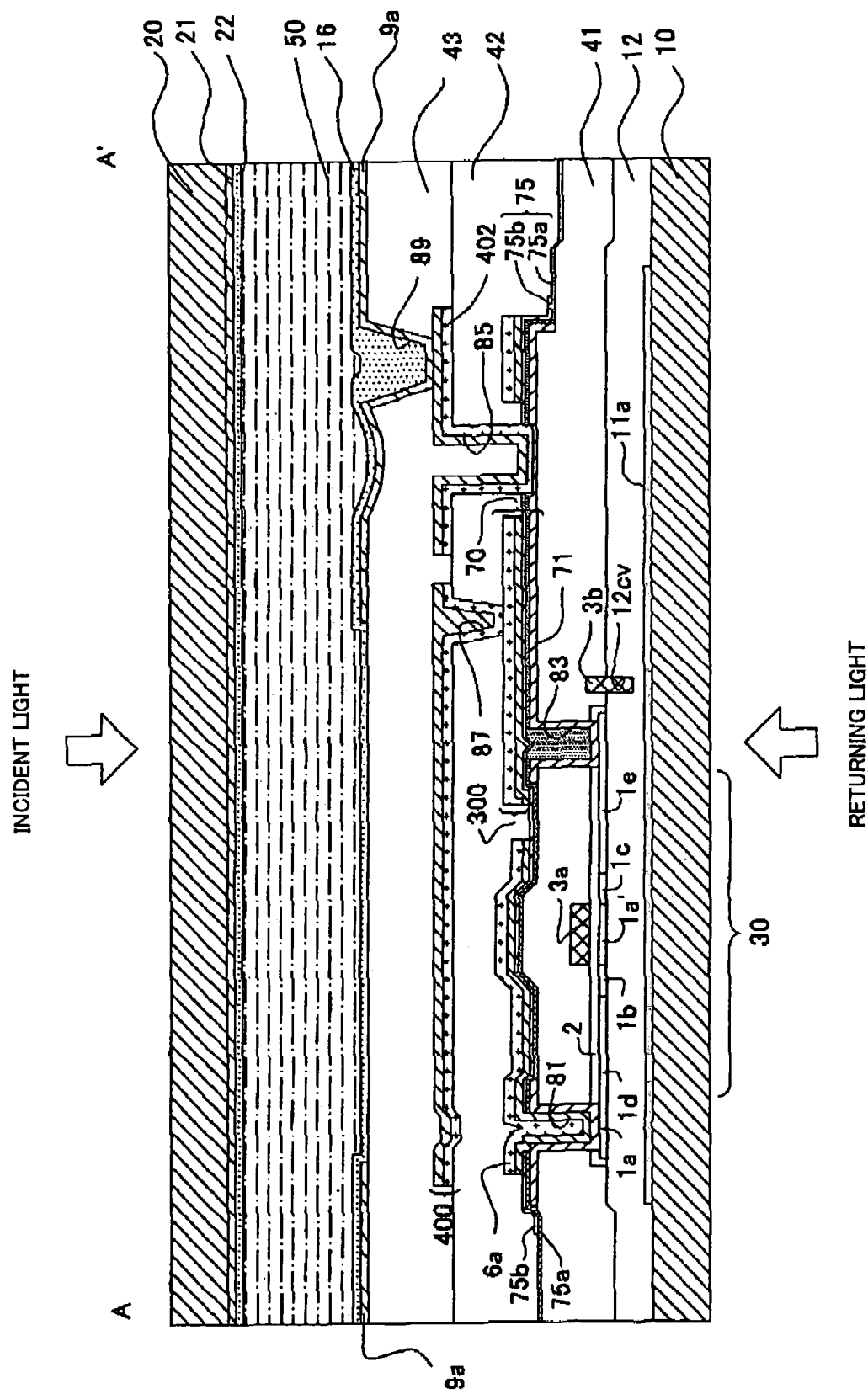
FIG. 4 is a cross-sectional view along plane A-A' in FIG. 2.

The configuration of the pixel portion of an electro-optical device according to a first exemplary embodiment of the present invention will be described with reference to FIG. 1 through FIG. 4. Now, FIG. 1 is an equivalency circuit of the devices, lines, etc., provided on multiple pixels in matrix fashion making up an image display region in the electro-optical device. FIG. 2 is a plan view of a pixel group of multiple adjacent pixels on a TFT array substrate where data lines, scanning lines, pixel electrodes, etc., are formed. FIG. 3 is a plan view showing only the principal portions in FIG. 2, specifically, principally the data lines, shielding layer, and pixel electrodes, for illustrating the positional relation therebetween. FIG. 4 is a cross-sectional view along plane A-A' in FIG. 2. Now, in FIG. 4, the scale differs for each layer and material, so as to allow the layers and materials to be recognizable in a drawing.

In FIG. 1, the multiple pixels formed in a matrix fashion making up the image display area of the electro-optical device according to the present exemplary embodiment each have a pixel electrode 9a and a TFT 30 for performing switching control of the pixel electrode 9a formed therein, with a data line 6a whereby image signals are supplied being electrically connected to the source of the TFT 30. The image signals S1, S2, ..., Sn, to be written to the data lines 6a may be supplied in this order in line sequence order, or may be supplied to groups of multiple adjacent data lines 6a.

Also, a scanning line 3a is electrically connected to the gate of the TFT 30, and scanning signals G1, G2, ..., Gm are applied in this order in line sequence order to the scanning lines 3a in pulse fashion at a predetermined timing. The pixel electrode 9a is electrically connected to the drain of the TFT 30, and the image signals S1, S2, ..., Sn supplied from the data line 6a are written by closing for a predetermined period the switch of the TFT 30, which is a switching device, by a predetermined timing.

The image signals S1, S2, ..., Sn of a predetermined level which are written to the liquid crystal, which is an example of the electro-optical substance, via the pixel electrode 9a, are held between there and the facing electrode formed on the opposing substrate, for a predetermined period. The liquid crystal modulates light by changing the orientation and order of molecule clusters by the voltage level applied thereto, thus enabling gradient display. In the normally-white mode, the transmissivity as to the incident light decreases in accordance with the voltage applied in increments of individual pixels. In the normally-black mode, the transmissivity as to the incident light increases in accordance with the voltage applied in increments of individual pixels. Overall light having contrast corresponding to the image signals is output from the electro-optical device.

In order to reduce or prevent image signals held here from leaking, an accumulation capacitor 70 is added in parallel with the liquid crystal capacitor formed between the pixel electrode 9a and the facing electrode. This accumulation capacitor 70 includes a capacitor electrode 300 which is provided in parallel with the scanning line 3a and includes a fixed-potential-side capacitor electrode, and also is fixed at a constant potential.

The following is a description of an actual configuration of an electro-optical device wherein the above-described circuit operations with the data lines 6a, scanning lines 3a, TFTs 30, and so forth, are realized, with reference to FIG. 2 through FIG. 4.

First, in FIG. 2, multiple pixel electrodes 9a are provided on a TFT array substrate 10 in matrix fashion (the dotted lines 9a' show the outlines), and data lines 6a and scanning lines 3a are provided along each of the vertical and horizontal boundaries of the pixel electrodes 9a. The data lines 6a are of a layered structure including an aluminum film or the like as describe layer, and the scanning lines 3a are of an electroconductive polysilicon film or the like, for example. Also, the scanning lines 3a are disposed so as to face channel regions 1a' indicated by the upper-right-to-lower-left-hatched areas of a semiconductor layer 1a in the drawings, and the scanning lines 3a serve as gate electrodes. That is to say, at each portion where the scanning lines 3a and the data lines 6a intersect, a TFT 30 for pixel switching is disposed facing the main line portion of the scanning line 3a serving as the gate electrode at the channel region 1a'.

Next, as shown in FIG. 4 which is a cross-sectional view along plane A-A' in FIG. 2, the electro-optical device has a TFT array substrate 10 formed of, for example, a quartz substrate, glass substrate, silicon substrate, or the like, and a facing substrate 20 facing this, formed of, for example, a glass substrate or a quartz substrate.

As shown in FIG. 4, the pixel electrode 9a is formed on the TFT array substrate 10 side, above which is disposed an orientation film 16 subjected to predetermined orientation processing, such as rubbing processing or the like. The pixel electrode 9a is formed of a transparent electroconductive film such as, for example, ITO film or the like. On the other hand, a facing electrode 21 is formed over the entire face of the facing substrate 20 side, below which is disposed an orientation film 22 subjected to predetermined orientation processing, such as rubbing processing or the like. Of these, the facing electrode 21 is formed of a transparent electroconductive film such as, for example, ITO film or the like, as with the pixel electrode 9a, and the orientation films 16 and 22 are formed of transparent organic films such as, for example, polyimide film or the like. The electro-optical substance, such as liquid crystal or the like, is sealed in a space between the TFT array substrate 10 and the facing substrate 20 facing one another, surrounded by a later-described sealing material (see FIG. 19 and FIG. 20), thereby forming a liquid crystal layer 50. The liquid crystal layer 50 assumes a predetermined orientation state due to the orientation films 16 and 22 in a state wherein no electric field is being applied from the pixel electrode 9a. The liquid crystal layer 50 is made up of an electro-optical substance of one type of nematic liquid crystal, or obtained by mixing multiple types thereof. The sealing material is an adhesive agent made up of light-hardening resin or thermal-hardening resin for example, for gluing the TFT array substrate 10 and the facing substrate 20 together at the perimeters thereof, with spacers of glass fiber, glass beads or the like mixed therein to fix the distance between the substrates.

On the other hand, in addition to the pixel electrode 9a and the orientation film 16, various configurations including these are provided on the TFT array substrate 10 as a layered structure. The layer structure is made up of a first layer including a lower light shielding film 11a, a second layer including the TFT 30 and scanning line 3a and the like, a third layer including the accumulation capacitor 70 and the data line 6a and the like, a fourth layer including the shielding layer 400 and the like, and a fifth layer (uppermost layer) including the pixel electrode 9a and the orientation film 16 and the like, in that order on the TFT array substrate 10, as shown in FIG. 4. Also, a base insulating film 12 is provided between the first layer and the second layer, a first inter-layer insulating film 41 is provided between the second layer and the third layer, a second inter-layer insulating film 42 is provided between the third layer and the fourth layer, and a third inter-layer insulating film 43 is provided between the fourth layer and the fifth layer, thereby reducing preventing the components described above from short-circuiting. Also, the insulating films 12, 41, 42, and 43 also have contact holes and the like to electrically connect the high-concentration source region 1d within the semiconductor layer 1a for the TFT 30 and the data line 6a, for example. These components will now be described, in order from the bottom up.

First, the first layer includes a lower light-shielding film 11a formed of single metals, alloys, metal silicides, polysilicides, layered structures thereof, or the like, including at least one of, for example, Ti (titanium), Cr (chromium), W (tungsten), Ta (tantalum), Mo (molybdenum), and other like high-melting-point metals. The lower light-shielding film 11a is patterned in a grid shape in plan view, thereby defining the opening regions of the pixels (see FIG. 2). In the regions of the lower light-shielding film 11a where the scanning lines 3a and data lines 6a intersect, regions protruding so as to round off the corners of the pixel electrodes 9a are formed. The lower light-shielding film 11a is formed so as to cover the TFTs 30, scanning lines 3a, data lines 6a, accumulation capacities 70, and later-described third relay layer 402, when viewed from below. Also, the lower light-shielding film 11a is preferably extended from the image display region to the perimeter thereof and connected to a constant potential source, in order to avoid the potential fluctuation thereof from adversely affecting the TFTs 30.

Next, the TFTs 30 and the scanning lines 3a are formed as the second layer. As shown in FIG. 4, the TFT 30 has an LDD (Lightly Doped Drain) structure, with the components thereof being a scanning line 3a functioning as a gate electrode as described above, a channel region 1a' of the semiconductor layer 1a formed of polysilicon for example, where a channel is formed by an electrical field from the scanning line 3a, an insulating film 2 including a gate insulating film for insulating the scanning line 3a and the semiconductor layer 1a, and, a low-concentration source region 1b and low-concentration drain region 1c and high-concentration source region 1d and high-concentration drain region 1e in the semiconductor layer 1a.

Note that while the TFT 30 preferably has an LDD structure, as shown in FIG. 4, this may be an offset structure wherein the low-concentration source region 1b and low-concentration drain region 1c are not doped with impurities, or may be a self-aligned TFT wherein the gate electrode formed of part of the scanning line 3a is masked and doped with impurities at a high concentration, so as to form a high-concentration source region and a high-concentration drain region in a self-aligning manner. Also, while the present exemplary embodiment has the gate electrode of the pixel switching TFT 30 as being a single gate structure with only one disposed between the high-concentration source region 1d and high-concentration drain region 1e, two or more gate electrodes may be disposed therebetween. Such a dual gate or triple gate or more TFT configuration allows leak current at the junction between the channel and source and drain region to be reduced or prevented, thereby reducing current when off. Further, the semiconductor layer 1a for configuring the TFT 30 may be either a non-mono-crystalline layer or a mono-crystalline layer. Known methods, such as the composite method, may be used for forming a mono-crystalline layer. Forming the semiconductor layer 1a of a mono-crystalline layer particularly increases the capabilities of peripheral circuits.

The base insulating film 12 is provided above the lower light-shielding film 11a and below the TFTs 30, made up of a silicon oxide film, for example. The base insulating film 12 functions to insulate the TFTs 30 from the lower light-shielding film 11a, and also functions to prevent changes in the properties of the pixel switching TFTs 30 due to coarseness in the time of polishing the surface of the TFT array substrate 10 and foreign material left over after cleaning, due to being formed on the entire face of the TFT array substrate 10.

Particularly, with the present exemplary embodiment, the base insulating film 12 has grooves 12cv dug on both sides of the semiconductor layer 1a when viewed in planar fashion, with the same width as the channel length or longer than the channel length (grooves formed in contact hole forms), so that the scanning lines 3a formed above corresponding to the grooves 12cv have portions formed in downward recessed shapes (omitted in FIG. 2 to avoid complication). Also, due to the entire scanning lines 3a being formed so as to fill in the grooves 12cv, the scanning lines 3a have horizontal protruding portions 3b formed integrally therewith. Thus, the semiconductor layer 1a of the TFTs 30 is covered when viewed from the side, as can be well understood from FIG. 2, so that incident light from at least this portion is suppressed. Note that the horizontal protruding portions 3b only need to be formed on one side of the semiconductor layer 1a.

Now, following the second layer, provided on the third layer are the accumulation capacities 70 and data lines 6a. An accumulation capacitor 70 is formed by the first relay layer 71 serving as the pixel-electrode-side capacitor electrode electrically connected to the high-concentration drain region 1e of the TFT 30 and the pixel electrode 9a, and a capacitor electrode 300 serving as a fixed-potential-side capacitor electrode, being disposed facing one another across a dielectric film 75. The accumulation capacities 70 enable the potential holding properties in the pixel electrodes 9a to be markedly improved. Also, as can be understood from the plan view in FIG. 2, the accumulation capacities 70 according to the present exemplary embodiment are formed so as not to reach the light transmission regions approximately corresponding to the formation regions of the pixel electrodes 9a, so, in other words, are formed so as to fit in the light-shielding regions. That is, the accumulation capacities 70 are formed at regions overlapping scanning lines 3a between adjacent data lines 6a, and at regions where the lower light shielding film 11 rounds off the corners of the pixel electrodes 9a at the corners where the scanning lines 3a and data lines 6a intersect. Thus, the pixel opening ratio is maintained relatively great on the entire electro-optical device, thereby enabling brighter images to be displayed.

In further detail, the first relay layer 71 is formed of an electroconductive polysilicon film having light-absorbing properties for example, and functions as a pixel-potential-side capacitor electrode. Note however, that the first relay layer 71 may be formed of a single-layer or multi-layer film including metals or alloys. In the case of a multi-layer film, the lower layer is preferably a light-absorbing electroconductive polysilicon film, and the upper layer a metal or alloy which reflects light. Also, in addition to functioning as a pixel-potential-side capacitor electrode, the first relay layer 71 also functions to relay and connect the pixel electrodes 9a and the high-concentration drain region 1e of the TFTs 30, via contact holes 83, 85, and 89. As shown in FIG. 2, the first relay layer 71 is formed with generally the same planar shape as the later-described capacitor electrodes 300.

The capacitor electrodes 300 function as pixel-potential-side capacitor electrodes for the accumulation capacitor 70. In the first exemplary embodiment, the capacitor electrodes 300 are given a fixed potential by an electrical connection with the shielding layer 400 given a fixed potential, via the contact hole 87.

However, as described later, in the event that the capacitor electrodes 300 and the data lines 6a are to be formed as separate layers, the capacitor electrodes 300 may be maintained at a fixed potential by preferably, for example, extending the capacitor electrodes 300 from the image display regions 10a where the pixel electrodes 9a are disposed to the perimeter thereof, and electrically connected to a constant potential source, or the like. Note that the "constant potential source" here may be a positive or negative constant potential source supplied to a data line driving circuit 101, or may be a constant potential source supplied to the facing electrode 21 of the facing substrate 20.

Particularly with the present exemplary embodiment, the data lines 6a are formed of the same film as the capacitor electrodes 300. Note that "same film" as used here means formed as the same layer or formed at the same time on the manufacturing process. However, the capacitor electrodes 300 and the data lines 6a are not continuously formed in planar fashion, but rather divided by patterning.

Specifically, as shown in FIG. 2, the capacitor electrodes 300 are formed so as to overlay the formation area of the scanning lines 3a, i.e., divided following the X direction in the figure, and the data lines 6a are formed so as to overlay the longitudinal direction of the semiconductor layer 1a, i.e., extending following the Y direction in the figure. More specifically, the capacitor electrodes 300 have a main line portion extending following the scanning lines 3a, a protrusion protruding upward in the figure following the semiconductor layer 1a and the region adjacent to the semiconductor layer 1a (the portion appearing as a trapezoid in the figure) in FIG. 2, and a bound portion wherein the place corresponding to the later-described contact hole 85 is slightly bound. Of these, the protrusion greatly contributes to increasing of the formation area of the accumulation capacitor 70.

On the other hand, the data lines 6a have main line portions linearly extending in the Y direction in FIG. 2. Note that the high-concentration drain region 1e of the semiconductor layer 1a at the upper edge in FIG. 2 has a shape that is bent 90° to the right so as to overlay the region of the protrusion of the accumulation capacitor 70. The reason for this is to avoid the data line 6a and electrically connect the semiconductor layer 1a and the accumulation capacitor 70 (see FIG. 4). Also note that the lower light shielding layer 11 exists at the formation region of the contact hole 83 electrically connecting the semiconductor layer 1a and the first relay layer 71 of the accumulation capacitor 70.

With the present exemplary embodiment, patterning and the like is performed so as to yield the above shapes, thereby forming the capacitor electrodes 300 and the data lines 6a at the same time.

Also, as shown in FIG. 4, the capacitor electrodes 300 and the data lines 6a are formed as a film having a two-layer structure with an electroconductive polysilicon layer for the lower layer and an aluminum layer for the upper layer. Of these, the data lines 6a are electrically connected with the semiconductor layer 1a of the TFTs 30 via contact holes 81 passing through the openings of later-described dielectric film 75, so due to the data lines having the two-layered structure, such as described above, and the first relay layer 71 described above being formed of the electroconductive polysilicon film, the electric connection between the data lines 6a and the semiconductor layer 1a is directly realized by the electroconductive polysilicon film. That is to say, the order of the layers are, from the bottom up, the first relay layer polysilicon film, the polysilicon film which is the lower layer of the data line 6a, and the aluminum film which is the upper layer thereof. Accordingly, the electrical connection therebetween can be maintained satisfactorily. While the data lines 6a and the capacitor lines 300 are of a two-layer structure of the electroconductive polysilicon layer and aluminum layer in the present exemplary embodiment, a three-layer structure having an electroconductive polysilicon layer, aluminum layer, and titanium nitride layer, from the bottom up, may be used.

According to this configuration, the titanium nitride layer serves as a barrier metal to reduce or prevent etching through at the time of opening the contact hole 87. Also, the capacitor electrodes 300 and the data lines 6a include aluminum with relatively excellent light reflecting capabilities, and also include polysilicon with relatively excellent light absorbing properties, and accordingly function as a light shielding layer. That is to say, intrusion of incident light (see FIG. 4) to the semiconductor layer 1a of the TFT 30 can be reduced or prevented at the upper side thereof by these.

As shown in FIG. 4, the dielectric layer 75 is formed of a silicone oxide film such as a HTO (High Temperature Oxide) film or LTO (Low Temperature Oxide) film, or a silicon nitride film or the like, with a relatively thin thickness around 5 to 200 nm, for example. From the perspective of increasing the accumulation capacitor 70, the thinner the dielectric layer 75 is, the better, so long as the reliability of the film is sufficiently secured. Particularly with the present exemplary embodiment, as shown in FIG. 4, the dielectric layer 75 is of a two-layer structure having a silicon oxide film 75a as the lower layer and a silicon nitride film 75b as the upper layer thereof The silicon nitride film 75b which is the upper layer is patterned so as to be contained within the light shielded region (non-opening region). Thus, due to the silicon nitride film 75b with a relatively great permittivity existing here, the capacitor value of the accumulation capacitor 70 can be increased, and further notwithstanding, the voltage withstanding capabilities of the accumulation capacitor 70 are not reduced due to the presence of the silicon oxide film 75a. Thus, forming the dielectric film 75 as a two-layered structure allows two contradicting advantages to be both obtained. Also, the silicon nitride film 75b is patterned so as not to be formed in regions where light passes through since the silicon nitride film 75b has light coloring properties, thereby reducing or preventing deterioration of transmissivity. Also, intrusion of water to the TFTs 30 can be reduced or prevented by the presence of the silicon nitride film 75b. Thus, with the present exemplary embodiment, the device can be used for a relatively long time without leading to a situation wherein the threshold voltage at the TFTs 30 increases. Note that while the dielectric film 75 is a two-layered structure in the present exemplary embodiment, arrangements may be made depending on the situation such as a three-layered structure of a silicon oxide film, a silicon nitride film, and a silicon oxide film, for example, or layered structures of more layers.

A first inter-layer insulating film 41 is formed above the above-described TFTs 30 and scanning lines 3a, and below the accumulation capacitor 70 and data lines 6a, being formed of, for example, NSG (non-silicate glass), PSG (phosphorus silicate glass), BSG (boron silicate glass), BPSG (boron-phosphorus silicate glass), or other silicate glass film, silicon nitride film or silicon oxide film or the like, or preferably, NSG A contact hole 81 to electrically connect the high-concentration source region 1d of the TFT 30 and the data line 6a is opened in this first inter-layer insulating film 41. Also, a contact hole 83 to electrically connect the high-concentration drain region 1e of the TFT 30 and the first relay layer 71 making up the accumulation capacitor 70 is opened in this first inter-layer insulating film 41.

Of these two contact holes, at the formation portion of the contact hole 81 the dielectric film 75 is not formed, in other words, an opening is formed in the dielectric film 75. This is due to the need to achieve electric conduction between the high-concentration source region 1b and the data line 6a through the first relay layer 71 at the contact hole 81. Moreover, providing such an opening in the dielectric film 75 enables an advantage to be obtained wherein the hydrogen used to hydrogenate the semiconductor layer 1a of the TFT 30 can be made to readily reach the semiconductor layer 1a through the opening portion.

Also, with the present exemplary embodiment, the first inter-layer insulating film 41 may be subjected to activation of ions injected into the polysilicon film making up the semiconductor layer 1a and the scanning lines 3a, by baking at approximately 1000° C.

Now, following the above-described third layer, a light-shielding shielding layer 400 is formed at the fourth layer. Viewed in planar fashion, the shielding layer 400 is formed on a grid shape extending in the X direction and the Y direction in FIG. 2, as shown in FIG. 2 and FIG. 3. Of the shielding layer 400, the portions extending in the Y direction in FIG. 2 in particular, are formed so as to cover the data lines 6a and so as to be wider than the data lines 6a. Also, the portions extending in the X direction in FIG. 2 have notches at the center area of one side of the pixel electrodes 9a, in order to secure the area to form the later-described third relay electrodes 402. Further, generally triangular shapes are provided corresponding to the protrusion with a generally trapezoid shape of the above-described capacitor electrodes 300, at the corner portions at the intersections of the shielding layer 400 extending in the X and Y directions in FIG. 2. The shielding layer 400 may be the same width as the lower light shielding film 11a or wider than or narrower than the lower light shielding film 11a. However, this is formed so as to cover the TFTs 30, scanning lines 3a, data lines 6a, and accumulation capacities 70, excluding the third relay electrodes 402, when viewed from above. The shielding layer 400 and the lower light shielding film 11 define the corner portions of the pixel opening regions, i.e., the four corner portions, and the sides of the pixel opening regions.

The shielding layer 400 is extended from the image display region 10a where the pixel electrodes 9a are disposed to the perimeter thereof, and is electrically connected with a constant potential source, so as to be set at a fixed potential. Note that the "constant potential source" here may be a positive or negative constant potential source supplied to a data line driving circuit 101, or may be a constant potential source supplied to the facing electrode 21 of the facing substrate 20.

Thus, with the shielding layer 400 formed so as to cover the entirety of the data lines 6a (see FIG. 3) and set to a constant potential, the effects of capacitor coupling between the data lines 6a and the pixel electrodes 9a can be eliminated. That is, a situation wherein the potential of the pixel electrodes 9a changes due to supply of electricity to the data lines 6a can be reduced or prevented beforehand, and the probability of display irregularities occurring on the display image following the data lines 6a can be reduced. Also, in the present exemplary embodiment, the shielding layer 400 is formed in a grid shape, so unnecessary capacitor coupling can be reduced or prevented at the portions where the scanning lines 3a are extended. Also, the effects of capacitor coupling occurring between the capacitor electrodes 300 and the pixel electrodes 9a can be reduced or eliminated for the above-described triangular portion at the shielding layer 400, whereby generally the same advantages as those described above can be obtained.

Also, a third relay layer 402 which is an example of a "relay layer" as so called in the present invention, is formed in the fourth layer with the same film as such a shielding layer 400. The third relay layer 402 functions to electrically connect the first relay layer 71 making up the accumulation capacitor 70 and the pixel electrodes 9a, via the later-described contact hole 89. Note that the shielding layer 400 and the third relay layer 402 are not formed in a continuous planar manner, but are divided by patterning, as with the above-described capacitor electrodes 300 and data lines 6a.

On the other hand, the shielding layer 400 and the third relay layer 402 have a two-layered structure of a lower layer formed of aluminum and an upper layer formed of titanium nitride. Due to this, firstly, the titanium nitride is expected to act as a barrier metal for preventing etching through at the time of opening the contact hole 89. Also, at the third relay layer 402, the lower layer formed of aluminum is connected to the first relay layer 71 making up the accumulation capacitor 70, and the upper layer formed of titanium nitride is connected to the pixel electrodes 9a formed of ITO or the like. In this case, the connection of the later is particularly superb. From this perspective, this is markedly in contrast with a case wherein aluminum and ITO are directly connected, which causes electrolytic corrosion to occur between the two, and the desired electrical connection cannot be realized due to aluminum lines breaking or insulation due to formation of alumina, or the like. Thus, with the present exemplary embodiment, superb electrical connection between the third relay layer 402 and the pixel electrodes 9a can be realized, whereby application of voltage to the pixel electrodes 9a or potential holding properties at the pixel electrodes 9a can be suitably maintained.

Further, the shielding layer 400 and the third relay layer 402 include aluminum which has relatively excellent light reflecting properties, and also include titanium nitride which has relatively excellent light absorbing properties, and accordingly can function as a light shielding layer. That is to say, intrusion of incident light (see FIG. 2) to the semiconductor layer 1a of the TFTs 30 can be reduced or prevented at the upper side thereof by these. As already described, this can be said for the above-described capacitor electrodes 300 and the data lines 6a, as well. With the present exemplary embodiment, noting the point that the shielding layer 400, third relay layer 402, capacitor electrodes 300, and data lines 6a, form a part of the layered structure built on the TFT array substrate 10, and also make up an upper light shielding film for shielding incoming light to the TFTs 30 from above, or, an "upper light shielding film", these can also function as a "built-in light shielding film". According to the concept of the "upper light shielding film" or "built-in light shielding film", the scanning lines 3a and first relay layer 71 can also be considered to be included therein, in addition to the above-described components. Under the widest interpretation thereof, structures formed of non-transparent material formed on the TFT arrays substrate 10 can be called an "upper light shielding film" or "built-in light shielding film".

A second inter-layer insulating film 42 is formed above the above-described data lines 6a and below the shielding layer 400, being formed of, for example, NSG, PSG, BSG, BPSG, or other silicate glass film, silicon nitride film or silicon oxide film or the like, or preferably, NSG A contact hole 87 to electrically connect the shielding layer 400 and the capacitor electrodes 300, and a contact hole 85 to electrically connect the third relay layer 402 and the first relay layer 71, are each opened in this second inter-layer insulating film 42. Note that with the first exemplary embodiment, due to the third relay layer 402 being formed, the electrical connection between the pixel electrodes 9a and the TFTs 30 is carried out through the three contact holes 83, 85, and 89, i.e., through the three inter-layer insulating films 41, 42, and 43. In this way, electrically connecting the pixel electrodes 9a and the TFTs 30 by connecting relatively small contact holes is more advantageous than realizing this through relatively large contact holes in that the electro-optical device can be manufactured at lower costs and with higher reliability, due to the ease of manufacturing the small contact holes.

Also, with regard to the second inter-layer insulating film 42, the stress occurring near the interface of the capacitor electrodes 300 may be relieved by not performing the baking such as described above with regard to the first inter-layer insulating film 41.

Finally, in the fifth layer, the pixel electrodes 9a are formed in matrix fashion as described above, with an orientation film 16 formed on the pixel electrodes 9a. The pixel electrodes 9a may be of a shape wherein the corners thereof have been cut. A third inter-layer insulating film 43 is formed below the pixel electrodes 9a, being formed of, for example, NSG, PSG, BSG, BPSG, or other silicate glass film, silicon nitride film or silicon oxide film or the like, or preferably, BPSG A contact hole 89 to electrically connect the pixel electrodes 9a and the third relay layer 402, is opened in this third inter-layer insulating film 43. Also, with the present exemplary embodiment in particular, the surface of the third inter-layer insulating film 43 has been smoothed by CMP (Chemical Mechanical Smoothing) processing or the like, so as to reduce incorrect orientation of the liquid crystal layer 50 owing to steps of the lines and devices and the like existing below. However, in addition to smoothing processing of the third inter-layer insulating film 43 in this way, an arrangement may be made wherein a groove is dug in at least one of the TFT arrays substrate 10, base insulating film 12, first inter-layer insulating film 41, and second inter-layer insulating film 42, to bury the lines, such as the data lines 6a and the TFTs 30 and the like, thereby carrying out the smoothing processing. Or, smoothing processing may be carried out with the aforementioned grooves alone, without performing smoothing processing of the third inter-layer insulating film 43.

The electro-optical device according to the present exemplary embodiment with a configuration such as described above has the following advantages.

First, with the above-described electro-optical device, the scanning lines 3a and data lines 6a, and the accumulation capacities 70 and the shielding layer 400, are each formed at regions where the pixel electrodes 9a are not formed i.e., light shielding regions in a complementary relation with the formation region of the pixel electrodes 9a (see FIG. 2). Accordingly, a configuration wherein the components of the layered structure do not exist in the formation region of the pixel electrode approximately matching the light transmissive region is realized, so an extremely high opening ratio can be realized and maintained with the electro-optical device according to the present invention.

Moreover, with the present exemplary embodiment, even though the accumulation capacitor 70, shielding layer 400, and the other components are closed up in the light shielding region, as if it were, but there is no particular problem with the operations of the electro-optical device. That is to say, with the accumulation capacitor 70, the dielectric film 75, which is a component thereof, contains a silicon nitride film 75b with a relatively great permittivity, as described above, so sufficient charge accumulation properties can be obtained even in the event that the accumulation capacitor 70 is formed so as to be closed up within the light shielding region, or such that the planar expansion thereof is somewhat restricted. Also, as can be fully understood from FIG. 2, the shielding layer 400 is formed so as to cover at least the data lines 6a, so the data lines 6a and the pixel electrodes 9a never face one another directly, and the advantages of eliminating the effects of capacitor coupling can be sufficiently obtained.

Thus, with the electro-optical device according to an aspect of the present invention, images with higher quality, such as being brighter and so forth, can be displayed, by achieving high opening ratio and high contrast.

Second Embodiment

Case Wherein the Shielding Layer and Data Lines are Formed in Different Layers

Figure 5:
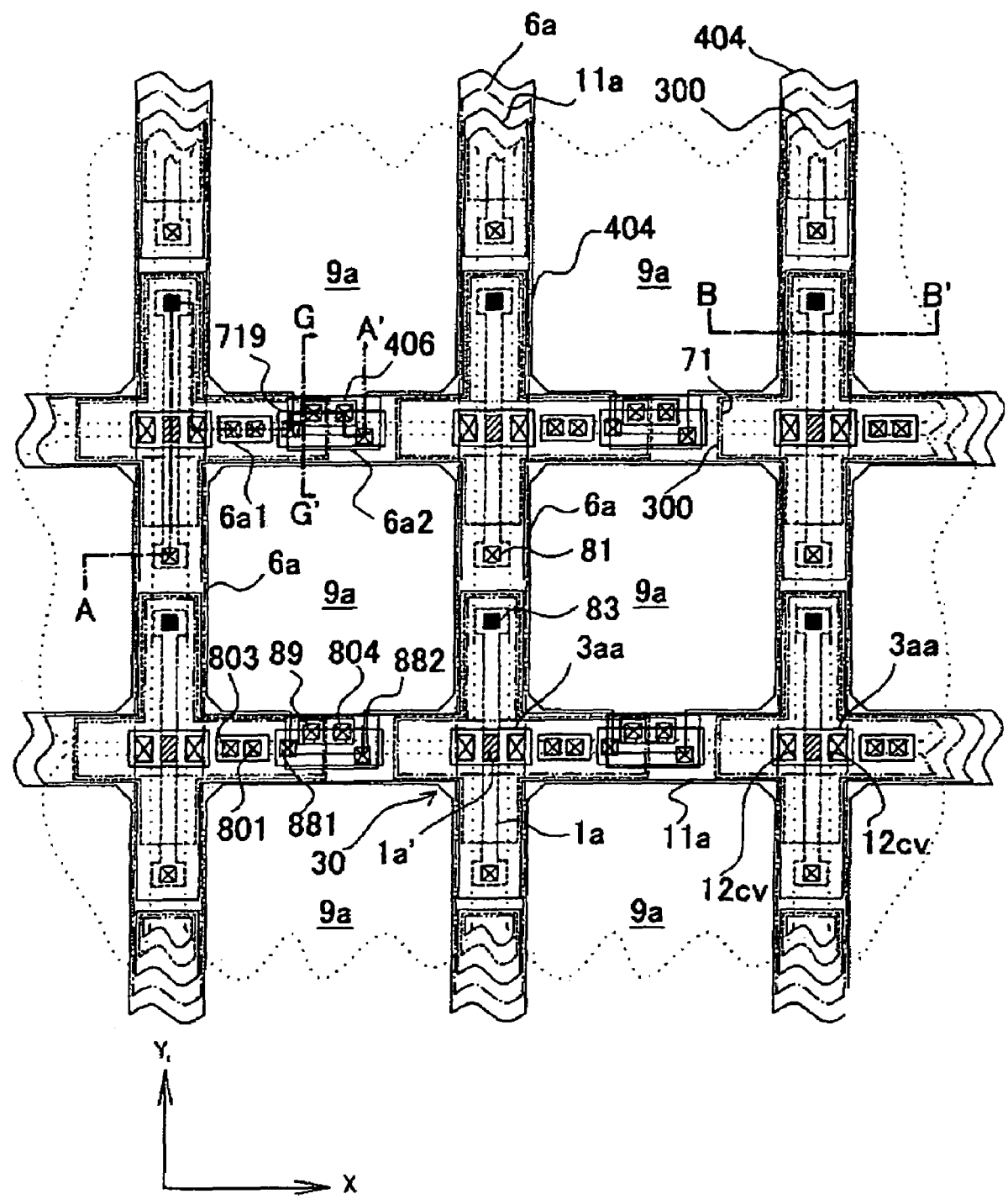
FIG. 5 is a plan view of a pixel group of multiple adjacent pixels on a TFT array substrate where data lines, scanning lines, pixel electrodes, etc., are formed in an electro-optical device according to a second exemplary embodiment of the present invention.
Figure 6:
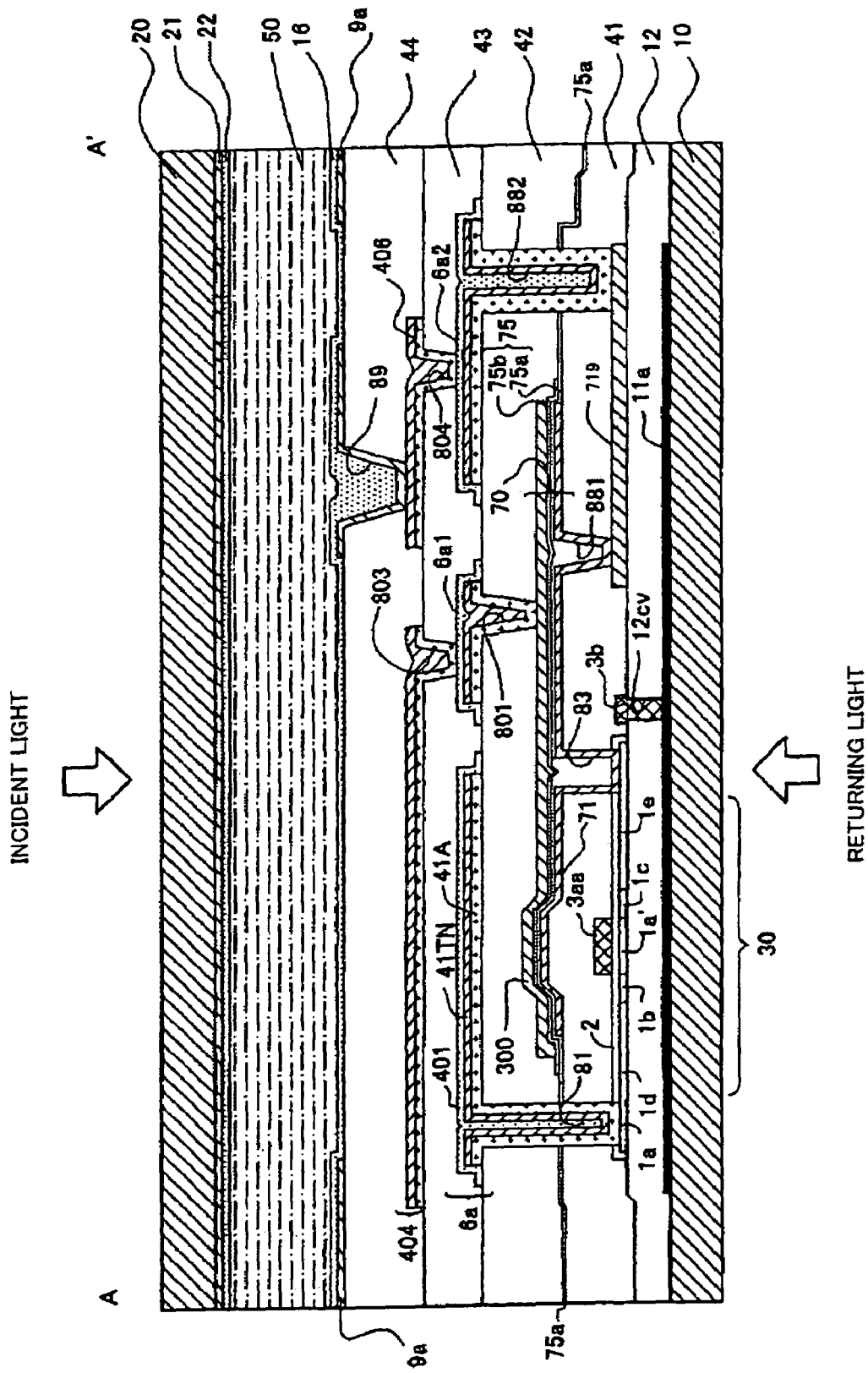
FIG. 6 is a cross-sectional view along plane A-A' in FIG. 5.
Figure 7:
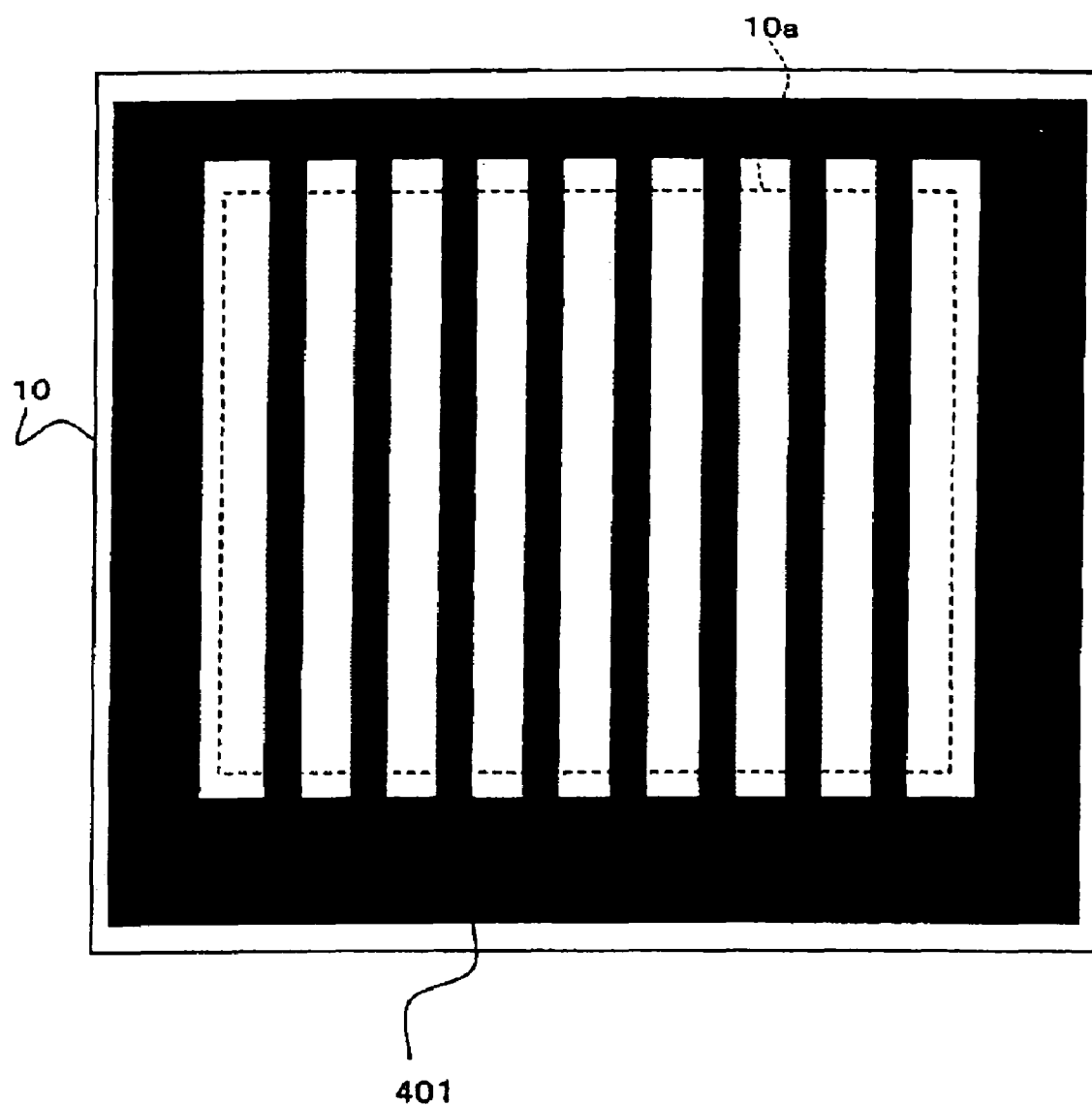
FIG. 7 is a plane view illustrating a nitrized film formation form (on data lines and outside of the image display area)

The following is a description of an electro-optical device according to a second exemplary embodiment of the present invention, with reference to FIG. 5 through FIG. 7. Now, FIG. 5 is a schematic to the same effect as FIG. 2, and is a plan view of a pixel group of multiple adjacent pixels on a TFT array substrate where data lines, scanning lines, pixel electrodes, etc., are formed. FIG. 6 is a schematic to the same effect as FIG. 3, and is a cross-sectional view along plane A-A' in FIG. 5. FIG. 7 is a plan view illustrating a nitrized film form, which is characteristic of the second exemplary embodiment. Note that the electro-optical device according to the second exemplary embodiment has generally the same configuration as the pixel portions of the electro-optical device according to the first exemplary embodiment described above. Accordingly, in the following, description will primarily be made regarding only the characteristic portions of the second exemplary embodiment, and description of the remaining portions will be omitted or simplified as appropriate.

As shown in FIG. 6, the second exemplary embodiment greatly differs from that shown in FIG. 4 in that the capacitor electrodes 300 serving as the upper electrodes making up the accumulation capacitor 70, and the data lines 6a, are not formed on the same film, and accordingly, an inter-layer insulating film is added, that is to say, in that another new layer, a "fourth inter-layer insulating film 44" is provided, and in that a relay electrode 719 is formed with the same film as a gate electrode 3aa. Thus, the arrangement is made up of a first layer including a lower light shielding film 11a serving as a scanning line as well, a second layer including the TFT 30 and the like having the gate electrode 3aa, a third layer including the accumulation capacitor 70, a fourth layer including the data line 6a and the like, and a fifth layer where a shielding layer 404 is formed, and a sixth layer (uppermost layer) including the pixel electrode 9a and the orientation film 16 and the like, in that order on the TFT array substrate 10. Also, a base insulating film 12 is provided between the first layer and the second layer, a first inter-layer insulating film 41 is provided between the second layer and the third layer, a second inter-layer insulating film 42 is provided between the third layer and the fourth layer, a third inter-layer insulating film 43 is provided between the fourth layer and the fifth layer, and a fourth inter-layer insulating film 44 is provided between the fifth layer and the sixth layer, thereby reducing or preventing the components described above from short-circuiting.

Further, instead of the scanning lines 3a being formed on the second layer as with the first exemplary embodiment, gate electrodes 3aa to serve instead of the scanning lines 3a are formed with the second exemplary embodiment, and relay electrodes 719 are newly formed with the same film. The following is a detailed description of the configurations in each layer.

First, in the second layer, gate electrodes 3aa are formed so as to face the channel regions 1a' of the semiconductor layer 1a. The gate electrodes 3aa are not formed linearly as with the scanning lines 3a in the first exemplary embodiment, but rather formed in island fashion corresponding with the semiconductor layer 1a and channel regions 1a' being formed on the TFT array substrate 10 in island fashion. Also, with the second exemplary embodiment, the base of the grooves 12cv forming contact holes have a depth contacting the surface of the lower light shielding film 11a of the first layer, accordingly, and the lower light shielding film 11a is formed in stripes extending in the X direction shown in FIG. 5. Accordingly, the gate electrodes 3aa formed above the grooves 12cv are electrically connected to the lower light shielding film 11a via the grooves 12cv. That is to say, with the second exemplary embodiment, the gate electrode 3aa is arranged such that scan signals are supplied thereto via the lower light shielding film 11a. In other words, the lower light shielding film 11a serves as scanning lines in the second exemplary embodiment.

Now, the lower light shielding film 11a in the second exemplary embodiment has protrusions following the direction in which the data lines 6a extend as shown in FIG. 5. Accordingly, the lower light shielding film 11a of the second exemplary embodiment exhibits light-shielding functions no less than those of the grid-shaped lower light shielding film 11a in the first exemplary embodiment. However the protrusions extending from the adjacent lower light shielding films 11a do not come into contact one with another, and are electrically insulted. Otherwise, the lower light shielding film 11a could not serve as scanning lines. Also, at the regions where the lower light shielding film 11a and the data lines 6a intersect, protrusions are formed so as to round off the corners of the pixel electrodes 9a. The lower light shielding film 11a is formed so as to cover the TFTs 30, scanning lines 3a, data lines 6a, accumulation capacities 70, shielding relay layer 6a1, second relay layer 6a2, and third relay layer 406, when viewed from below.

Particularly with the second exemplary embodiment, relay electrodes 719 are formed on the same film as the above-described gate electrodes 3aa. The relay electrodes 719 are formed in island fashion when viewed in a planar manner, so as to be positioned at generally the center of one side of the pixel electrodes 9a, as shown in FIG. 5. The relay electrodes 719 and the gate electrodes 3aa are formed of the same film, so in the event that the latter is formed of an electroconductive polysilicon film or the like for example, the former is also formed of an electroconductive polysilicon film or the like.

Next, in the third layer, the first relay layer 71 making up the accumulation capacitor 70, the dielectric film 75, and the capacitor electrodes 300, are formed. Of these, the first relay layer 71 is formed of polysilicon. The capacitor electrodes 300 are not formed at the same time with the data lines 6a any more, so there is no need to use a two-layer structure of the aluminum film and the electroconductive polysilicon film, with intent to give consideration to electrical connection between the data lines 6a and the TFTs 30 as with the first exemplary embodiment. Accordingly, as with the light shielding film 11a, the capacitor electrodes 300 should be formed of light shielding materials, such as single metals, alloys, metal silicides, polysilicides, layered structures, or the like, including at least one of, for example, Ti, Cr, W, Ta, Mo, and other like high-melting-point metals. Thus, the capacitor electrodes 300 can exhibit the functions of the above-described "upper light shielding film" or "built-in light shielding film" even better (note later description on materials to configure the capacitor electrodes 300 according to the second exemplary embodiment). Also, due to the same reason, i.e., due to the capacitor electrodes 300 and the data lines 6a being formed in separate layers, there is no need to electrically insulate the two within the same plane with the present exemplary embodiment. Accordingly, the capacitor electrodes 300 can be formed as a part of the capacitor lines extending in the direction of the scanning lines 3a.

The accumulation capacities 70 are formed between the TFTs 30 and the data lines 6a, and accordingly, are formed in cross shapes extending in the extending direction of the scanning lines 3a and the data lines 6a as shown in FIG. 5. Accordingly, the accumulation capacitor can be increased, and due to the capacitor electrodes 300 having light-shielding capabilities, the light shielding capabilities to the TFTs 30 can be heightened. Also, forming the accumulation capacities 70 at the corner portion of the pixel electrodes 6a, where the lower light shielding film 11 and the shielding layer 400 are formed, enables further increased accumulation capacitor and light shielding capabilities.

The first inter-layer insulating film 41 is formed above the gate electrodes 3aa and the relay electrodes 719, and below the accumulation capacities 70, and can be formed of NSG, PSG, BSG, BPSG, or other silicate glass film, or silicon nitride film or silicon oxide film or the like, the same as described above. Also, a contact hole 881 is opened in the first inter-layer insulating film 41, positioned so as to have an electrical connection point with the lower face of the first relay layer 71 shown in FIG. 6. Thus, electrical connection is achieved between the first relay layer 71 and the relay electrodes 719. The first inter-layer insulating film 41 also has contact holes 882 opened to also pass through the later-described second inter-layer insulating film 42, to achieve electrical connection with the later-described second relay layer 6a2.

Also, the data lines 6a on the fourth layer may be formed of single aluminum or of aluminum alloy.

Particularly with the second exemplary embodiment, the data lines 6a configured of aluminum or the like as described above are formed as a film having a three-layer structure of a layer formed of aluminum (see reference numeral 41A), a layer formed of titanium nitride (see reference numeral 41TN), and a layer formed of silicon nitride (see reference numeral 401), in that order from the bottom. The silicon nitride film 401 is patterned to be slightly large, so as to cover the aluminum layer and titanium nitride layer below. Of these, the data lines 6a include aluminum, which is a material with relatively low resistance, so supply of image signals to the TFTs 30 and pixel electrodes 9a can be realized without a problem. However, forming the silicon nitride film with relatively excellent capabilities in reducing or preventing intrusion of moisture on the data lines 6a enhances the humidity withstanding capabilities of the TFTs 30, thereby realizing longer longevity thereof. A plasma silicon nitride film is preferably for the silicon nitride film.

The silicon nitride film 401, or the silicon nitride film 401 according to the present exemplary embodiment, is formed in a box-like shape around the perimeter of the image display region 10a where the pixel electrodes 9a are arrayed in matrix fashion and the data lines 6a and scanning lines 6a are formed weaving between these, besides being formed above the data lines 6a. Note that the titanium nitride film and the silicon nitride film 401 are formed to have a thickness of, for example, around 10 to 100 nm, and more preferably, around 10 to 30 nm.

In the above, the silicon nitride film 401 according to the present exemplary embodiment is formed on the TFT array substrate 10 with an overall shape, such as schematically illustrated in FIG. 7. Note that the silicon nitride film 401 existing on the perimeter of the image display area 10a in FIG. 7 greatly contributes to reduction or prevention of intrusion of moisture to the CMOS (Complementary MOS) TFTs making up a data line drive circuit 101 and a scanning line drive circuit 104 described later (see FIG. 19). However, with regard to nitride, it can be expected that the etching rate in dry etching or the like is smaller for nitrides than other common materials. So in the event that the silicon nitride film 401 is to be formed on the perimeter of the image display area 10a and there is the need to form contact holes in this area, holes should be formed in the silicon nitride film 401 beforehand, corresponding to the position of the contact holes. Performing this at the time of carrying out the patterning shown in FIG. 7 contributes to simplification of the manufacturing process.

Also, the fourth layer has a shielding relay layer 6a1 and second relay layer 6a2 (although the nuance of "second relay layer" differs somewhat from that in the first exemplary embodiment) formed of the same film as the data lines 6a. Of these the former is a relay layer to electrically connect the light shielding shielding layer 404 and the capacitor electrodes 300, and the latter is a relay layer to electrically connect the pixel electrodes 9a and the first relay layer 71. It is needless to mention that these are configured of the same material as the data lines 6a.

A second inter-layer insulating film 42 is formed above the above-described accumulation capacitor 70 and below the data lines 6a and shielding relay layer 6a1 and second relay layer 6a2, with the second inter-layer insulating film 42 being formed of NSG, PSG, BSG, BPSG, or other silicate glass film, or silicon nitride film or silicon oxide film or the like, generally the same as described above.

In the event of using aluminum for the capacitor electrodes 300, there is the need to perform low-temperature film formation using plasma CVD. A contact hole 801 and the aforementioned contact hole 882 are opened in the second inter-layer insulating film 42, so as to correspond to the shielding relay layer 6a1 and second relay layer 6a2.

Next, the light shielding shielding layer 404 is formed in the fifth layer. This may be formed of a two-layered structure with the upper layer formed of titanium nitride and the lower layer formed of aluminum as with the above-described shielding layer 400, for example, or may be formed with ITO or other electroconductive materials, depending on the case. The light shielding shielding layer 404 is electrically connected with the capacitor electrodes 300 via the shielding relay layer 6a1. Thus, the shielding layer 404 is set at a fixed potential, and as with the first exemplary embodiment, the effects of capacitor coupling occurring between the pixel electrodes 9a and the data lines 6a are eliminated. The shielding layer 400 with light-shielding capabilities may be the same width as the lower light shielding film 11a or wider than or narrower than the lower light shielding film 11a. However, this is formed so as to cover the TFTs 30, scanning lines 3a, data lines 6a, and accumulation capacities 70, excluding the third relay layer 406, when viewed from above. The shielding layer 400 and the lower light shielding film 11 define the corner portions of the pixel opening regions, i.e., the four corner portions, and the sides of the pixel opening regions.

Also formed in the fifth layers is a third relay layer 406, formed as the same layer as the shielding layer 404.

A third inter-layer insulating film 43 is formed above the above-described data lines 6a and below the shielding layer 404. The material making up the third inter-layer insulating film 43 may also be the same as with the second inter-layer insulating film 42. However, in the event that the data lines 6a and the like include aluminum or the like as described above, low-temperature film formation using plasma CVD is preferably used for the formation thereof to reduce or prevent these from being exposed to high temperature.

Also, a contact hole 803 to electrically connect the shielding layer 404 and the shielding relay layer 6a1 is formed on the third inter-layer insulating film 43, connecting to the second relay layer 6a2, and a corresponding contact hole 804 is provided in the third relay layer 406.

As for the remaining configuration, the pixel electrodes 9a and orientation film 16 are formed on the sixth layer, a fourth inter-layer insulating film 44 is formed between the sixth layer and the fifth layer, and contact holes 89 are opened in the fourth inter-layer insulating film 44 for electrical connection between the pixel electrodes 9a and the third relay layer 406.

Note that in the above-described configuration, the third relay layer 406 comes into direct contact with the pixel electrodes 9a formed of ITO or the like, so there is the need to take care regarding the above-described electrolytic corrosion. Accordingly, taking this into consideration, the shielding layer 404 and the third relay layer 406 are preferably of a two-layer structure of aluminum and titanium nitride, as with the first exemplary embodiment. Also, forming the shielding layer 404 and the third relay layer 406 with ITO also does away with the concern of electrolytic corrosion, since direct contact between ITO and aluminum can be avoided between the shielding layer 404 and the shielding relay layer 6a1, or between the third relay layer 406 and the second relay layer 6a2. Or, with the second exemplary embodiment, the capacitor electrodes 300 can be configured as a part of the capacitor lines as described above, so in order to set the capacitor electrodes 300 at a fixed potential, an arrangement may be made wherein the capacitor lines are extended to outside the image display area 10a and connected to a constant potential source. In this case, the capacitor lines including the capacitor electrodes 300 can be independently connected to a constant potential source, and also the shielding layer 404 can be independently connected to a constant potential source, so in the event of using such a configuration, the need to provide the contact holes 801 and 803 for electrically connecting these is done away with. Accordingly, in this case, there is no need to be concerned with "electrolytic corrosion" when selecting materials to configure the shielding layer 404 and the capacitor electrodes 300, or selecting the material to form the shielding layer relay layer 6a1 (the shielding layer relay layer 6a1 is no longer necessary, anyway).

With the electro-optical device according to the second exemplary embodiment having the configuration described above, first, it is clear that generally the same advantages as those in the first exemplary embodiment can be had. That is to say, as with the first exemplary embodiment, achieving a high opening ratio and high contrast enables images with high quality, such as being brighter, to be displayed.

Particularly with the second exemplary embodiment, forming the silicon nitride film 401 on the data lines 6a and on the perimeter of the image display area 10a, enables the moisture withstanding capabilities of the TFTs 30 to be further enhanced. That is to say, the nitrized film and the nitride have excellent capabilities in reducing or preventing intrusion and dispersion of moisture as described above, so intrusion of moisture to the semiconductor layer 1a of the TFTs 30 can be reduced or prevented beforehand. With the second exemplary embodiment, nitride films can also be used for the shielding layer 404, the third relay layer 406, or the dielectric film 75 making up the accumulation capacitor 70, and in the event that such nitride films are provided for all of these configurations, the actions of preventing intrusion of moisture can be exhibited more effectively. However, an arrangement may be made wherein "nitride films" are not used for all, of course.

Also, in the second exemplary embodiment, the silicon nitride film 401 exists only over the data lines 6a in the fourth layer, except for the area outside of the image display area 10a, so there is no great concentration of internal stress, so destruction of the silicon nitride film 401 due to internal stress within itself does not occur, and no cracks occur in the surroundings of the silicon nitride film 401, such as the third inter-layer insulation film 43 or the like, due to external effects of the stress. This is more apparent from assuming a case wherein a nitride film is provided over the entire face of the TFT array substrate 10.

Further, the titanium nitride film and the silicon nitride film 401 in the second exemplary embodiment are formed to have a thickness of, for example, around 10 to 100 nm, and more preferably, around 10 to 30 nm, so the above-described advantages can be obtained even more effectively.

Further, particularly with the second exemplary embodiment, the following advantages can be had due to the relay electrode 719 being provided. That is, in FIG. 4, in order to achieve electrical connection between the TFTs 30 and the pixel electrodes 9a, there was the need to achieve contact with the "upper face" in the drawing of the first relay layer 71 which is an electrode at a lower layer making up the accumulation capacitor 70, such as the contact hole 85 in the drawing.

However, with such forms, at the time of etching the preceding films in the step to form the capacitor electrodes 300 and the dielectric film 75, there is the need to perform the extremely difficult manufacturing step of etching the preceding films while leaving the first relay layer 71 situated immediately below intact. Particularly, in the event of using a high permittivity material as the dielectric film 75, as with an aspect of the present invention, etching is generally difficult. Combined with the conditions of an uneven etching rate between the capacitor electrodes 300 and the dielectric film 75, the difficulty of this manufacturing step is even greater. Accordingly, in such cases, there is a high probability of so-called "etching through" and the like at the first relay layer 71. In a worst-scenario case, short-circuiting may occur between the capacitor electrodes 300 and first relay layer 71 making up the accumulation capacitor 70.

Now, problems such as described above do not occur with an aspect of the present invention, since electric connection between the TFTs 30 and the pixel electrodes 9a is realized by providing the relay electrode 719 so as to provide an electrical connection point with the "lower face" in the drawing of the first relay layer 71. This is because, as can be clearly understood from FIG. 6, there is no need to perform a step wherein the first relay layer 71 must be left while etching the preceding films of the capacitor electrodes 300 and the dielectric film 75.

Thus, according to the present exemplary embodiment, there is no need to carry out a difficult etching step such as described above, so excellent electrical connection between the first relay layer 71 and the pixel electrodes 9a can be realized. This is due to none other than realization of electrical connection of the two through the relay electrode 719. Further, due to the same reason, the probability of short-circuiting between the capacitor electrodes 300 and the first relay layer 71 is extremely small with the present exemplary embodiment. That is to say, a faultless accumulation capacitor 70 can be suitably formed.

Additionally, particularly with the second exemplary embodiment, the capacitor electrodes 300 can be formed as part of the capacitor lines as described above, so there is no need to separately provide electroconductive material to each of the capacitor electrodes provided for each pixel to set each at a fixed potential, and an arrangement can be employed wherein each capacitor line is connected to a fixed potential source, or the like. Accordingly with the present exemplary embodiment, simplification of manufacturing processes, or reduction in manufacturing costs, can be achieved.

Also, capacitor lines including capacitor electrodes in this way may be formed having a two-layered structure including an aluminum film and a polysilicon film, as with the above-described first exemplary embodiment. In the event that the capacitor lines include an aluminum film, high electric conductivity can be realized at the capacitor lines. Accordingly, with such a configuration, narrowing down of the capacitor lines, i.e., narrowing down of the accumulation capacitor 70, can be realized without any particular restrictions. Accordingly, with the second exemplary embodiment, further enhancement in the opening ratio can be achieved. Restating this from another perspective, with related art arrangements, the capacitor lines have been formed of singular materials, such as polysilicon or WSi or the like, so attempting to narrow these down to increase the opening ratio results in cross-talk and burn-in and the like due to the high resistance of the material, but with the second exemplary embodiment, there is no concern of such problems occurring.

Also noteworthy with such an arrangement is that the aluminum film has light reflecting properties and the polysilicon film has light absorbing properties, so as described with the first exemplary embodiment above, the capacitor lines can be expected to function as light shielding layers. Further, the internal stress of such capacitor lines can be made smaller than with related art arrangements (the internal stress of aluminum is smaller than that of WSi or the like.). Accordingly, with the form, the third inter-layer insulating film 43 and the like to be in contact with the capacitor lines can be made infinitesimally thin, thereby realizing reduction in the size of the electro-optical device even better.

Third Exemplary Embodiment

Configured of Accumulation Capacitor

Figure 8:
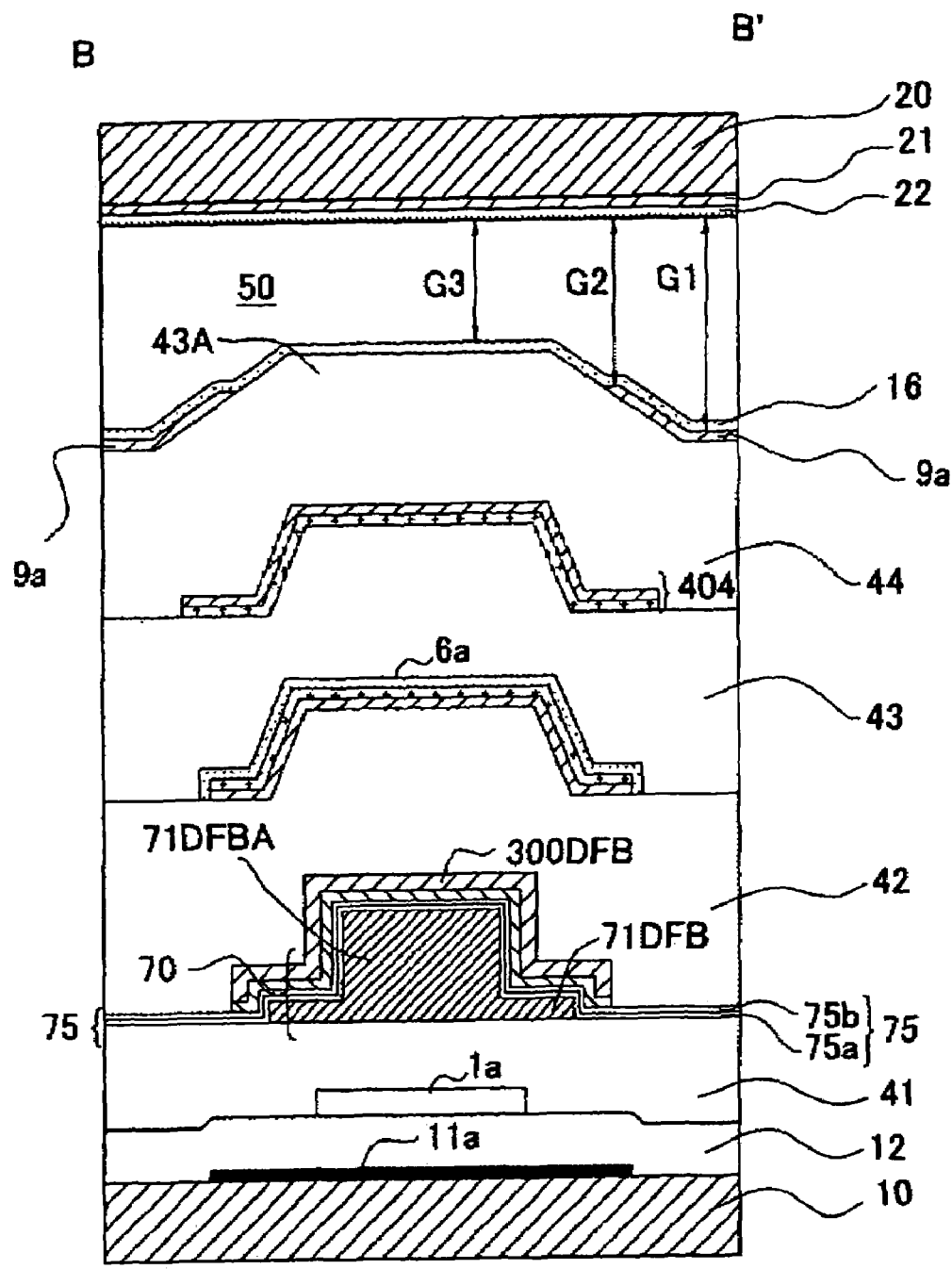
FIG. 8 is a cross-sectional view along plane B-B' in FIG. 2.
Figure 9:
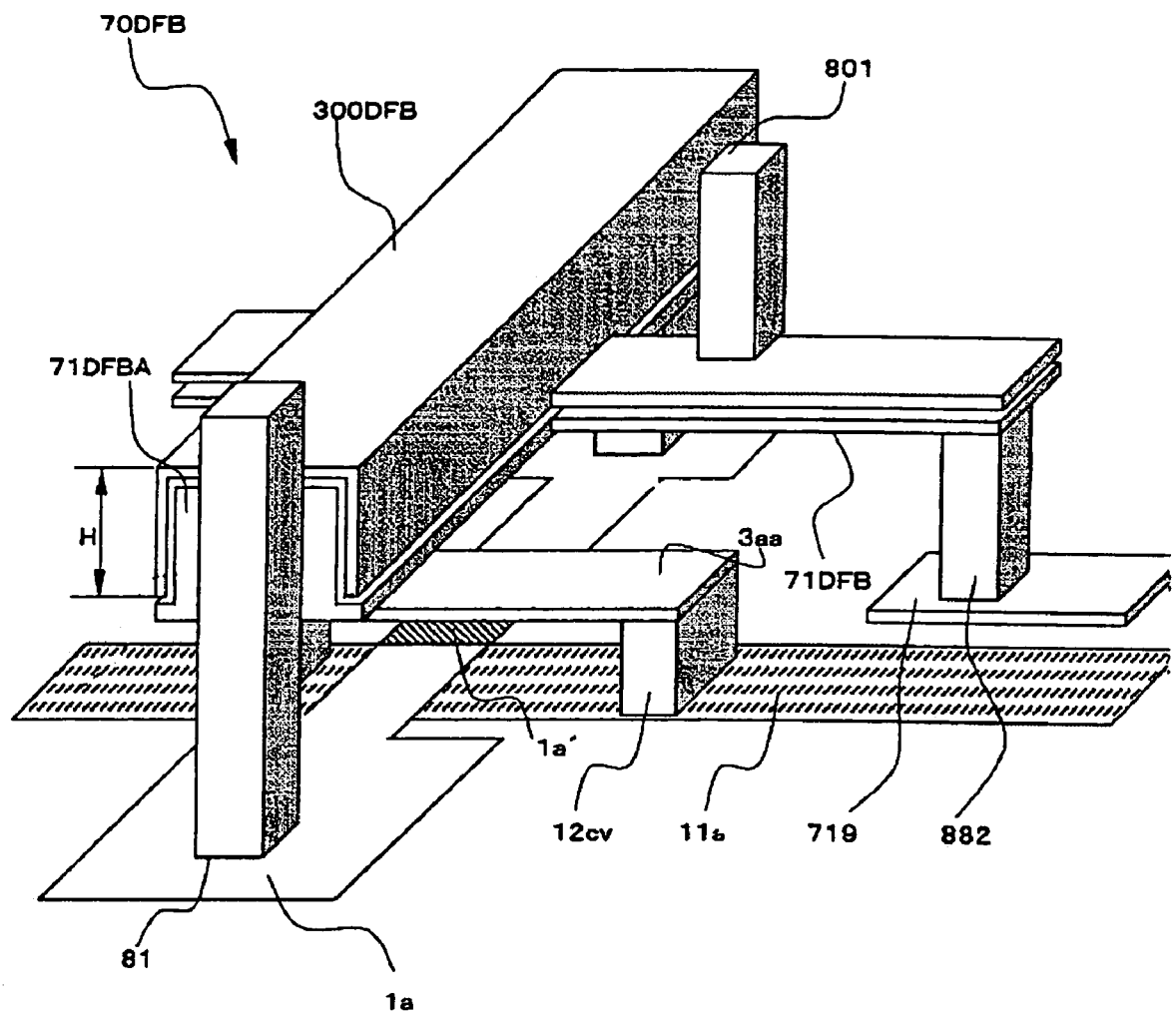
FIG. 9 is a perspective view illustrating a three-dimensional configuration of accumulation capacitor corresponding to one pixel.

The following is a description of the configuration of the accumulation capacitor in the above second exemplary embodiment, more particularly, the form of a case wherein the accumulation capacitor is configured three-dimensionally, with reference to FIG. 8 and FIG. 9. Here, FIG. 8 is a cross-sectional view along plane B-B' in FIG. 5 in a case wherein an accumulation capacitor 70DFB having a three-dimensional configuration as described later is formed. FIG. 9 is a perspective view illustrating a three-dimensional configuration of the accumulation capacitor 70DFB corresponding to one pixel. Note that FIG. 9 does not show all of the configurations illustrated in FIG. 5 and FIG. 6, and that illustration of several components, such as the dielectric film 75 making up the accumulation capacitor 70DFB, for example, has been omitted where appropriate. Also, in FIG. 9, the capacitor electrode 300DFB having a two-layered structure has not been drawn, for the sake of simplification.

In FIG. 8 and FIG. 9, the accumulation capacitor 70DFB is formed of two main parts of a part formed so as to extend in the direction of the semiconductor layer 1a or the data lines 6a (hereafter referred to as "three-dimensional portion"), and a part formed following the direction in which the lower light shielding film 11a extends (hereafter referred to as "planar portion").

At the three-dimensional portion of the former, a stepped shape portion 71DFBA is formed as a part of the first relay layer 71DFB, and dielectric film and capacitor electrodes 330DFB are formed upon the stepped shape portion 71DFBA, thereby forming a capacitor. Accordingly, the accumulation capacitor 70DFB has a layered structure wherein the first relay layer 71DFB, the dielectric film, and capacitor electrode 300DFB follow the plane rising up from the surface of the substrate, and the cross-sectional shape of the accumulation capacitor 70DFB includes a stepped cross-sectional shape which is higher at the middle than the portions closer to the edges.

Now, the height for such a stepped shape, or the height H of the stepped shape portion 71DFBA (see FIG. 9), is preferably around 50 to 1000 nm. In the event that this is smaller than this range, sufficient increased effects of the accumulation capacitor cannot be obtained, and in the event that this is greater than this range, the step becomes too great, leading to disadvantages, such as improper orientation within the liquid crystal layer 50 due to this step.

However, the planar portion of the latter is formed such that the first relay layer 71DFB, and dielectric film and capacitor electrode 300DFB, each having a planar form following a face parallel to the surface of the substrate, form a layered structure.

Such three-dimensional portions and planar portions each have continuous structures. That is to say, the first relay layer 71DFB has a integral structure of the first relay layer 71DFB, and the capacitor electrode 300DFB has an integral structure of the capacitor electrode 300DFB, so as to form one capacitor as a whole. More specifically, when viewed in planar fashion, the first relay layer 71DFB has a so-called "T-shaped" shape of a portion following the direction of the data line 6a so as to extend between two contact holes 81, and a portion extending from this portion in the direction of the lower light shielding film 11a to an adjacent TFT 30, as can be clearly understood from FIG. 9. Also, viewing in planar fashion, the capacitor electrode 300 is formed so as to overlay the lower light shielding film 11a as described earlier, and more specifically, has a main line portion extending following the lower light shielding film 11a, and protrusions protruding both upwards and downwards following the data lines 6a at each portion intersecting with the data lines 6a. Of these the protrusions use the region above the lower light shielding film 11a and the region below the data lines 6a to increase the formation region of the accumulation capacitor 70DFB.

Now, the portion of the accumulation capacitor 70 extending to the data line 6a is formed as a three-dimensional portion including a stepped shape as described above, whereby a protrusion 43A is formed on the surface of the inter-layer insulating film formed on the three-dimensional portion with the shielding layer 404 introduced therebetween, as shown in FIG. 8. That is to say, a barrier, as if it were, is provided between the horizontally-adjacent pixel electrodes 9a in FIG. 8.

As can be understood from FIG. 9, the accumulation capacitor 70DFB with such a form is formed so as to be closed in, as if it were, in a light shielded space including the formation region of the scanning lines 3a and data lines 6a, and accordingly, does not lead to a reduced opening ratio.

With the electro-optical device according to the present exemplary embodiment with such a configuration, the following advantages are brought about due to the presence of the accumulation capacitor 70DFB.

Figure 10:
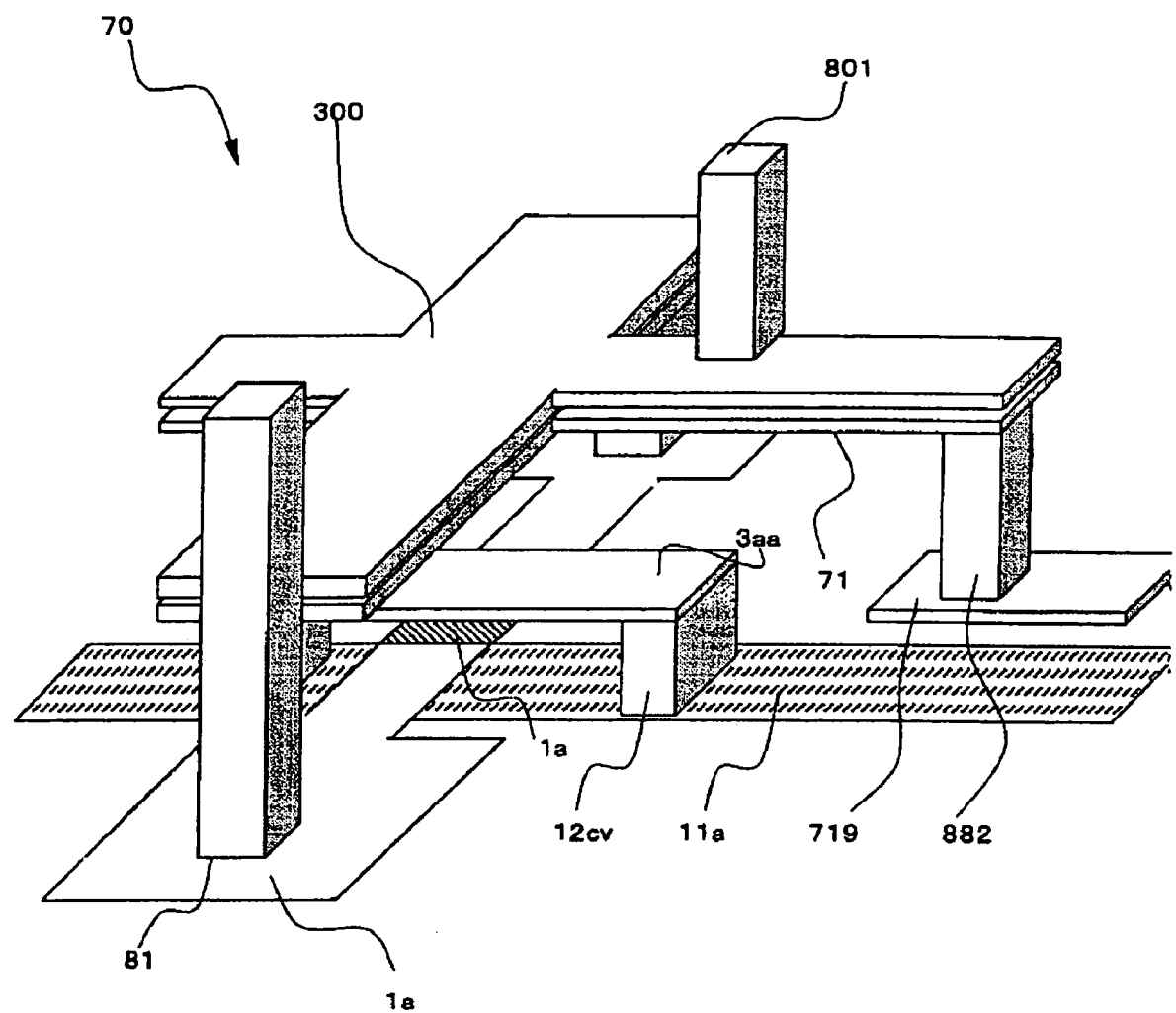
FIG. 10 is a perspective view illustrating the configuration of accumulation capacitor serving as a comparative example to FIG. 9.

First, with the present exemplary embodiment, due to the cross-sectional shape of the accumulation capacitor 70DFB being formed so as to include the stepped shape, effects of increased capacitor proportionate to the area on the side faces of the stepped shape can be expected. This can be understood from comparison between FIG. 9, which has already been referenced, and FIG. 10, which is a schematic to the same effect, but illustrates a configuration example of the accumulation capacitor 70 which does not include the three-dimensional portion. In FIG. 10, the accumulation capacitor 70 has the lower electrode and upper electrode thereof formed by the relay layer 71 and the capacitor electrode 300 each of which are formed planar, and accordingly has a configuration where there is no three-dimensional portion following the data line 6a as shown in FIG. 9. This is equivalent to the accumulation capacitor 70 itself shown in the cross-sectional view in FIG. 6.

As can be clearly understood from FIG. 9 and FIG. 10, with the present exemplary embodiment, the step shaped portion 71DFBA having the height H is formed as a part of the first relay layer 71DFBA by a general length of a distance L between the contact holes 81 and 83, and accordingly, an accumulation capacitor 70DFB with an overall area increased by generally 2HL is formed in FIG. 9 as compared to FIG. 10. Here, "L" represents the length of the capacitor electrode 300DFB along the data line 6a. It is needless to say that the area 2HL here is equivalent to the area of the side wall portions of the three-dimensional portion.

Accordingly, with the present exemplary embodiment, the capacitor of the capacitor electrode 300DFB serving as the fixed potential side capacitor electrode and the first relay layer 71DFB serving as the pixel potential side capacitor electrode, making up the accumulation capacitor 70DFB, can be increased without increasing the area thereof in a planar manner, so the accumulation capacitor 70DFB can be increased while maintaining a high opening ratio, and consequently high-quality images without display irregularities, flickering, etc., can be displayed.

Also, with the present exemplary embodiment, as described above, the cross-sectional shape of the accumulation capacitor 70DFB includes the stepped shape, so manufacturing thereof is easy due to the form for forming the protrusion 71DFBA, which is a part of the first relay layer 71DFB, thereupon.

That is to say, the protrusion 71DFBA and the stepped shape can be formed in the process to form the first relay layer 71DFB, considering preparing separate materials and executing separate processes to form the stepped shape for example, the manufacturing costs can be reduced by that much.

Further, with the present exemplary embodiment, due to the portion where the accumulation capacitor 70DFB includes the stepped shape being formed following the data line 6a, the following advantages can be had. That is, in the event that the electro-optical device according to the present invention is driven by 1S inversion driving, generation of the in-plane field occurring between the adjacent pixel electrodes with the data line 6a therebetween can be suppressed. This is because the protrusion 43A is formed above the surface of the fourth inter-layer insulating film 44 formed on the protrusion 71DFBA which is a part of the first relay layer 71DFB, with the second inter-layer insulating film 42 and shielding layer 404 and so forth introduced therebetween. That is, first, forming the pixel electrodes 9a such that the edge of the pixel electrode 9a rides on the protrusion 43A allows the distance between the facing electrode 21 and the pixel electrodes 9a to be narrowed from G1 to G2, or at least narrower than G1, as shown in FIG. 8, enabling the perpendicular field which is the electric field applied in the vertical direction in FIG. 8, to be intensified that much more.

Also, second, this is due to the in-plane field itself being weakened by the transmissivity of the protrusion 43A, regardless of whether or not the edge of the pixel electrodes 9a is above the protrusion 43A. Further, third, this is due to the fact that the effects of in-plane fields on the liquid crystal layer 50 can be relatively reduced, since the gap between the protrusion 43A and the facing electrode 21 is narrowed from G1 down to G3 as shown in FIG. 8, so that the volume thereof, i.e., the volume of the liquid crystal layer 50 positioned within the gap can be reduced.

Thus, according to the present exemplary embodiment, in-plane fields which could occur with the data lines 6a therebetween can be suppressed, so the probability of disturbance occurring in the orientation state of the liquid crystal molecules in the liquid crystal layer 50 due to in-plane fields can be reduced, thereby enabling display of high quality images.

Note that in FIG. 8 and FIG. 9, the cross-sectional shapes of the protrusion 71DFBA is shown as being rectangular, but the present aspects of the invention are not restricted to such a form. For example, the cross-sectional shape thereof may be generally trapezoidal (that is, a case wherein the protrusion 71DFBA is generally trapezoidal in the perspective in FIG. 8). In this case, at the time of forming the dielectric film, and the capacitor electrode 300DFB serving as the upper electrode, on the protrusion, there are no angular portions as shown in FIG. 8 and FIG. 9, so there is no need to be concerned regarding poor coverage thereof. Accordingly, with such a form, the dielectric film and capacitor electrodes can be formed suitably.

Fourth Exemplary Embodiment

Modification of Inter-Layer Insulating Film Serving as Base of Pixel Electrodes

Figure 11A:
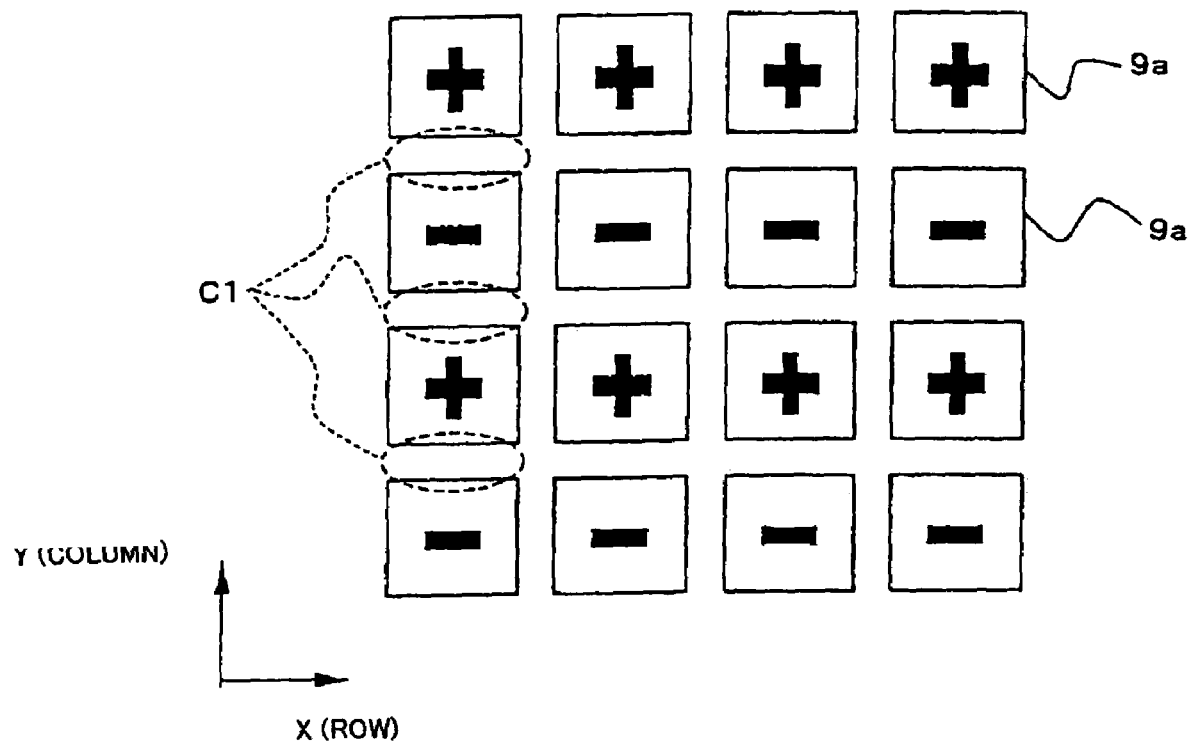
FIGS. 11(A) and 11(B) are explanatory schematics for describing the mechanism whereby in-plane fields occur.
Figure 11B:
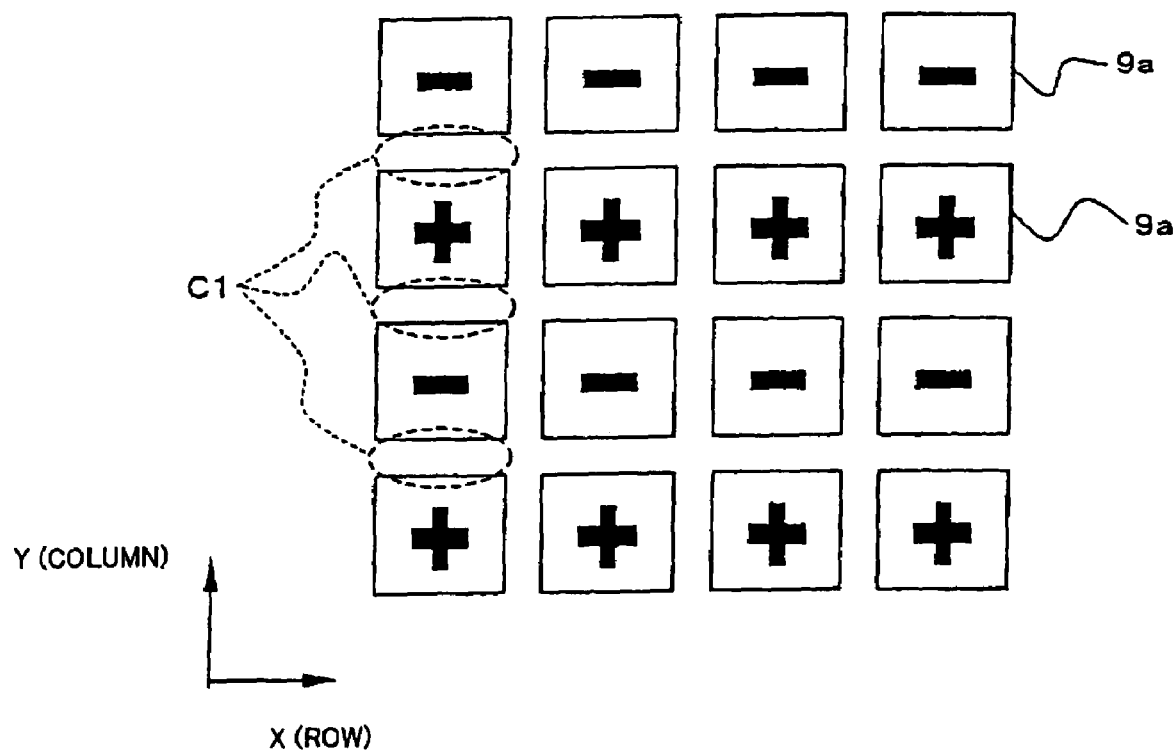
Figure 12:
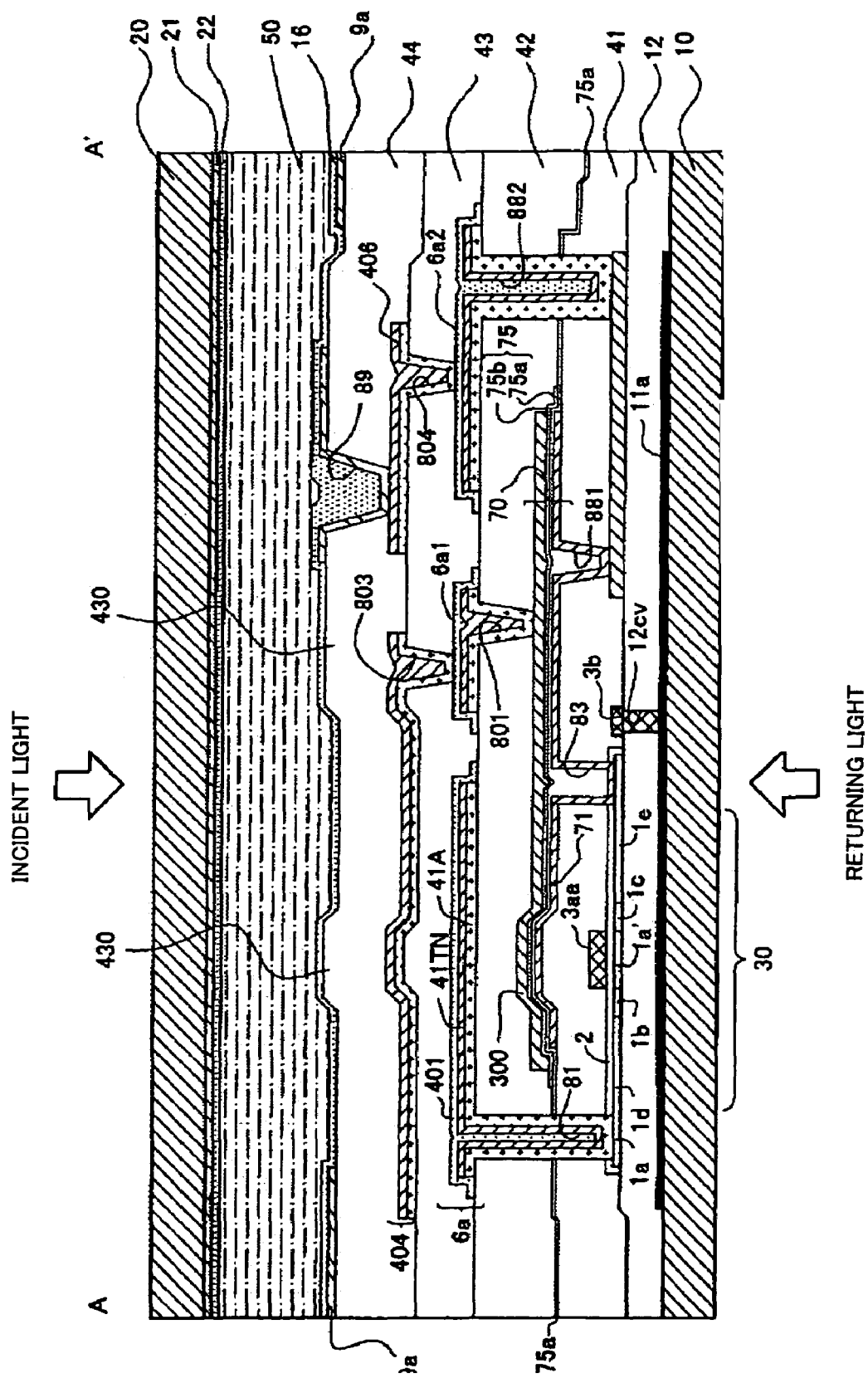
FIG. 12 is a schematic to the same effect as with FIG. 4, illustrating a form wherein protrusions are provided to prevent in-plane fields from occurring.
Figure 13:
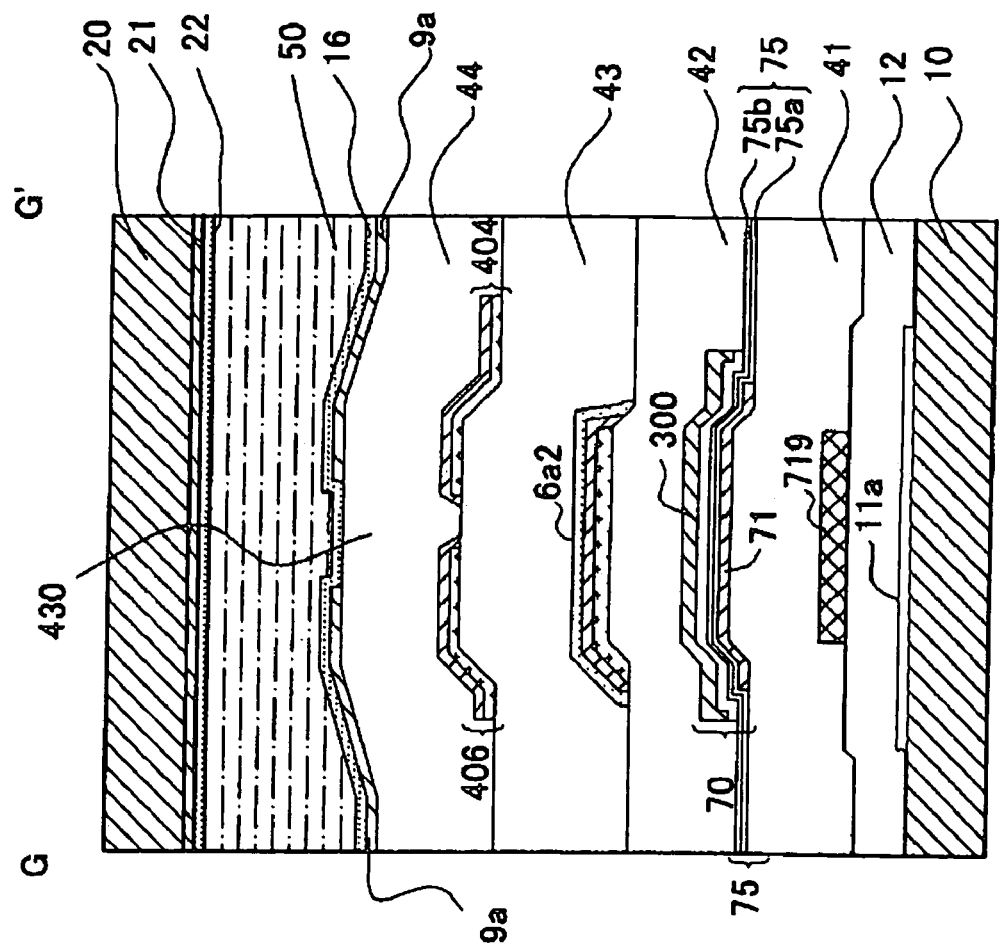
FIG. 13 is a cross-sectional view along plane G-G' in FIG. 2, illustrating a form wherein protrusions are provided to prevent in-plane fields from occurring.

The following is a description of a configuration of a fourth exemplary embodiment of the present invention, relating to the third inter-layer insulating film 43 disposed as the base of the pixel electrodes 9a in the electro-optical device according to the first exemplary embodiment, and more specifically, issues relating to modifications and the like to smooth processing of the third inter-layer insulating film 43, with reference to FIG. 11 through FIG. 13. FIG. 11 is an explanatory schematic for describing the mechanism whereby in-plane fields occur. FIG. 12 is a schematic to the same effect as with FIG. 6 relating to the electro-optical device of the above-described second exemplary embodiment, illustrating a form wherein protrusions are provided to prevent in-plane fields from occurring (wherein the accumulation capacities are configured three-dimensionally). FIG. 13 is a cross-sectional view along plane G-G' in FIG. 5, illustrating a form wherein the protrusions are provided.

Now, while the above description has been made regarding the third inter-layer insulating film 43 being subjected to CMP (Chemical Mechanical Polishing) processing so that the surface thereof becomes almost completely smooth, the present aspect of the invention are not restricted to such forms. The following is a form wherein advantages equivalent to or exceeding such a form can be obtained.

With a form, such as described above, the pixel electrode 9a and the orientation film 16 can be formed smoothly, so there may be no disturbance in the orientation state of the liquid crystal layer 50, but the following problems may occur.

That is, with electro-optical devices, such as the present exemplary embodiment, there are cases wherein inversion driving is employed, wherein the voltage polarity applied to each of the pixel electrodes 9a is inverted following a predetermined rule, in order to reduce or prevent deterioration of the electro-optical substance due to application of CD voltage, and to reduce or prevent cross-talking and flickering in the display image, in general. More specifically, so-called "1H inversion driving" can be described as follows.

First, as shown in FIG. 11(a), during the period in which the image signals of an n'th (wherein n is a natural number) field or the frame are displayed, the polarity of liquid crystal driving voltage indicated by + or − for each pixel electrode 9a is not inverted, and the pixel electrodes 9a are driven with the same polarity for each row. Subsequently, as shown in FIG. 11(b), the polarity of liquid crystal driving voltage at the pixel electrodes 9a is inverted at the time of displaying the image signals of the n+1'th field or the frame, and during the period in which the image signals of the n+1'th field or the frame are displayed, the polarity of liquid crystal driving voltage indicated by + or − for each pixel electrode 9a is not inverted, and the pixel electrodes 9a are driven with the same polarity for each row. The states shown in FIG. 11(a) and FIG. 11(b) are repeated by 1 field or 1 frame cycles. This is driving with 1H inversion driving. Consequently, image display with reduced cross-taking and flickering can be performed while avoiding deterioration of the liquid crystal due to application of DC voltage. Note that the 1H inversion driving method is advantageous in comparison with the later-described 1S inversion driving method, in that there is practically no vertical-direction cross-talk.

However, as can be understood from FIG. 11(a) and FIG. 11(b), in-plane fields occur between the pixel electrodes 9a adjacent in the vertical direction (Y direction) in the figures with the 1H inversion driving method. In these figures, the occurrence regions C1 of the in-plane fields are around the gaps between the pixel electrodes 9a adjacent in the Y direction at all times. In the event that such in-plane fields are applied, abnormal operations of the electro-optical substance, such as improper orientation of liquid crystal, occurs with regard to the electro-optical substance to which perpendicular fields between the pixel electrodes and the facing electrode facing one another (i.e., electric fields perpendicular to the substrate face) are assumed to be applied, leading to the problem of light passage or the like at this portion, reducing the contrast ratio.

Conversely, the region where the in-plane fields occur can be covered with a shielding film, but this causes the problem that the opening region of the pixel becomes narrow by a width corresponding to the region where the in-plane fields occur. Particularly, the smaller the distance between adjacent pixel electrodes becomes due to finer pixel pitches, the greater the in-plane field becomes, so the finer the electro-optical devices become, the more serious this problem is.

Accordingly, with the present invention, a stripe-like protrusion 430 extending sideways is provided on the third inter-layer insulating film 43 between the pixel electrodes 9a adjacent in the vertical direction in FIG. 11 (i.e., the adjacent pixel electrodes 9a where potential of inverse polarity is applied).

Due to the presence of the protrusion 430, the perpendicular fields around the edges of the pixel electrodes 9a placed on the protrusion 430 can be intensified, while weakening in-plane fields. More specifically, as shown in FIG. 12 and FIG. 13, the distance between the edges of the pixel electrodes 9a on the protrusion 430 and the facing electrode 21 is narrowed by an amount equal to the height of the protrusion 430. Accordingly, the perpendicular fields between the pixel electrodes 9a and the facing electrode 21 can be intensified at the in-plane field occurrence regions C1 shown in FIG. 12. The gap between adjacent pixel electrodes 9a is constant, so the intensity of the in-plane fields intensified by narrowing the gaps is also constant in FIG. 12 and FIG. 13.

Accordingly, making the perpendicular fields more dominant in the in-plane field occurrence regions C1 shown in FIG. 11, improper orientation of the liquid crystal due to the in-plane fields can be reduced or prevented. Further, due to the presence of the protrusion 430 formed of an insulating film, the intensity of the in-plane fields is weakened, and the liquid crystal portions affected by the in-plane fields are reduced at the portions where the in-plane fields exist, by the amount of the protrusion 430 with which they are replaced with, so effects of the in-plane fields on the liquid crystal 50 can be reduced.

Note that such protrusions 430 are specifically formed as follows, for example. The following is a direction of a specific form of forming the protrusion 430, with reference to FIG. 14 and FIG. 15. Of these, FIG. 14 relates to an electro-optical device according to a modification of the above-described second exemplary embodiment, and is a perspective view showing the data lines and the components formed on the same layer therewith. FIG. 15 is a perspective view showing the data lines and the components formed on the same layer therewith. Note that these drawings illustrate only configurations to form the protrusions 430, and all other components have been omitted from the drawings.

Figure 14:
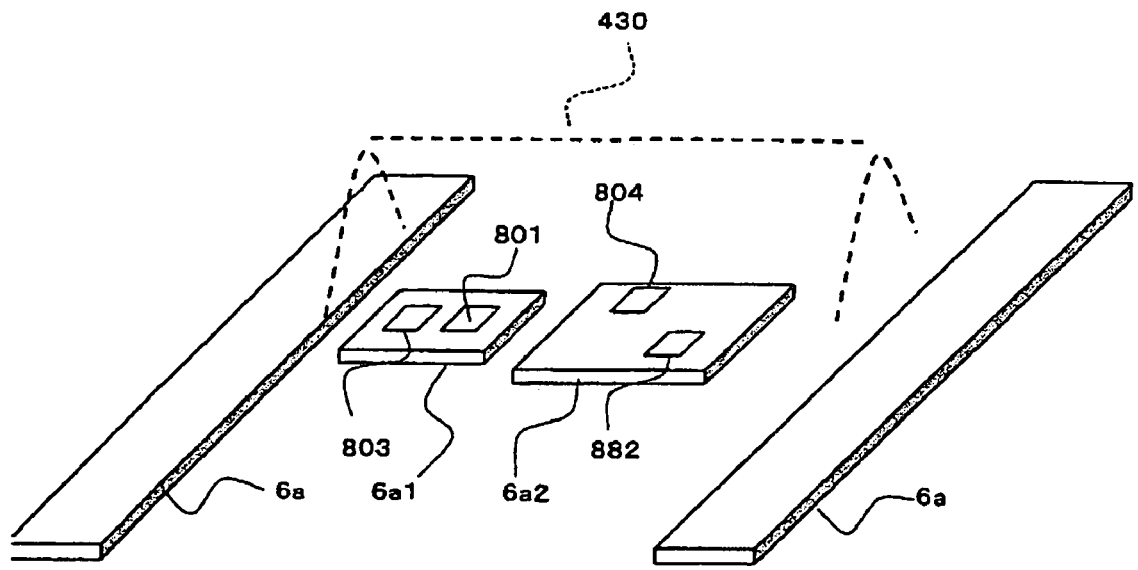
FIG. 14 relates to a modification of a second exemplary embodiment, and is a perspective view illustrating a specific form for forming the protrusions shown in FIG. 12 and FIG. 13 (a form using data lines, a relay layer for a shielding layer, and a second relay layer)
Figure 15:
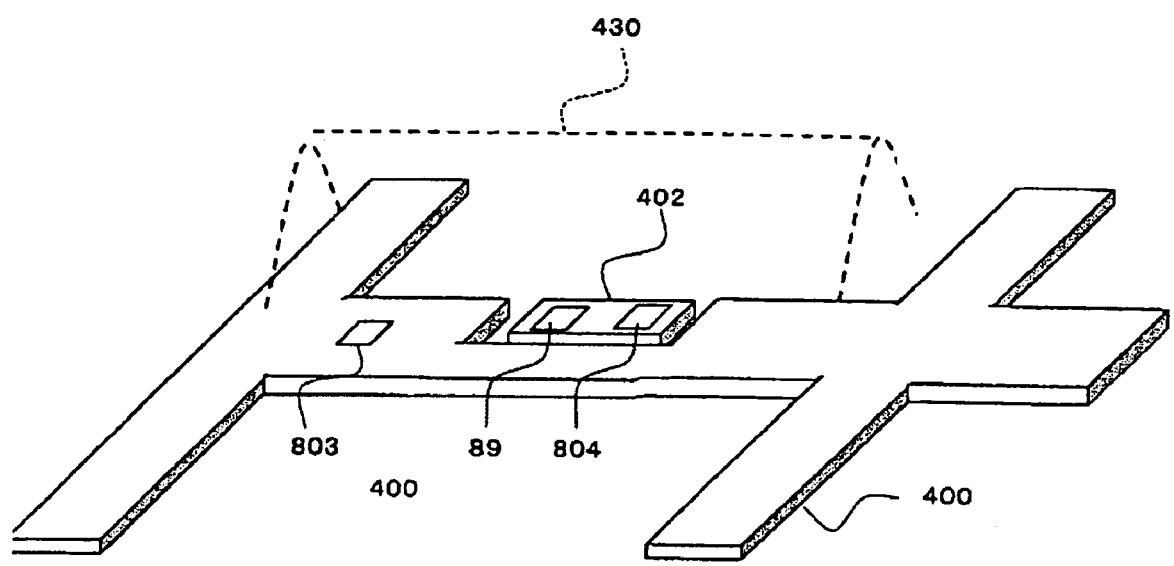
FIG. 15 relates to a modification of the second exemplary embodiment, and is a perspective view illustrating a specific form for forming the protrusions shown in FIG. 12 and FIG. 13 (a form using a shielding layer and a third relay layer)

Now, regarding a specific arrangement to form the protrusion 430, first, and arrangement can be conceived to use the data lines 6a, shielding relay layer 6a1, and second relay layer 6a2, in the electro-optical device in the above-described second exemplary embodiment, as shown in FIG. 14. That is, as described with reference to FIG. 5, the data lines 6a were formed so as to have a main line portion linearly extending in the Y direction in FIG. 5, with the shielding relay layer 6a1 and second relay layer 6a2 overhanging from the data lines 6a in the X direction in FIG. 5. Using the data lines 6a, shielding relay layer 6a1, and second relay layer 6a2 formed thus, allows a protrusion 430 to be naturally formed on the surface of the fourth inter-layer insulating film 44 serving as the base of the pixel electrodes 9a, due to the height thereof (see FIG. 14). In this case, the shielding relay layer 6a1 and second relay layer 6a2 can be taken to serve as the "overhanging portions" or "protrusion patterns" in the present invention.

Secondly, as shown in FIG. 15, an arrangement of using the shielding layer 400 and the third relay layer 402 in the electro-optical device in the above-described second exemplary embodiment can be conceived. That is, as described with reference to FIG. 5, the shielding layer 400 is formed in a grid-like form, with the third relay layer 402 being formed of the same layer as the shielding layer 400. Using the shielding layer 400 and the third relay layer 402 formed thus allows a protrusion 430 to be naturally formed on the surface of the fourth inter-layer insulating film 44 serving as the base of the pixel electrodes 9a, due to the height thereof (see FIG. 15). In this case, the portions of the shielding layer 400 extending in the X direction so as to bridge the portions of the shielding layer 400 extending in the Y direction as shown in FIG. 5, can be taken to serve as the "overhanging portions" or "protrusion patterns" in the present invention.

It should be noted that in each of the above cases, it is even better in the event that suitable smoothing processing is performed on the surface of the inter-layer insulating film formed as the base of the data lines 6a or the shielding layer 400. This is because this allows the height of the protrusions 430 to be strictly determined. Also, arrangements, such as these wherein the shielding layer or data lines are used to form protrusion, can also be applied to the above-described first exemplary embodiment in the same way.

Thirdly, besides the above-described arrangements wherein the protrusion 430 is provided on the surface of the third inter-layer insulating film 43 serving as the base of the pixel electrodes 9a (the first embodiment) or on the surface of the fourth inter-layer insulating film 44, by arranging the configuration of layers lower than the pixel electrodes 9a, depending on the case, arrangements may be employed wherein a new film to form the protrusion 430 is newly formed on the surface of third inter-layer insulating film 43 or fourth inter-layer insulating film 44 and then patterned.

Now, while the protrusion 430 can be formed thus, such protrusions 430 are preferably formed with the steps created thereby being gradual. Forming the "gradual" protrusion can be realized by, for example, first forming a steep protrusion, forming a smoothed film on the protrusion and the perimeter thereof, and performing an etching-back step to remove the smoothed film and retreating the surface of the protrusion exposed following removal of the smoothed film.

Forming such a "gradual" protrusion allows the rubbing processing with regard to the orientation film 16 to be performed relatively easily with no irregularities, and improper operations of the electro-optical substance, such as improper orientation of liquid crystal, can be prevented beforehand extremely effectively. With regard to this point, this is quite different from a case wherein the angle of the surface of the protrusion changes in a steep manner, since non-continuous faces occur in the electro-optical substance, such as the liquid crystal, and improper operations of the electro-optical substance, such as improper orientation of liquid crystal occurs.

Further, 1H inversion driving has been described above, but the present invention is not applied with limitation to this driving method. For example, 1S inversion driving, wherein the pixel electrodes in the same column are driven with potential of the same. polarity, with the voltage polarity being inverted for each column each frame or field, is also used as an inversion driving method which is relatively easy to control and wherein high-quality image display can be made. The aspects of the present invention are applicable to this as well. Further, the dot inversion driving method has been developed wherein the voltage polarity applied to each of the pixel electrodes is inverted between pixel electrodes adjacent in both the row and column directions, and the aspects of the present invention are applicable to this, as well.

In addition, with arrangements wherein the protrusion 430 is provided, there is increased probability of improper orientation of the liquid crystal occurring due to this. Accordingly, depending on a case, the line width of the aforementioned upper side light shielding film or internal light shielding film, or the lower side light shielding film 11a or the like should be formed slightly wider. This enables light leakage or the like due to improper orientation caused by the protrusion 430, to be reduced or prevented beforehand from affecting the image. However, this is a measure which goes against the perspective of an increased opening ratio, and accordingly should be carried out with a suitable balance.

Fifth Exemplary Embodiment

Double-Speed Inversion Driving)

Figure 16:
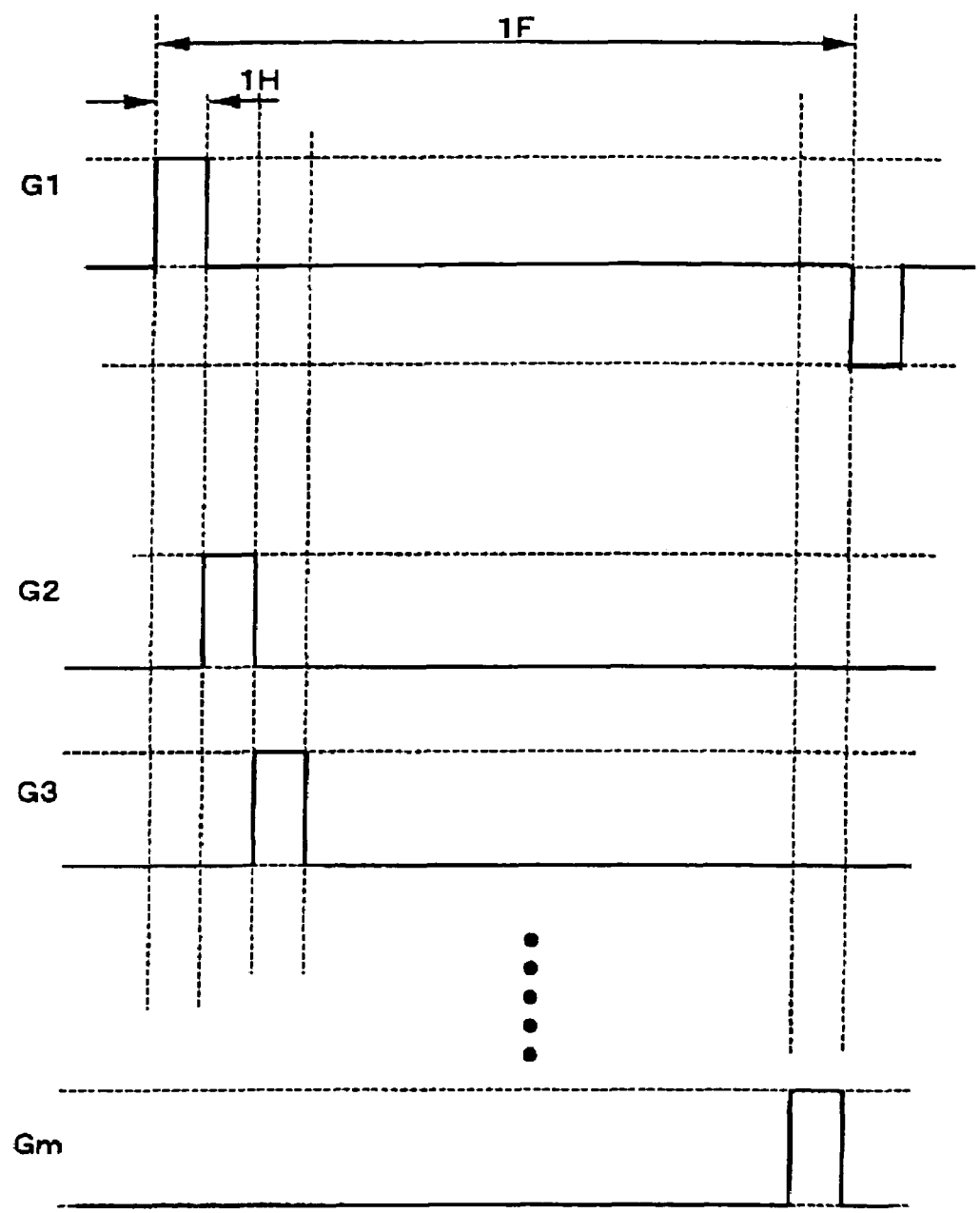
FIG. 16 is a timing chart illustrating a related art method to apply voltage to pixel electrodes.
Figure 17:
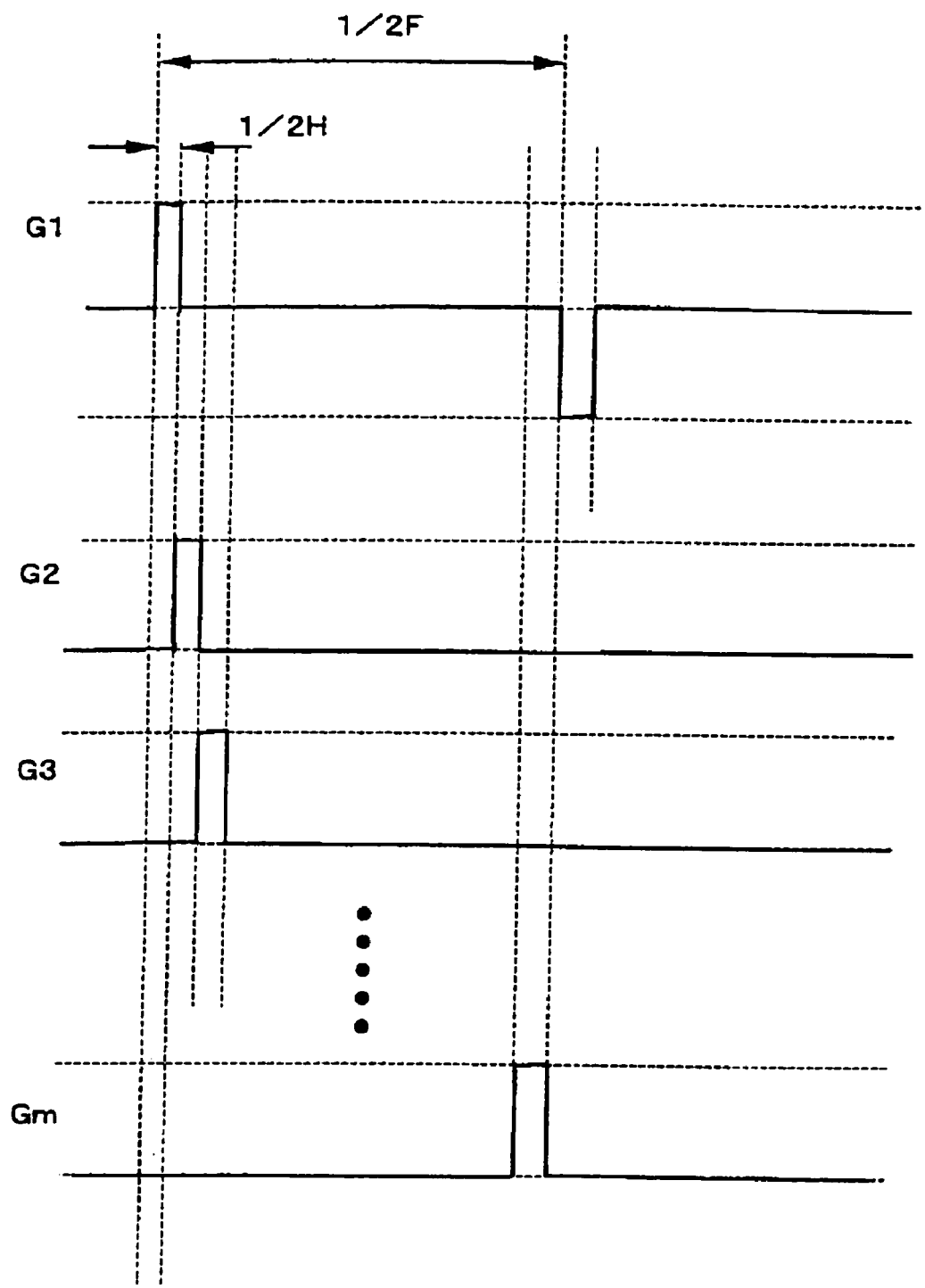
FIG. 17 is a timing chart illustrating a method to apply voltage to pixel electrodes according to a fifth exemplary embodiment of the present invention.

The following is a description of a fifth exemplary embodiment with reference to FIG. 16 and FIG. 17. Here, FIG. 16 is a timing chart relating to scanning signals, illustrating a related art method for applying voltage to the pixel electrodes 9a. FIG. 17 is a timing chart according to the fifth exemplary embodiment. Note that the pixel portions described with reference to FIG. 1 through FIG. 4 are "driven" based on such a timing chart.

With the fifth exemplary embodiment, the driving method of the pixel electrodes 9a is characteristic, and particularly in the event that the surface of the inter-layer insulation film below the pixel electrodes 9a is smoothed, as with the present exemplary embodiment, exhibits particular advantages.

First, the method to apply voltage to the pixel electrodes 9a in the fifth exemplary embodiment will be described with reference to the timing chart shown in FIG. 16. As shown in this figure, the scanning lines 3a are sequentially selected by scanning signals G1, G2, . . . , Gm being applied in order from that positioned at the first row to that in the last (see FIG. 1). Here, "selected" means that the TFTs 30 connected to the scanning line 3a are in a state capable of conducting. During the period wherein the scanning lines 3a are selected (one horizontal scanning period (1H)), image signals S1, S2, . . . , Sn are sent to the TFTs 30 and ultimately the pixel electrodes 9a (this point is not shown in FIG. 16) via the data lines 6a. Accordingly, each of the pixel electrodes 9a have a predetermined potential, and there is a predetermined potential difference as to the potential which the facing electrode 21 has. That is, a predetermined charge is charged in the liquid crystal layer 50.

Now, the period, wherein all scanning lines 3a from the first row to the last are selected, is called one field period or one vertical scanning period (1F). Also, driving with inverted polarity is performed between the n'th field and the n+1'th filed with this driving method (hereafter referred to as "1V inversion driving". See "G1" in FIG. 16 and FIG. 17).

Now, unlike the above-described 1H inversion driving, such 1V inversion driving does not have adjacent pixel electrodes 9a being driven with differing electric fields, so in principle, no in-plane fields are generated. Accordingly, even in the event that the surface of the inter-layer insulating film situated below the pixel electrodes 9a is subjected to smoothing processing, there is no need to be concerned with trouble caused by occurrence of in-plane fields as with the above-described arrangement having a protrusion.

However, employing the 1V inversion driving, such as described above causes the following problems. That is, there is the great problem that each time the polarity is inverted, i.e., each vertical scanning period, flickering occurs o the image.

Accordingly, in such cases, the double-speed field inversion driving illustrated in FIG. 17 is preferably employed. Now, double-speed field inversion driving is a driving method wherein, one field period is made half that of related art driving (e.g., in the event that the related art was driven at 120 [Hz], half should preferably be 1/60 [s] or less.). Accordingly, assuming employing the 1V inversion driving, the polarity inversion cycle is half of the related art arrangements. Comparing FIG. 17 and FIG. 16 shows that the horizontal scanning period (1H) is shorter for the former than for the latter, and accordingly, that the vertical scanning period (1F) has been shortened. Specifically, this is made to be "½" as shown in the drawings.

Thus, one vertical scan period is shortened, i.e., the screen of the positive polarity and the screen of the negative polarity switch over faster, and the aforementioned flickering becomes inconspicuous.

Thus, according to the double-speed field inversion driving method, images can be displayed without flickering and with higher quality.

Also, according to such a double-speed field inversion driving method, the potential holding properties of each of the pixel electrodes 9a are relatively enhanced over other driving methods. This is because halving the length of one field period means that the period over which the pixel electrodes 9a need to hold the predetermined potential is half of the related art. From this perspective, while situations wherein decrease of the voltage during the field period can be reduced or prevented beforehand due to high-capability accumulation capacitor 70 being provided already, according to each pixel, there is no doubt that enhancement of such relative potential holding capabilities is further advantageous under the object of displaying images with event higher quality. This fifth exemplary embodiment is effective in the above and the later-described exemplary embodiments.

Sixth Exemplary Embodiment

Modification of Contact Holes for Achieving Electrical Connection with Pixel Electrodes)

Figure 18:
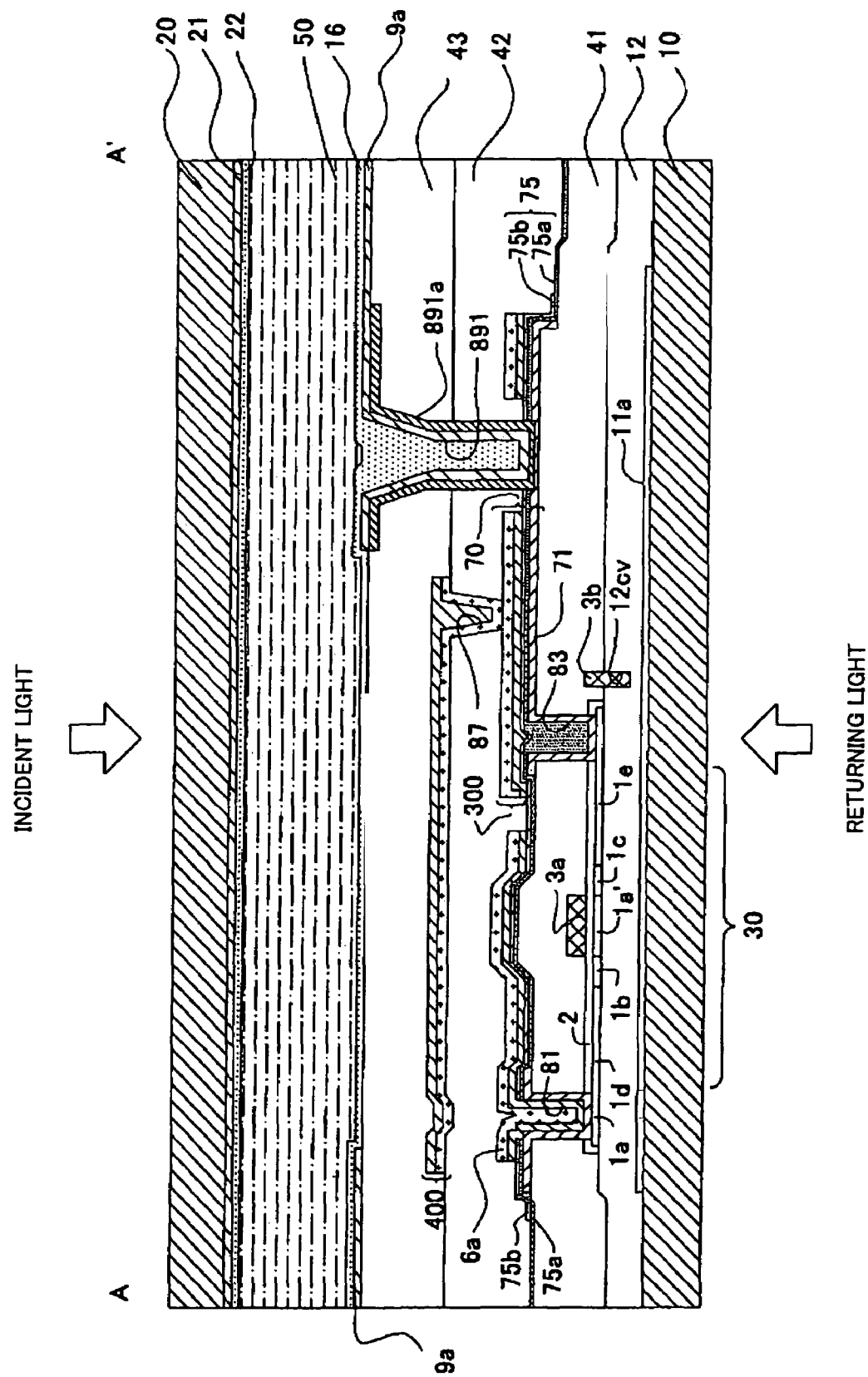
FIG. 18 relates to a sixth exemplary embodiment of the present invention and is a schematic to the same effect as with FIG. 4, and is a schematic illustrating a form wherein a Ti film is formed on the inner surface of a contact hole to make electrical contact with a pixel electrode.

The following is a description relating to a modification of contact holes to achieve electrical connection with pixel electrodes 9a, of the electro-optical device according to the first exemplary embodiment, as a sixth exemplary embodiment of the present invention, with reference to FIG. 18. Now, FIG. 18 is a schematic to the same effect as with FIG. 4, and is a cross-sectional schematic illustrating a form which is characterized by being different in that a film formed of titanium (hereafter referred to as "Ti film") is formed on the inner surface of a contact hole to make electrical connection with the pixel electrodes 9a. The electro-optical device according to the sixth exemplary embodiment has generally the same configuration at the pixel portions as the electro-optical device according to the first exemplary embodiment. Accordingly, in the following, description will primarily be made regarding only the characteristic portions of the sixth exemplary embodiment, and description of the remaining portions will be omitted or simplified as appropriate.

The sixth exemplary embodiment greatly differs from that shown in FIG. 4 in that no third relay layer 402 has been formed, and in that a Ti film 891a has been formed on the inner surface of the contact hole 891 to electrically connect the pixel electrode 9a with the first relay layer 71.

More specifically, unlike the first exemplary embodiment, the fourth layer does not have the third relay layer 402 formed, so the electrical connection between the first relay layer 71 and the pixel electrode 9a is realized by the contact hole 891 which is formed so as to pass through the second inter-layer insulating film 42 and the third inter-layer insulating film 43. Further, a Ti film 891a is formed on the inner surface of the contact hole 891. It is sufficient that the Ti film 891 at least contain titanium, and may contain compounds thereof. For example, this may be titanium nitride, silicon nitride, or the like. The ITO making up the pixel electrodes 9a is formed so as to cover the surface of the Ti film 891a within the contact hole 891.

With the electro-optical device according to the sixth exemplary embodiment having such a configuration, the danger of electrolytic corrosion can be avoided since the pixel electrode 9a formed of ITO is brought into direct contact with the Ti film 891a, the same as with the first exemplary embodiment wherein the danger of electrolytic corrosion is avoided by providing the third relay layer 402 formed of an aluminum film and titanium nitride film. Accordingly, also in the sixth exemplary embodiment voltage application to the pixel electrodes 9a, potential holding properties at the pixel electrodes 9a, can be maintained suitably.

Also, due to the above-described Ti film 891a, passage of light due to the contact hole 891 can be reduced or prevented since the titanium has excellent light-shielding capabilities. That is to say, light proceeding through the contact hole driving portion can be shielded by the Ti film 891a absorbing light and so forth. This does away with almost all possibility of light leakage or the like onto the image.

Also, due to the same reason, the light withstanding capabilities of the TFT 30 and the semiconductor layer 1a thereof can be enhanced. Accordingly, light leakage currents can be reduced or prevented from occurring due to light being cast on the semiconductor layer 1a, and flickering of the image and so forth due to this can be reduced or prevented beforehand. Due to the above, images with higher quality can be displayed on the electro-optical device according to the sixth exemplary embodiment.

Further, it can be said that the configuration of the electro-optical device shown in FIG. 18 relating to this sixth exemplary embodiment is an enrichment of a specific exemplary embodiment of the layered structure on the TFT array substrate 10, in the relation with FIG. 4 described with the first exemplary embodiment and FIG. 6 described with the second exemplary embodiment.

That is, in FIG. 18 relating to the sixth exemplary embodiment, while the structure is simpler than that in FIG. 4 and FIG. 6 due to omission of the second relay layer 402 and reduction in the number of contact holes thereby and so forth, this is more advantageous in disposing the components of the layered structure so as to be closed up within the light shielding region so as to enhance the opening ratio. It should be mentioned that with regard to FIG. 4, reduction in costs can be achieved by reducing the length and size of the contact holes 83, 85, and 89 as described above, and with regard to FIG. 6, there is the advantage that costs can be reduced by enabling the capacitor electrodes 300 to be configured as a part of the capacitor lines. That is, with the various forms of the electro-optical device disclosed in the present exemplary embodiment, not only can enhancement of the opening ratio be achieved as a matter of course, but other accessory advantages are exhibited characteristically; however, which structure is optimal cannot be categorically determined. In this way, the sixth exemplary embodiment provides an optimal form conceivable in manifestation of the present invention along with the above-described first exemplary embodiment, and also enriches specific exemplary embodiments of the layered structure according to the present invention.

Overall Configuration of Electro-Optical Device

Figure 19:
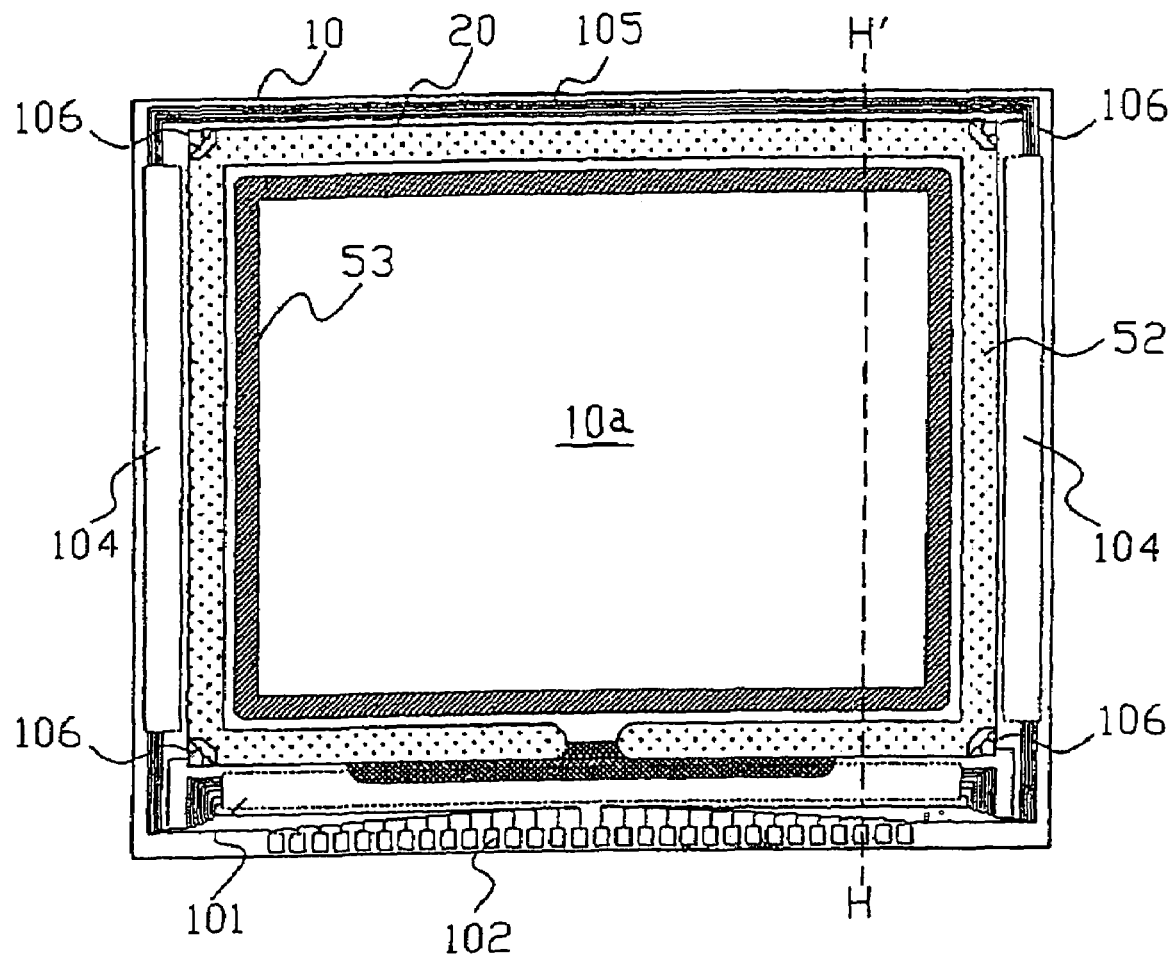
FIG. 19 is a plan view of a TFT array substrate in an electro-optical device according to an exemplary embodiment of the present invention, with the components formed thereupon, viewed from the side of a facing substrate.

The overall configuration of the electro-optical device according to the exemplary embodiments configured as described above, will be described with reference to FIG. 19 and FIG. 20. FIG. 19 is a plan view of a TFT array substrate in an electro-optical device with the components formed thereupon, viewed from the side of the facing substrate 20, and FIG. 20 is a cross-sectional view along plane H-H' in FIG. 19.

Figure 20:
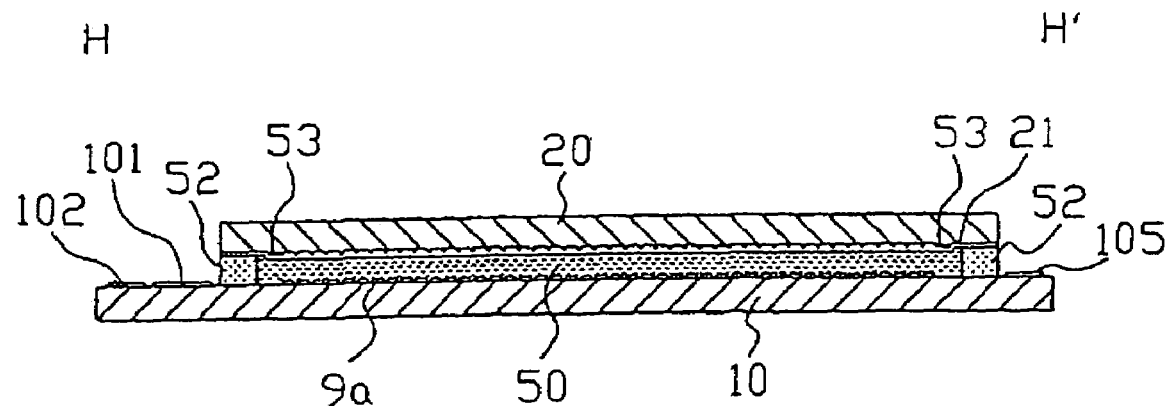
FIG. 20 is a cross-sectional view along plane H-H' in FIG. 19.

In FIG. 19 and FIG. 20, the electro-optical device according to the present exemplary embodiment has the TFT array substrate 10 and the facing substrate 20 disposed facing one another. The liquid crystal 50 is sealed in between the TFT array substrate 10 and facing substrate 20, and the TFT array substrate 10 and facing substrate 20 are glued one to another by a sealing member 52 provided in a sealing region positioned on the perimeter of the image display area 10a.

The sealing material 52 is an adhesive agent made up of an ultraviolet ray hardening resin or thermal-hardening resin for example, to glue the substrates together, and is hardened by application of ultraviolet rays or heat or the like. Also, in the event that the electro-optical device according to the present exemplary embodiment is a liquid crystal device which is small and performs enlarged display, such as for projector use, gap material (spacers) of glass fiber or glass beads or the like are mixed into the sealing material 52 to fix the distance between the substrates (inter-substrate gap) to a predetermined value. Or, in the event that the liquid crystal device is a liquid crystal device which is large, such as a liquid crystal display or liquid crystal television set, and performs same-magnification display, such gap material may be contained in the liquid crystal layer 50.

A data line driving circuit 101 to drive the data lines 6a a by supplying image signals to the data lines 6a at a predetermined timing and external circuit connection terminals 102 are provided along one side of the TFT array substrate 10, in an area further outward from the sealing material 52, and scanning line drive circuits 104 which drive the scanning line 3a by supplying scanning signals to the scanning lines 3a at a predetermined timing are provided along two sides adjacent to this one side.

In the event that the scanning signal delay supplied to the scanning lines 3a is no problem, it is needless to say that only one of the scanning line drive circuits 104 needs to be provided. Also, the data line driving circuit 101 may be arrayed on both sides following the sides of the image display area 10a.

Multiple lines 105 to connect the scanning line drive circuits 104 provided on both sides of the image display area 10a are provided on the remaining one side of the TFT array substrate 10.

Also, a conducting member 106 to electrically conducting between the TFT array substrate 10 and the facing substrate 20 is provided on at least one corner portion of the facing substrate 20.

In FIG. 20, an orientation film is formed on the pixel electrodes 9a following formation of the TFTs for pixel switching, and lines such as scanning lines and data lines and the like, on the TFT array substrate 10. On the other hand, an orientation film is formed on the facing substrate 20 at the uppermost layer portion, besides the facing electrode 21. Also, the liquid crystal layer 50 is formed of a liquid crystal wherein one type or multiple types of nematic liquid crystal have been mixed for example, so as to assume a predetermined orientation state between the pair of orientation films.

In addition to the data line driving circuit 101 and the scanning line drive circuits 104 formed on the TFT array substrate 10, a sampling circuit to apply image signals to multiple data lines 6a at a predetermined timing, a pre-charge circuit to supply pre-charge signals of a predetermined voltage level to the multiple data lines in advance of image signals, an inspection circuit to inspect quality and defects and the like of the electro-optical device during manufacturing and at the time of shipping, and so forth, may be formed.

Electronic Apparatus

Next, an exemplary embodiment of a projection-type color display apparatus, which is an example of an electronic apparatus using the electro-optical device described above in detail as a light valve, will be described with regard to the overall configuration thereof, and particularly with regard to the optical configuration. Now, FIG. 21 is a schematic cross-section of a color liquid-crystal projector.

Figure 21:
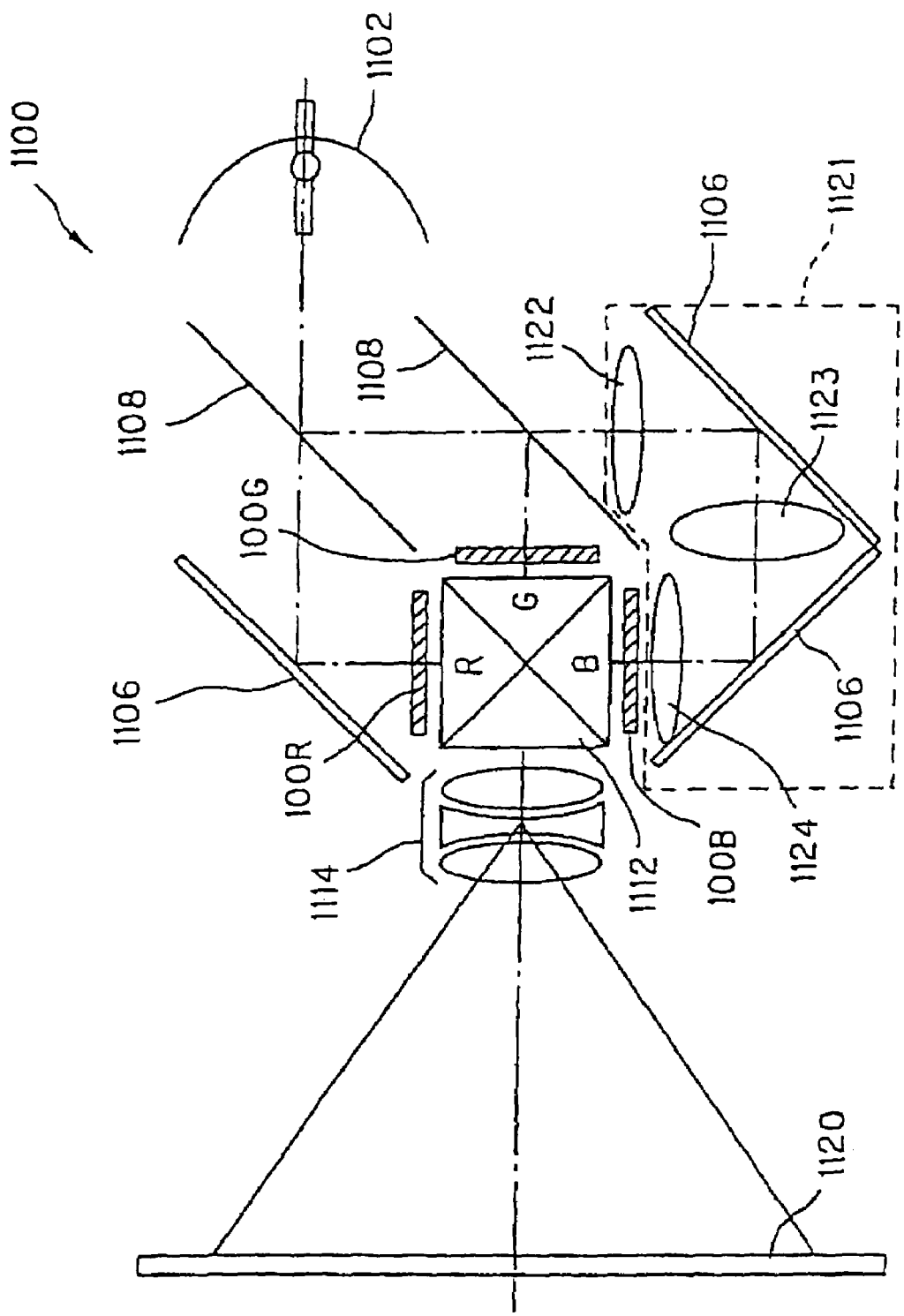
FIG. 21 is a schematic cross-sectional schematic illustrating a color liquid-crystal projector serving as an example of a projection type color display apparatus which is an exemplary embodiment of an electronic apparatus according to the present invention.

In FIG. 21, a liquid crystal projector 1100, serving as an example of the projection type color display apparatus according to an aspect of the present invention, is configured as a projector wherein three liquid crystal modules including the liquid crystal devices wherein the driving circuits are mounted on the TFT arrays substrates, using each as RGB light valves 100R, 100G, and 100B. With the liquid crystal projector 1100, upon projection light being emitted from a white light source lamp unit 1102 such as a metal-halide lamp or the like, the light is divided into the light components R, G, and B, corresponding to the three primary colors of RGB, by three mirrors 1106 and two dichroic mirrors 1108, and guided to the light valves 100R, 100G, and 100B, corresponding to the respective colors. At this time, in particular, the B light is guided through a relay lens system 1121 formed of an input lens 1122, relay lens 1123, and an output lens 1124, in order to reduce or prevent loss of light over a long optical path. The light components corresponding to the three primary colors that have been modulated by the respective light valves 100R, 100G, and 100B are re-synthesized by a dichroic prism 1112, and then projected on a screen 1120 as a color image by a projection lens 1114.

The present invention is not restricted to the above-described exemplary embodiments. Various modifications may be made without departing from the spirit and scope of the present invention and electronic apparatus including such modifications are also encompassed within the present invention. As for electro-optical devices, application can be made to electrophoresis devices, EL (electro-luminescence) devices, or devices using electron emission devices (Field Emission Displays and Surface Conduction Electron-Emitter Displays) and the like.

What is claimed is:

1. An electro-optical device, comprising:
   data lines extending in a first direction above a substrate;
   scanning lines extending in a second direction and intersecting the data lines;
   pixel electrodes and thin-film transistors arrayed so as to correspond to intersection regions of the data lines and the scanning lines;
   capacitors formed at a layer higher than a semiconductor layer of the thin-film transistors and at a layer lower than the pixel electrodes, and electrically connected to pixel potential; and
   upper light shielding film positioned between the data lines and the pixel electrodes;
   the upper light shielding film defining at least the corners of pixel opening regions;
   and the scanning lines, the data lines, and the capacitors, being formed in the light shielded region.

2. The electro-optical device according to claim 1, further comprising:
   a relay layer having light-shielding capabilities, formed of the same film as the upper light shielding film, to electrically connect the thin-film transistors and the pixel electrodes, the shielding film and the relay film defining the pixel opening regions.

3. The electro-optical device according to claim 2, the upper shielding film being electrically connected to one of the electrodes forming the capacitors.

4. The electro-optical device according to claim 1, an inter-layer insulating film disposed as a base for the pixel electrodes;
   and contact holds for electric contact with the pixel electrodes being formed on the inter-layer insulating film;
   and a film including the titanium or a compound thereof being formed on at least the inner face of the contact holes.

5. The electro-optical device according to claim 1, the data lines being formed of the same film with one electrode of the pair of electrodes making up the capacitors.

6. The electro-optical device according to claim 1, further comprising:
   a relay layer, to electrically connect at least one electrode of the pair of electrodes making up the accumulation capacitor with the pixel electrode.

7. The electro-optical device according to claim 6, the relay layer being formed of an aluminum film and nitrized film.

8. The electro-optical device according to claim 1, the scanning lines, the data lines, and at least one electrode of the pair of electrodes making up the capacitors, being formed of a light shielding material.

9. The electro-optical device according to claim 1, one electrode of the pair of electrodes making up the capacitors making up a part of capacitor lines formed so as to follow the second direction;
   and the capacitor lines being formed of a multi-layer film including a low-resistance film.

10. The electro-optical device according to claim 9, the capacitor lines having the low-resistance film as an upper layer thereof and a film formed of a light-absorbing layer as a lower layer thereof.

11. The electro-optical device according to claim 9, the low-resistance film being formed of aluminum or an aluminum alloy.

12. The electro-optical device according to claim 1, the capacitors, comprising:
   the dielectric film and an upper electrode and lower electrode holding the dielectric film therebetween, and including a first portion layered following a plane parallel to the surface of the substrate, and a second portion layered following a plane rising from the surface of the substrate, thereby having a stepped cross-sectional shape which is higher at the middle than the portions closer to the edges.

13. The electro-optical device according to claim 12, the stepped cross-sectional shape of the capacitors being formed following at least one of the scanning lines and the data lines.

14. The electro-optical device according to claim 1, the capacitors, comprising:

the dielectric film and an upper electrode and lower electrode holding the dielectric film therebetween, and the dielectric film being formed of a silicon nitride film and a silicon oxide film.

15. The electro-optical device according to claim 1, an inter-layer insulating film disposed as a base for the pixel electrodes, further comprising:

a part of the layered structure;

and the surface of the inter-layer insulating film being subjected to smoothing processing.

16. The electro-optical device according to claim 15, further comprising a shielding layer provided between the data line and the pixel electrode; the pixel electrodes including a first pixel electrode group for inversion driving at a first cycle and a second pixel electrode group for inversion driving at a second cycle complementary to the first cycle, with a plurality thereof being arrayed on a plane;

and at least one of the data lines and the shielding layer have a main line portion extending intersecting over the scanning lines and an overhanging portion overhanging from the main line portion following the scanning line;

and the electro-optical device further comprising a facing electrode on a facing substrate disposed facing the substrate, facing the plurality of pixel electrodes;

and protrusions being formed on the surface of the base of the pixel electrodes on the substrate, at regions which are gaps between adjacent pixel electrodes across the scanning lines when viewed in planar fashion, according to the presence of the overhanging portions.

17. The electro-optical device according to claim 15, the pixel electrodes including a first pixel electrode group for inversion driving at a first cycle and a second pixel electrode group for inversion driving at a second cycle complementary to the first cycle, with a plurality thereof being arrayed on a plane;

and the electro-optical device further comprising:

a facing electrode on a facing substrate disposed facing the substrate, facing the plurality of pixel electrodes; and protrusions formed at regions which are gaps between adjacent pixel electrodes when viewed in planar fashion;

and the protrusions being formed of protrusions with gradual surface steps, formed by etching back the surface of the protrusions exposed by removing a smoothed film temporarily formed on the protrusions.

18. The electro-optical device according to claim 15, the pixel electrodes including a first pixel electrode group for inversion driving at a first cycle and a second pixel electrode group for inversion driving at a second cycle complementary to the first cycle, with a plurality thereof being arrayed on a plane;

and the electro-optical device further comprising:

a facing electrode on a facing substrate disposed facing the substrate, facing the plurality of pixel electrodes; and a protrusion pattern formed below the pixel electrodes and of the same layer as at least one of the data lines and the shielding layer, in order to form protrusions at regions which are gaps between adjacent pixel electrodes when viewed in planar fashion.

19. An electro-optical device, comprising:

data lines extending in a first direction above a substrate;

scanning lines extending in a second direction and intersecting the data lines;

pixel electrodes and thin-film transistors arrayed so as to correspond to intersection regions of the data lines and the scanning lines;

capacitors formed at a layer higher than a semiconductor layer of the thin-film transistors and at a layer lower than the pixel electrodes, and electrically connected to pixel potential;

a shielding layer provided between the data lines and the pixel electrodes; and a lower light shielding film formed at a layer lower than the semiconductor layer of the thin-film transistors;

the lower light shielding film defining at least the corners of pixel opening regions;

and the scanning lines, the data lines, the capacitors, and the shielding layer, being formed in the light shielded region.

20. The electro-optical device according to claim 19, the shielding layer having light shielding capabilities.

21. An electronic apparatus, having an electro-optical device comprising:

data lines extending in a first direction above a substrate;

scanning lines extending in a second direction and intersecting the data lines;

pixel electrodes and thin-film transistors arrayed so as to correspond to intersection regions of the data lines and the scanning lines;

capacitors formed at a layer higher than a semiconductor layer of the thin-film transistors and at a layer lower than the pixel electrodes, and electrically connected to pixel potential; and upper light shielding film positioned between the data lines and the pixel electrodes;

the upper light shielding film defining at least the corners of pixel opening regions;

and the scanning lines, the data lines, and the capacitors, being formed in the light shielded region.

* * * * *